(12) United States Patent
Uehara

(10) Patent No.: US 11,073,952 B2
(45) Date of Patent: Jul. 27, 2021

(54) DETECTION APPARATUS

(71) Applicant: Japan Display Inc., Tokyo (JP)

(72) Inventor: Toshinori Uehara, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/694,632

(22) Filed: Nov. 25, 2019

(65) Prior Publication Data

US 2020/0174621 A1 Jun. 4, 2020

(30) Foreign Application Priority Data

Nov. 30, 2018 (JP) .............................. JP2018-226100

(51) Int. Cl.
*G06F 3/044* (2006.01)
*G06F 3/041* (2006.01)

(52) U.S. Cl.
CPC .......... *G06F 3/0443* (2019.05); *G06F 3/0416* (2013.01)

(58) Field of Classification Search
CPC .............................. G06F 3/0443; G06F 3/0416
See application file for complete search history.

(56) References Cited

U.S. PATENT DOCUMENTS

| | | | | |
|---|---|---|---|---|
| 9,235,280 B1 * | 1/2016 | Mohindra | ........... | G06F 3/04166 |
| 9,720,541 B2 * | 8/2017 | Berget | ................ | G06F 3/04184 |
| 10,394,391 B2 * | 8/2019 | Reynolds | .............. | G06F 3/0443 |
| 2014/0267158 A1 * | 9/2014 | Bertrand | ............. | G06F 3/04166 |
| | | | | 345/174 |
| 2015/0261251 A1 * | 9/2015 | Shepelev | .............. | G06F 3/0418 |
| | | | | 345/174 |
| 2016/0054754 A1 * | 2/2016 | Aubauer | ............... | G06F 3/0443 |
| | | | | 345/174 |
| 2017/0285847 A1 * | 10/2017 | Uehara | .................. | G06F 3/0446 |
| 2018/0181258 A1 * | 6/2018 | Lu | ........................... | G06F 3/044 |
| 2018/0253183 A1 * | 9/2018 | Imanilov | ............. | H04L 27/2614 |
| 2019/0064956 A1 * | 2/2019 | Tanemura | ........... | G06F 3/04166 |
| 2019/0171314 A1 * | 6/2019 | Hamaguchi | ............. | G06F 3/044 |

FOREIGN PATENT DOCUMENTS

| | | |
|---|---|---|
| JP | 2017-188106 A | 10/2017 |
| WO | 2018/029948 A1 | 2/2018 |

OTHER PUBLICATIONS

Wikipedia, Walsh Matrix, 1995.*

* cited by examiner

*Primary Examiner* — Vinh T Lam
(74) *Attorney, Agent, or Firm* — K&L Gates LLP

(57) ABSTRACT

According to an aspect, a detection apparatus includes: a detection electrode block including detection electrodes arranged in a first direction; a detection circuit configured to be coupled to the detection electrodes to detect detection signals; and a coupling circuit. The coupling circuit has a first mode of coupling the detection electrodes to the detection circuit by r coupling patterns corresponding to a first row to an r-th row of a Walsh Hadamard matrix in a first period, and a second mode of coupling the detection electrodes to the detection circuit by n coupling patterns (n>r) corresponding to the first row to an n-th row of the Hadamard matrix in a second period longer than the first period. The coupling circuit does not couple the detection electrodes to the detection circuit by a coupling pattern corresponding to an (r+1)-th row of the Hadamard matrix in the first mode.

8 Claims, 30 Drawing Sheets

FIG.11D
FIG.11E
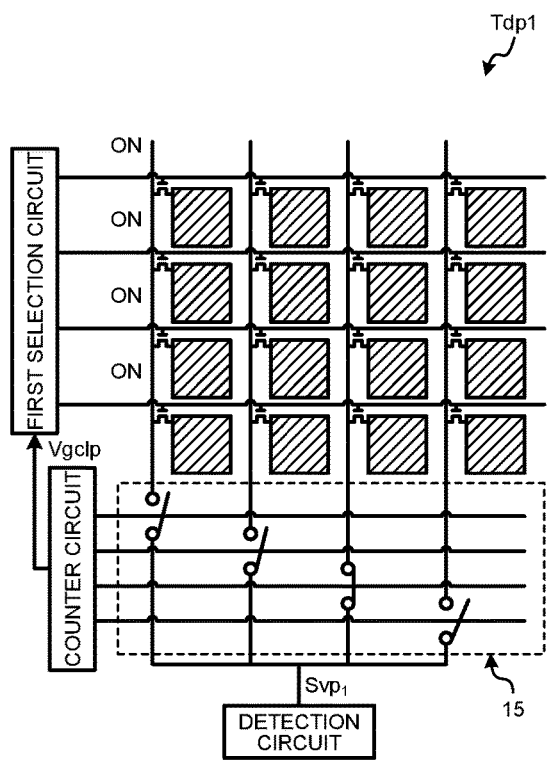
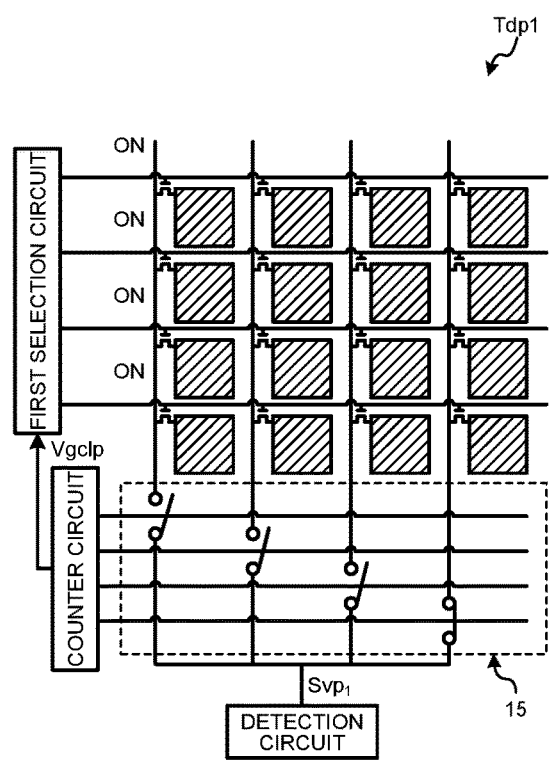

FIG.18

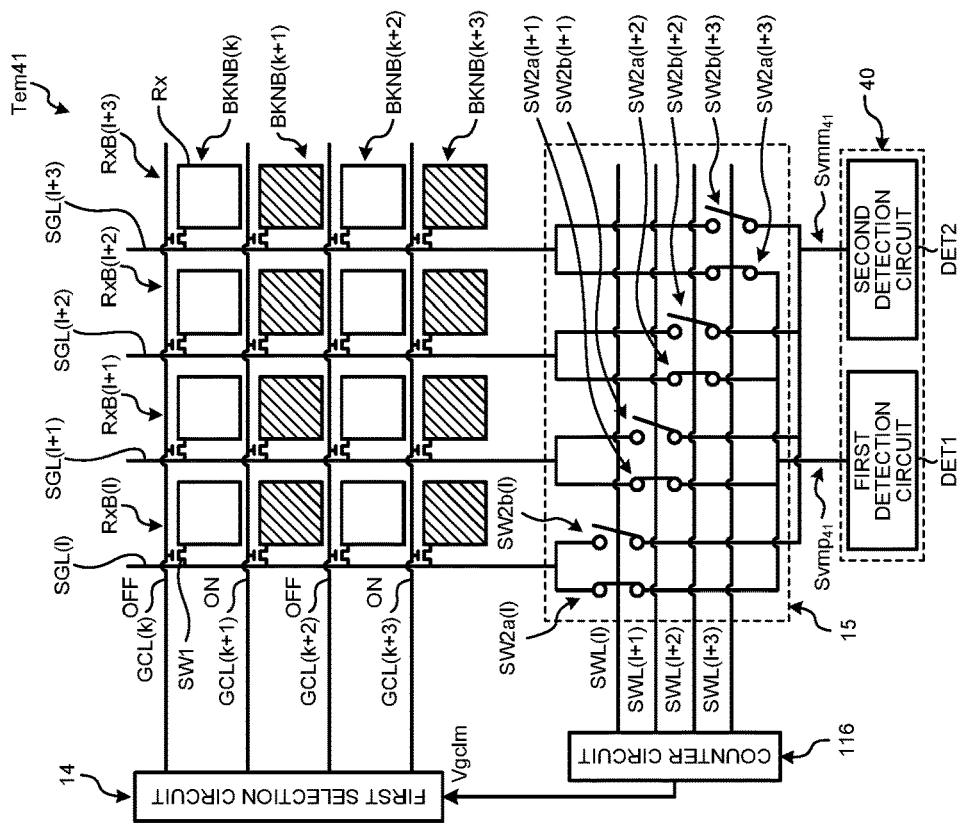
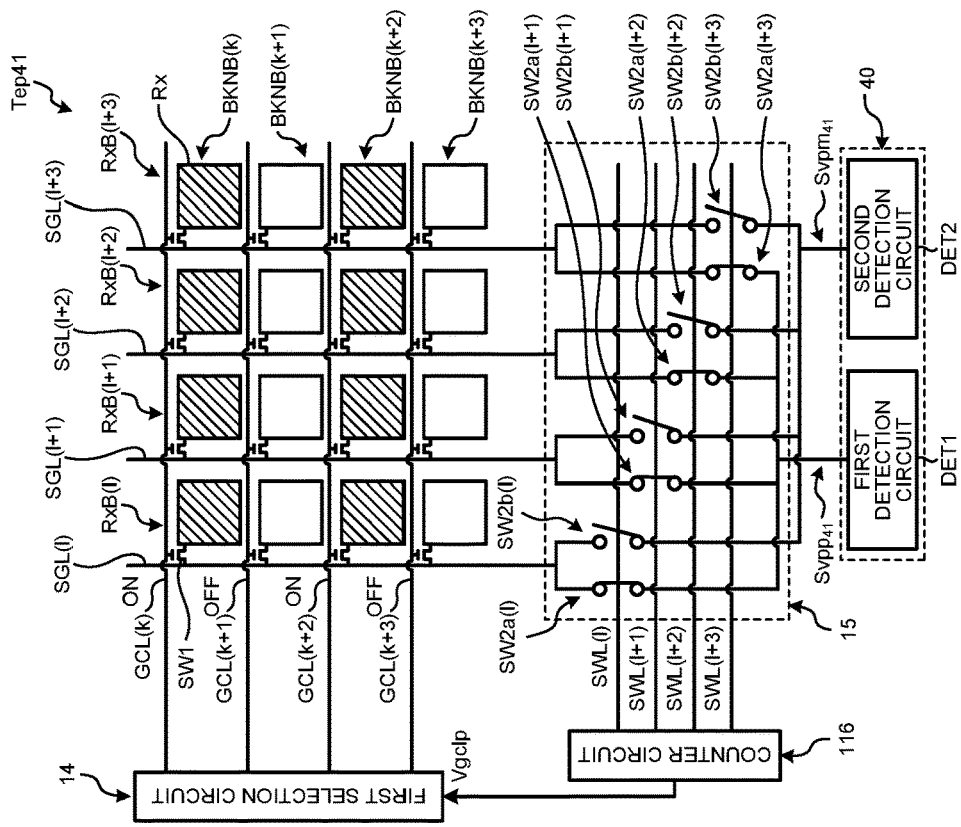

FIG. 23

| MODE | | DECODED SIGNAL | Hv | Hh |
|---|---|---|---|---|
| SECOND MODE | $Rx_{k\|i}, Rx_{k\|i+1}, Rx_{k\|i+2}, Rx_{k\|i+3}$<br>$Rx_{k+1\|i}, Rx_{k+1\|i+1}, Rx_{k+1\|i+2}, Rx_{k+1\|i+3}$<br>$Rx_{k+2\|i}, Rx_{k+2\|i+1}, Rx_{k+2\|i+2}, Rx_{k+2\|i+3}$<br>$Rx_{k+3\|i}, Rx_{k+3\|i+1}, Rx_{k+3\|i+2}, Rx_{k+3\|i+3}$ | = | $sdSi_{k\|i}, sdSi_{k\|i+1}, sdSi_{k\|i+2}, sdSi_{k\|i+3}$<br>$sdSi_{k+1\|i}, sdSi_{k+1\|i+1}, sdSi_{k+1\|i+2}, sdSi_{k+1\|i+3}$<br>$sdSi_{k+2\|i}, sdSi_{k+2\|i+1}, sdSi_{k+2\|i+2}, sdSi_{k+2\|i+3}$<br>$sdSi_{k+3\|i}, sdSi_{k+3\|i+1}, sdSi_{k+3\|i+2}, sdSi_{k+3\|i+3}$ | $\begin{pmatrix} 1 & 1 & -1 & -1 \\ 1 & -1 & -1 & 1 \\ 1 & 1 & -1 & -1 \\ 1 & -1 & -1 & 1 \end{pmatrix}$ | $\begin{pmatrix} 1 & 1 & -1 & -1 \\ 1 & 1 & -1 & -1 \\ 1 & -1 & -1 & 1 \\ 1 & -1 & -1 & 1 \end{pmatrix}$ |
| FIRST MODE | $Rx_{k\|i}, Rx_{k\|i+1}, Rx_{k\|i+2}, Rx_{k\|i+3}$<br>$Rx_{k+1\|i}, Rx_{k+1\|i+1}, Rx_{k+1\|i+2}, Rx_{k+1\|i+3}$<br>$Rx_{k+2\|i}, Rx_{k+2\|i+1}, Rx_{k+2\|i+2}, Rx_{k+2\|i+3}$<br>$Rx_{k+3\|i}, Rx_{k+3\|i+1}, Rx_{k+3\|i+2}, Rx_{k+3\|i+3}$ | = | $s(d/2)(Si_{k\|i}+Si_{k\|i+1}), s(d/2)(Si_{k\|i}+Si_{k\|i+1}), s(d/2)(Si_{k\|i+2}+Si_{k\|i+3}), s(d/2)(Si_{k\|i+2}+Si_{k\|i+3})$<br>$s(d/2)(Si_{k+1\|i}+Si_{k+1\|i+1}), s(d/2)(Si_{k+1\|i}+Si_{k+1\|i+1}), s(d/2)(Si_{k+1\|i+2}+Si_{k+1\|i+3}), s(d/2)(Si_{k+1\|i+2}+Si_{k+1\|i+3})$<br>$s(d/2)(Si_{k+2\|i}+Si_{k+2\|i+1}), s(d/2)(Si_{k+2\|i}+Si_{k+2\|i+1}), s(d/2)(Si_{k+2\|i+2}+Si_{k+2\|i+3}), s(d/2)(Si_{k+2\|i+2}+Si_{k+2\|i+3})$<br>$s(d/2)(Si_{k+3\|i}+Si_{k+3\|i+1}), s(d/2)(Si_{k+3\|i}+Si_{k+3\|i+1}), s(d/2)(Si_{k+3\|i+2}+Si_{k+3\|i+3}), s(d/2)(Si_{k+3\|i+2}+Si_{k+3\|i+3})$ | $\begin{pmatrix} 1 & 1 & -1 & -1 \\ 1 & 1 & -1 & -1 \\ 1 & 1 & -1 & -1 \\ 1 & 1 & -1 & -1 \end{pmatrix}$ | $\begin{pmatrix} 1 & 1 & -1 & -1 \\ 1 & 1 & -1 & -1 \\ 1 & 1 & -1 & -1 \\ 1 & 1 & -1 & -1 \end{pmatrix}$ |
| THIRD MODE | $Rx_{k\|i}, Rx_{k\|i+1}, Rx_{k\|i+2}, Rx_{k\|i+3}$<br>$Rx_{k+1\|i}, Rx_{k+1\|i+1}, Rx_{k+1\|i+2}, Rx_{k+1\|i+3}$<br>$Rx_{k+2\|i}, Rx_{k+2\|i+1}, Rx_{k+2\|i+2}, Rx_{k+2\|i+3}$<br>$Rx_{k+3\|i}, Rx_{k+3\|i+1}, Rx_{k+3\|i+2}, Rx_{k+3\|i+3}$ | = | $(s/2)d(Si_{k\|i}+Si_{k+1\|i}), (s/2)d(Si_{k\|i+1}+Si_{k+1\|i+1}), (s/2)d(Si_{k\|i+2}+Si_{k+1\|i+2}), (s/2)d(Si_{k\|i+3}+Si_{k+1\|i+3})$<br>$(s/2)d(Si_{k\|i}+Si_{k+1\|i}), (s/2)d(Si_{k\|i+1}+Si_{k+1\|i+1}), (s/2)d(Si_{k\|i+2}+Si_{k+1\|i+2}), (s/2)d(Si_{k\|i+3}+Si_{k+1\|i+3})$<br>$(s/2)d(Si_{k+2\|i}+Si_{k+3\|i}), (s/2)d(Si_{k+2\|i+1}+Si_{k+3\|i+1}), (s/2)d(Si_{k+2\|i+2}+Si_{k+3\|i+2}), (s/2)d(Si_{k+2\|i+3}+Si_{k+3\|i+3})$<br>$(s/2)d(Si_{k+2\|i}+Si_{k+3\|i}), (s/2)d(Si_{k+2\|i+1}+Si_{k+3\|i+1}), (s/2)d(Si_{k+2\|i+2}+Si_{k+3\|i+2}), (s/2)d(Si_{k+2\|i+3}+Si_{k+3\|i+3})$ | $\begin{pmatrix} 1 & 1 & -1 & -1 \\ 1 & -1 & -1 & 1 \\ 1 & 1 & -1 & -1 \\ 1 & -1 & -1 & 1 \end{pmatrix}$ | $\begin{pmatrix} 1 & 1 & -1 & -1 \\ 1 & 1 & -1 & -1 \end{pmatrix}$ |

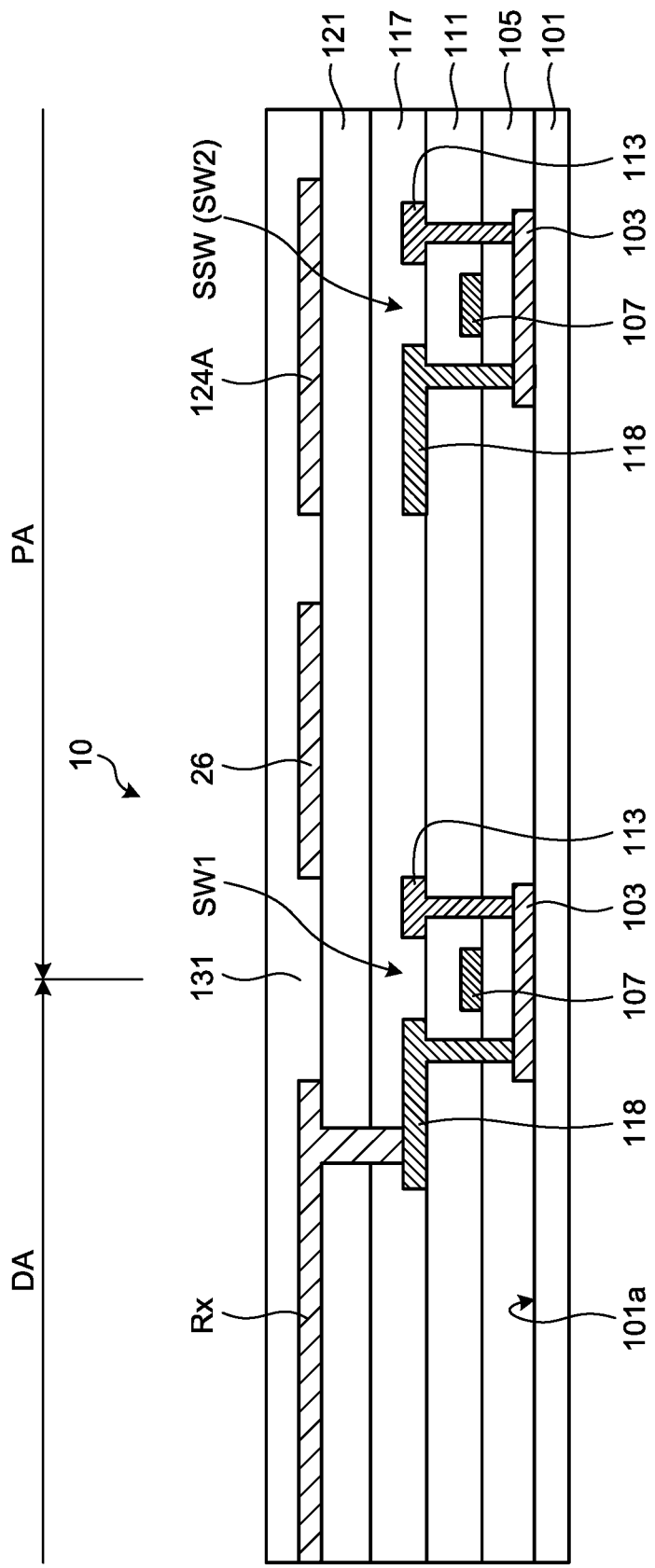

ered for each detection process and requires longer period of time for each detection process. Given these circumstances, there have been demands for a detection apparatus that can perform detection at a high speed in a shorter time.

DETECTION APPARATUS

CROSS-REFERENCE TO RELATED APPLICATIONS

This application claims priority from Japanese Application No. 2018-226100, filed on Nov. 30, 2018, the contents of which are incorporated by reference herein in its entirety.

BACKGROUND

1. Technical Field

The present invention relates to a detection apparatus.

2. Description of the Related Art

A method described in Japanese Patent Application Laid-open Publication No. 2017-188106 (JP-A-2017-188106) is known as a method for improving accuracy in a detection apparatus that can detect an external proximity object based on a change in capacitance, by switching among a plurality of combination patterns of detection electrodes that are used for detection and detection electrodes that are not used for detection among a plurality of detection electrodes.

The method described in JP-A-2017-188106 is a mechanism using combinations of the detection electrodes corresponding to all rows of an Hadamard matrix in each detection process and requires longer period of time for each detection process. Given these circumstances, there have been demands for a detection apparatus that can perform detection at a high speed in a shorter time.

For the foregoing reasons, there is a need for a detection apparatus that can perform detection at a higher speed.

SUMMARY

According to an aspect, a detection apparatus includes: a detection electrode block including a plurality of detection electrodes arranged in a first direction; a detection circuit configured to be coupled to the detection electrodes to detect detection signals corresponding to changes in capacitance of the detection electrodes; and a coupling circuit configured to couple the detection electrodes to the detection circuit and uncouple the detection electrodes from the detection circuit. The coupling circuit has a first mode of coupling the detection electrodes and the detection circuit to each other by r coupling patterns corresponding to a first row to an r-th row of a Walsh Hadamard matrix in a first period, and a second mode of coupling the detection electrodes and the detection circuit to each other by n coupling patterns corresponding to the first row to an n-th row of the Hadamard matrix in a second period that is longer than the first period, n being greater than r. The coupling circuit does not couple the detection electrodes and the detection circuit to each other by a coupling pattern corresponding to an (r+1)-th row of the Hadamard matrix in the first mode.

BRIEF DESCRIPTION OF THE DRAWINGS

FIGS. 11A to 11E are diagrams of selection patterns of detection electrodes by sign selection driving for a plurality of detection electrode blocks;
FIG. 18 is a diagram of a correspondence relation between a detection operation and a certain sign in each operational mode in a second embodiment;
FIGS. 22A to 22F are diagrams of selection patterns of the detection electrodes by the sign selection driving for the detection electrode blocks according to the third embodiment;
FIG. 23 is a diagram of a correspondence relation between decoded signals and detection electrodes in each mode in the detection apparatus according to the third embodiment;
FIG. 27 is a sectional view of the detection apparatus according to the sixth embodiment.

DETAILED DESCRIPTION

Figure 1:
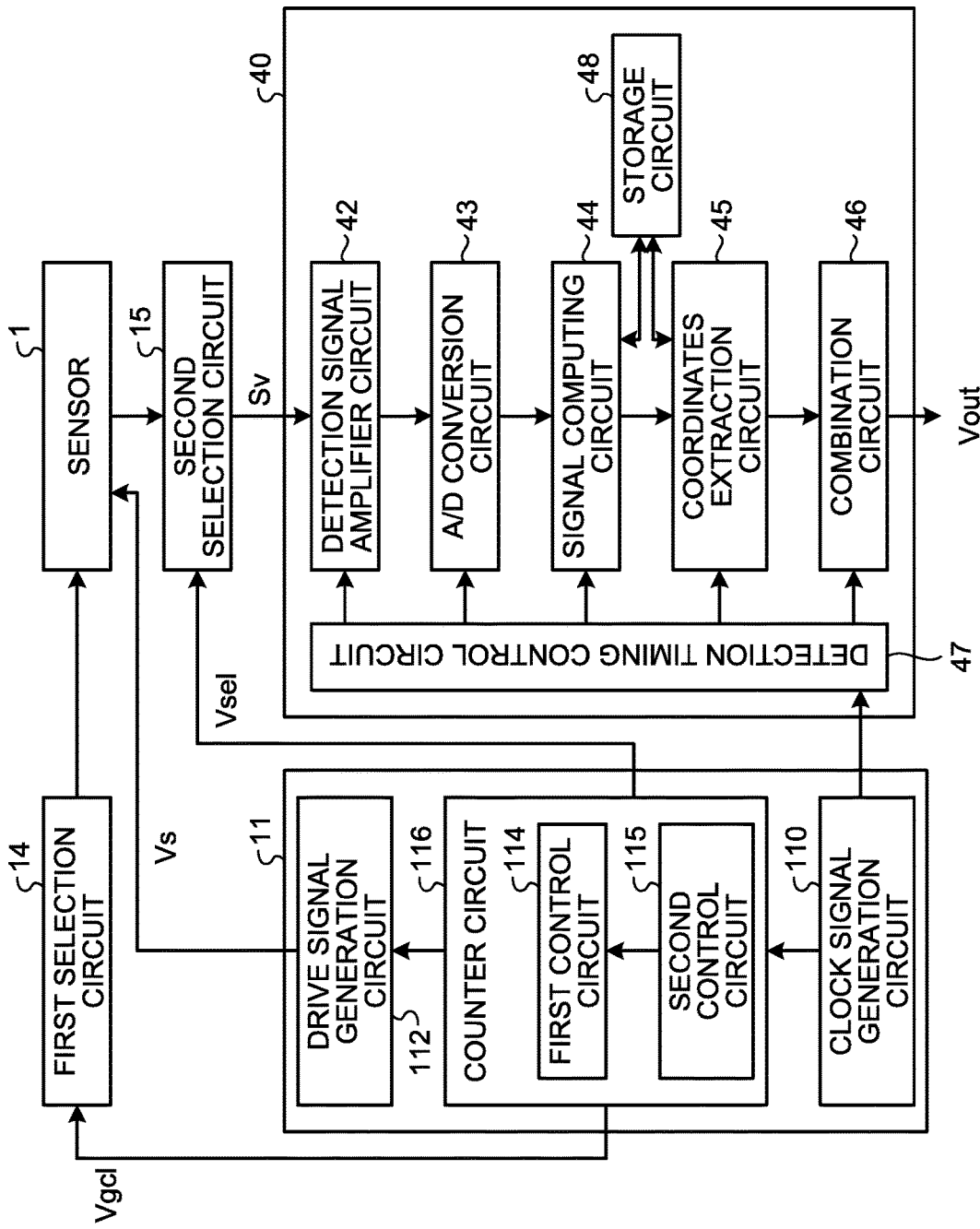
FIG. 1 is a block diagram of a configuration example of a detection apparatus according to a first embodiment.

The following describes modes (embodiments) for carrying out the present invention in detail with reference to the accompanying drawings. The details described in the embodiments below do not limit the present invention. Components described below include those easily conceivable by those skilled in the art or those substantially identical thereto. Further, the components described below can be combined as appropriate. The disclosure is only an example, and the scope of the present invention naturally includes appropriate changes with the gist of the invention maintained that can be easily thought of by those skilled in the art. To further clarify the description, widths, thicknesses, shapes, and the like of various parts are schematically illustrated in the drawings as compared with actual aspects thereof, in some cases. However, they are merely examples, and interpretation of the present disclosure is not limited thereto. In the present specification and the drawings, the same element as that illustrated in a drawing that has already been discussed is denoted by the same reference numeral through the specification and the drawings, and detailed description thereof will not be repeated in some cases where appropriate.

In this disclosure, when an element is described as being "on" another element, the element can be directly on the other element, or there can be one or more elements between the element and the other element.

First Embodiment

Figure 2:
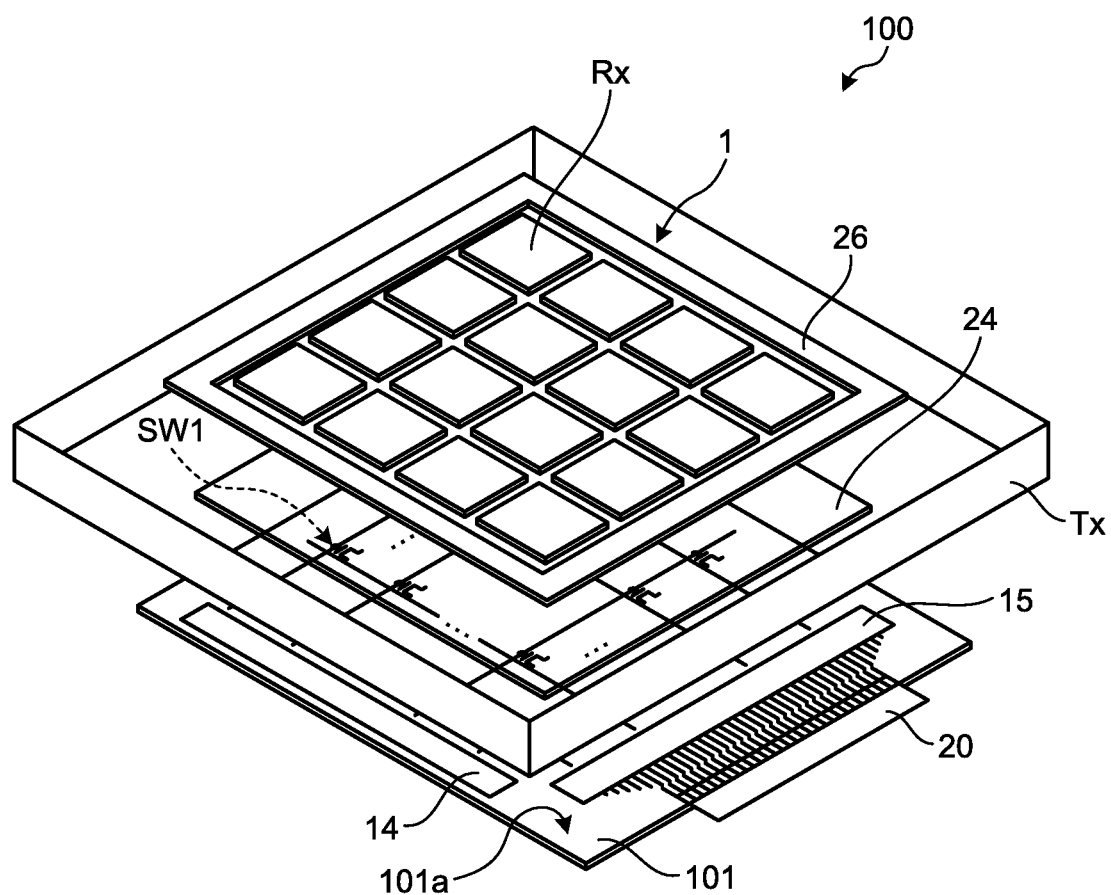
FIG. 2 is a schematic diagram of a configuration example of the detection apparatus.
Figure 3:
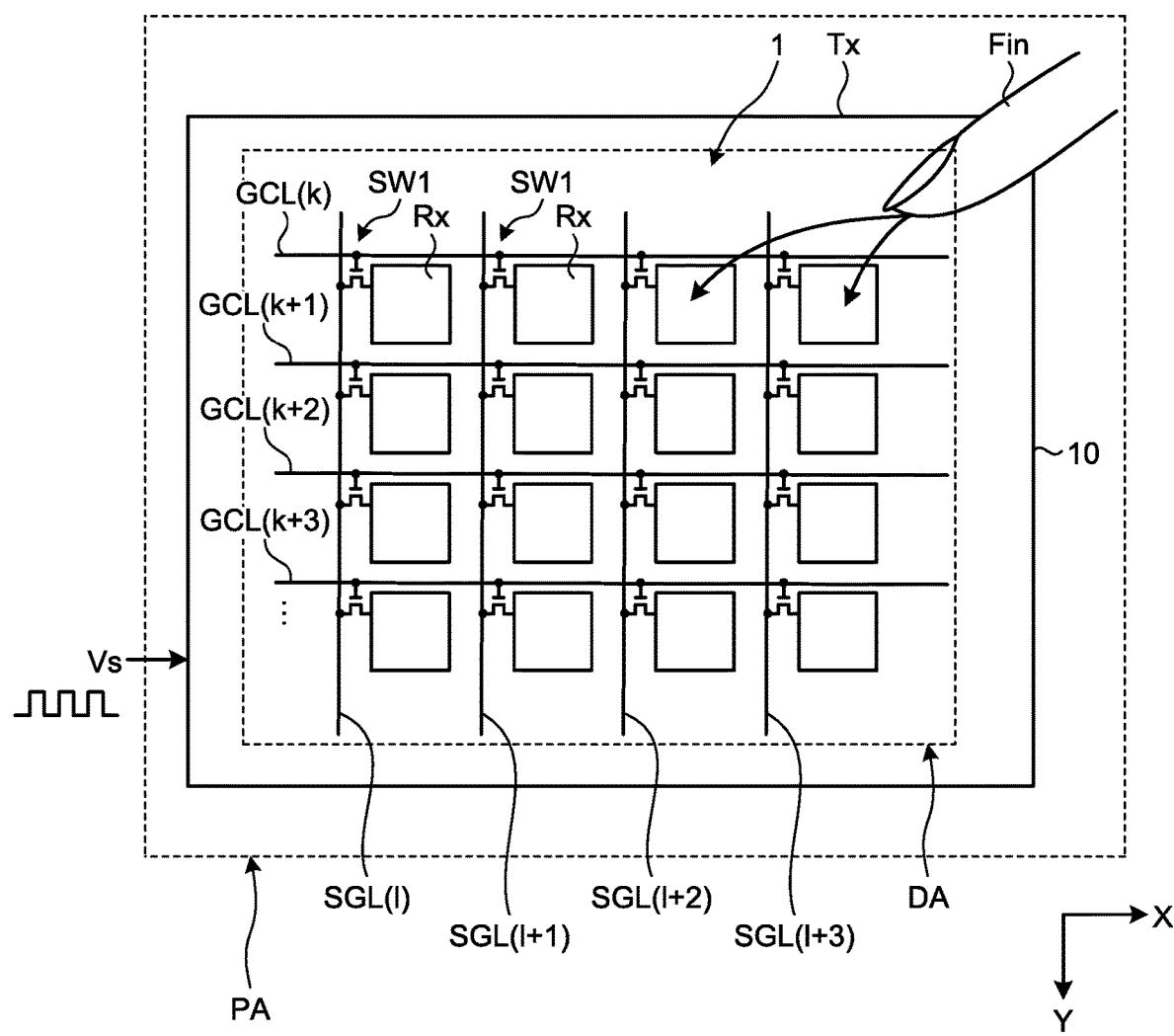
FIG. 3 is a schematic diagram of a configuration example of a sensor included in the detection apparatus.

FIG. 1 is a block diagram of a configuration example of a detection apparatus according to a first embodiment. FIG. 2 is a schematic diagram of a configuration example of the detection apparatus. FIG. 3 is a schematic diagram of a configuration example of a sensor included in the detection apparatus. The detection apparatus 100 of this embodiment is a detection apparatus detecting capacitance between a fine recess or a fine protrusion and a detection electrode and is a fingerprint detection apparatus, for example. As illustrated in FIG. 1, the detection apparatus 100 includes a sensor 1, a detection control circuit 11, a first selection circuit 14, a second selection circuit 15, and a detection circuit 40.

As illustrated in FIG. 2 and FIG. 3, the sensor 1 includes an insulating base member 101, a plurality of detection electrodes Rx provided on one face 101a of the base member 101, a plurality of switch elements SW1, scan lines GCL coupled to the switch elements SW1, data lines SGL coupled to the switch elements SW1, and a detection electrode Tx (a drive electrode). The switch elements SW1 are each a thin film transistor, for example. The scan lines GCL are wiring lines for supplying a scan signal to the switch elements SW1. When the switch elements SW1 are each a transistor, for example, the scan lines GCL are each coupled to a gate of the transistor. The data lines SGL are wiring lines electrically coupled to the detection electrodes Rx in accordance with the scan signal from the scan lines GCL. In other words, the data lines SGL are wiring lines to which detection signals Sv are output from the detection electrodes Rx. When the switch elements SW1 are each a transistor, for example, the data lines SGL are each coupled to a source of the transistor. The base member 101 is made of glass, for example. As illustrated in FIG. 2, the sensor 1 further has a shield layer 24 between the detection electrodes Rx and the switch elements SW1. In other words, the switch elements SW1, the scan lines GCL, and the data lines SGL are provided between the one face 101a of the base member 101 and the shield layer 24.

The first selection circuit 14 and the second selection circuit 15 are provided on the one face 101a of the base member 101. The data lines SGL are coupled to the second selection circuit 15. The scan lines GCL are coupled to the first selection circuit 14. The shield layer 24 is coupled to fixed potential (e.g., ground potential). This hinders the potential of the detection electrodes Rx from having an influence on the data lines SGL and the like and thus suppresses noise that would otherwise be caused. The shield layer 24 may be in a floating state, in which the potential thereof is not fixed.

As illustrated in FIG. 3, the sensor 1 has a detection area DA and a peripheral area PA other than the detection area DA. The detection area DA is rectangular in shape, for example. In the detection area DA, the detection electrodes Rx and the switch elements SW1 are arranged. The peripheral area PA of the sensor 1 is formed along at least one side of the detection area DA when the detection area DA is rectangular in shape. In the peripheral area PA of the sensor 1, the detection electrode Tx (the drive electrode) is arranged. The sensor 1 further includes a conductor 26. The conductor 26 is arranged in the peripheral area PA. More specifically, the conductor 26 is arranged between the detection electrodes Rx and the detection electrode Tx. The conductor 26 is coupled to the detection circuit 40. The conductor 26 is an electrode for detecting the approach of an external object (e.g., a finger Fin) to the sensor 1. The conductor 26 is coupled to a clock signal generation circuit 110, for example, and a drive signal Vs is supplied thereto. When a finger Fin approaches the conductor 26, capacitance occurs between the conductor 26 and the finger Fin, and the capacitance value of the conductor 26 increases. A change in the capacitance value of the conductor 26 is detected by the detection circuit 40 coupled to the conductor 26, whereby the approach of the external object (e.g., the finger Fin) to the sensor 1 can be detected. The detection circuit 40 may stop supply of the drive signal Vs to the detection electrode Tx by the detection control circuit 11 and reception of the detection signals Sv from the detection electrodes Rx by the detection circuit 40 until the detection circuit 40 detects the approach a finger Fin by the conductor 26, and may start the operation of the detection electrode Tx by the detection control circuit 11 and the operation of the detection electrodes Rx by the detection circuit 40 when the approach of a finger Fin has been detected by the conductor 26. A mode of operating only the conductor 26 is referred to as a standby mode.

The drive signal Vs is supplied to the detection electrode Tx. The detection electrode Tx is arranged outside the detection area DA in which the detection electrodes Rx are arranged, for example. More specifically, the detection electrode Tx is arranged outside the conductor 26. That is to say, the conductor 26 is arranged between the detection electrodes Rx and the detection electrode Tx. The detection electrodes Rx, the conductor 26, and the detection electrode Tx are arranged spaced apart from each other.

The detection control circuit 11 controls each operation of the sensor 1, the first selection circuit 14, the second selection circuit 15, and the detection circuit 40. The detection control circuit 11 supplies the drive signal Vs for detection to the detection electrode Tx. The first selection circuit 14 supplies the scan signal to a scan line GCL selected based on a selection signal Vgcl supplied from the detection control circuit 11. In other words, the first selection circuit 14 is a selection circuit selecting a plurality of detection electrodes Rx (refer to FIGS. 12A and 12B described later) coupled in a row direction (an X direction) and coupled to the scan line GCL. The first selection circuit 14 is a gate driver, such as a decoder. The second selection circuit 15 couples, to the detection circuit 40, a data line SGL selected based on a selection signal Vsel supplied from the detection control circuit 11. In other words, the second selection circuit 15 is a selection circuit selecting the detection electrodes Rx coupled to the data line SGL in a column direction (a Y direction). The second selection circuit 15 is a multiplexer, for example.

As illustrated in FIG. 3, for example, the sensor 1 has the detection electrodes Rx, scan lines GCL(k), GCL(k+1), . . . and data lines SGL(1), SGL(l+1), . . . . The k and 1 are each an integer equal to or greater than 1. The detection electrodes Rx are arranged in the row direction (the X direction) and the column direction (the Y direction) each. The scan lines GCL(k), GCL(k+1), . . . are wiring lines for turning on and off the switch elements SW1. The scan lines GCL(k), GCL(k+1), . . . are arranged in the column direction (the Y direction) and extend in the row direction (the X direction). The data lines SGL(1), SGL(l+1), . . . are wiring lines for outputting the detection signals Sv. The data lines SGL(1), SGL(l+1), . . . are arranged in the row direction (the X direction) and extend in the column direction (the Y direction). In the following description, when there is no need to separately describe the scan lines GCL(k), GCL(k+1), . . . , each of them will be referred to simply as a scan line GCL. When there is no need to separately describe the data lines SGL(1), SGL(l+1), . . . , each of them will be referred to simply as a data line SGL.

The first selection circuit 14 selects certain scan lines GCL (e.g., GCL(k) and GCL(k+2)) out of a plurality of scan lines GCL based on the selection signal Vgcl supplied from the detection control circuit 11. The first selection circuit 14 then applies a certain voltage (a scan signal) to the selected scan lines GCL(k) and GCL(k+2). With this operation, the detection electrodes Rx belonging to the k-th row and the detection electrodes Rx belonging to the (k+2)-th row are coupled to the second selection circuit 15 via the data lines SGL(1), SGL(l+1), . . . . The second selection circuit 15 selects certain data lines SGL (e.g., SGL(1)) out of a plurality of data lines SGL based on a signal supplied from the detection control circuit 11. The second selection circuit 15 then couples the selected data line SGL(1) to the detection circuit 40. With this operation, the detection signal Sv is supplied to the detection circuit 40 from the detection electrode Rx on the k-th row and the l-th column and the detection electrode Rx on the (k+2)-th row and the l-th column.

The detection circuit 40 detects a recess or a protrusion on the surface of a finger Fin or the like being in contact with or proximity to the sensor 1 based on the detection signal Sv output from the second selection circuit 15 in accordance with the signal supplied from the detection control circuit 11 to detect the shape and fingerprint of the finger Fin. The detection circuit 40 includes a detection signal amplifier circuit 42, an analog-to-digital (A/D) conversion circuit 43, a signal computing circuit 44, a coordinates extraction circuit 45, a combination circuit 46, a detection timing control circuit 47, and a storage circuit 48. The detection timing control circuit 47 performs control to cause the detection signal amplifier circuit 42, the A/D conversion circuit 43, the signal computing circuit 44, the coordinates extraction circuit 45, and the combination circuit 46 to operate in sync with each other based on a clock signal supplied from the detection control circuit 11.

The detection signal Sv is supplied to the detection signal amplifier circuit 42 of the detection circuit 40 from the sensor 1. The detection signal amplifier circuit 42 amplifies the detection signal Sv. The A/D conversion circuit 43 converts an analog signal output from the detection signal amplifier circuit 42 into a digital signal.

The signal computing circuit 44 is a logic circuit detecting a recess or a protrusion of the finger Fin on the sensor 1 based on an output signal of the A/D conversion circuit 43. The signal computing circuit 44 calculates a differential signal of the detection signal Sv (an absolute value |ΔV|) by the recess or protrusion of the finger Fin based on the detection signal Sv output from the sensor 1. The signal computing circuit 44 compares the absolute value |ΔV| with a certain threshold voltage and, if this absolute value |ΔV| is less than the threshold voltage (a second threshold Vth2), determines that the recess of the finger Fin has been detected. In contrast, if the absolute value |ΔV| is equal to or greater than the threshold voltage, the signal computing circuit 44 determines that the protrusion of the finger Fin has been detected. Thus, the detection circuit 40 can detect the recess or protrusion of the finger Fin. Likewise, when a signal is input to the detection circuit 40 via the conductor 26, the signal computing circuit 44 compares the absolute value |ΔV| with a certain threshold voltage and, if this absolute value |ΔV| is less than the threshold voltage (a first threshold Vth1), determines that the finger Fin is in a noncontact state. In contrast, if the absolute value |ΔV| is equal to or greater than the threshold voltage, the signal computing circuit 44 determines that the finger Fin is in a contact state.

As described later, the signal computing circuit 44 receives the detection signal Sv from a detection electrode block RxB to perform computation processing thereon based on a certain sign. The computed detection signal Sv is temporarily stored in the storage circuit 48. Further, the signal computing circuit 44 receives the detection signal Sv stored in the storage circuit 48 to perform decoding processing thereon based on the certain sign. The certain sign is stored in the storage circuit 48 in advance, for example. The detection control circuit 11 and the signal computing circuit 44 can read the certain sign stored in the storage circuit 48 at any timing. The storage circuit 48 may be any of a random access memory (RAM), a read only memory (ROM), a register circuit, and the like, for example.

The coordinates extraction circuit 45 is a logic circuit that, when the recess or protrusion of a finger Fin is detected by the signal computing circuit 44, determines its detected coordinates. The coordinates extraction circuit 45 calculates the detected coordinates based on a decoded detection signal Sid and outputs the obtained detected coordinates to the combination circuit 46. The combination circuit 46 combines the detected coordinates output from the coordinates extraction circuit 45 together to generate two-dimensional information indicating the shape and fingerprint of the finger Fin being in contact or proximity. The combination circuit 46 outputs an output signal Vout of the detection circuit 40 as the two-dimensional information. The combination circuit 46 may generate an image based on the two-dimensional information, and its image information may be the output signal Vout. At least one of the coordinates extraction circuit 45 and the combination circuit 46 may be arranged in an external apparatus coupled to the detection apparatus 100. In other words, a detection signal Sid decoded by the signal computing circuit 44 may be output as the output signal Vout. The detection apparatus 100 can detect the proximity of an object, not limited to the finger Fin, which can have an influence on the capacitance of the detection electrodes Rx.

As illustrated in FIG. 1, the detection control circuit 11 includes the clock signal generation circuit 110, a drive signal generation circuit 112, and a counter circuit 116. The counter circuit 116 includes a first control circuit 114 and a second control circuit 115.

The clock signal generation circuit 110 generates a clock signal. This clock signal is supplied to the counter circuit 116 of the detection control circuit 11 and the detection timing control circuit 47 of the detection circuit 40, for example.

The counter circuit 116 measures the number of pulses of the clock signal generated by the clock signal generation circuit 110. The counter circuit 116 then, based on the measured value of the number of pulses, generates a first timing control signal for controlling the timing at which a scan line GCL out of the scan lines GCL is selected and supplies the generated first timing control signal to the first control circuit 114. The first control circuit 114 generates the selection signal Vgcl (e.g., a selection signal Vgclp or a selection signal Vgclm illustrated in FIGS. 12A and 12B described later) for selecting the detection electrode Rx (refer to FIG. 3) based on the first timing control signal supplied from the counter circuit 116 and supplies the generated selection signal Vgcl to the first selection circuit 14. The first selection circuit 14 supplies a scan signal to the scan line GCL based on the selection signal Vgcl supplied from the first control circuit 114. With this operation, a certain scan line GCL is selected out of the scan lines GCL. The detection electrode Rx coupled to the selected scan line GCL is coupled to the data line SGL.

The counter circuit 116 generates a second timing control signal for controlling the timing at which a data line SGL out of the data lines SGL is selected based on the measured value of the number of pulses of the clock signal described above. The counter circuit 116 supplies the generated second timing control signal to the second control circuit 115. The second control circuit 115 outputs the selection signal Vsel to the second selection circuit 15 based on the second timing control signal supplied from the counter circuit 116. The selection signal Vsel is a signal for scanning switches in the second selection circuit 15. With this operation, a certain data line SGL is selected out of the data lines SGL. The selected data line SGL is coupled to the detection circuit 40 via the second selection circuit 15.

The drive signal generation circuit 112 generates the drive signal Vs for detection and outputs the drive signal Vs for detection to the detection electrode Tx.

Figure 4:
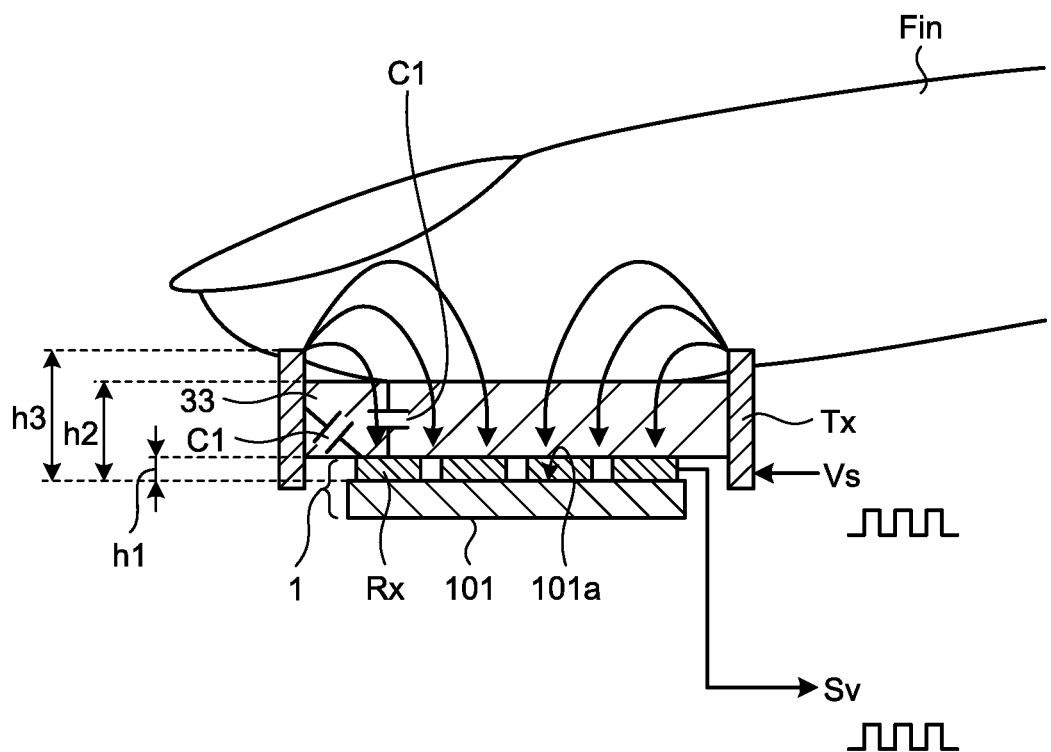
FIG. 4 is a diagram schematically illustrating how a drive signal is transmitted to a detection electrode from a drive electrode via a finger.
Figure 5:
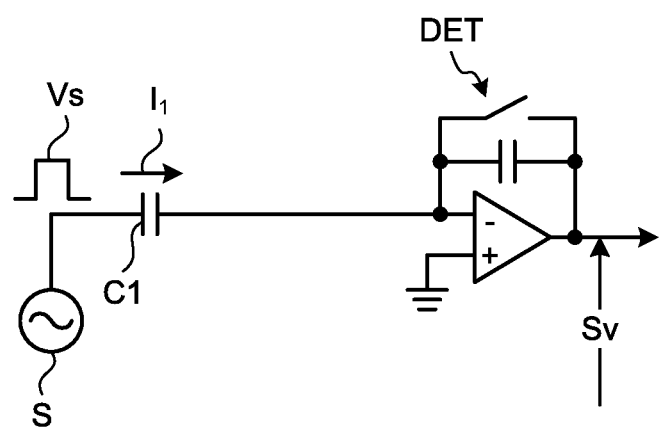
FIG. 5 is an illustrative diagram of an example of an equivalent circuit for illustrating a detection operation by the sensor and a detection circuit.
Figure 6:
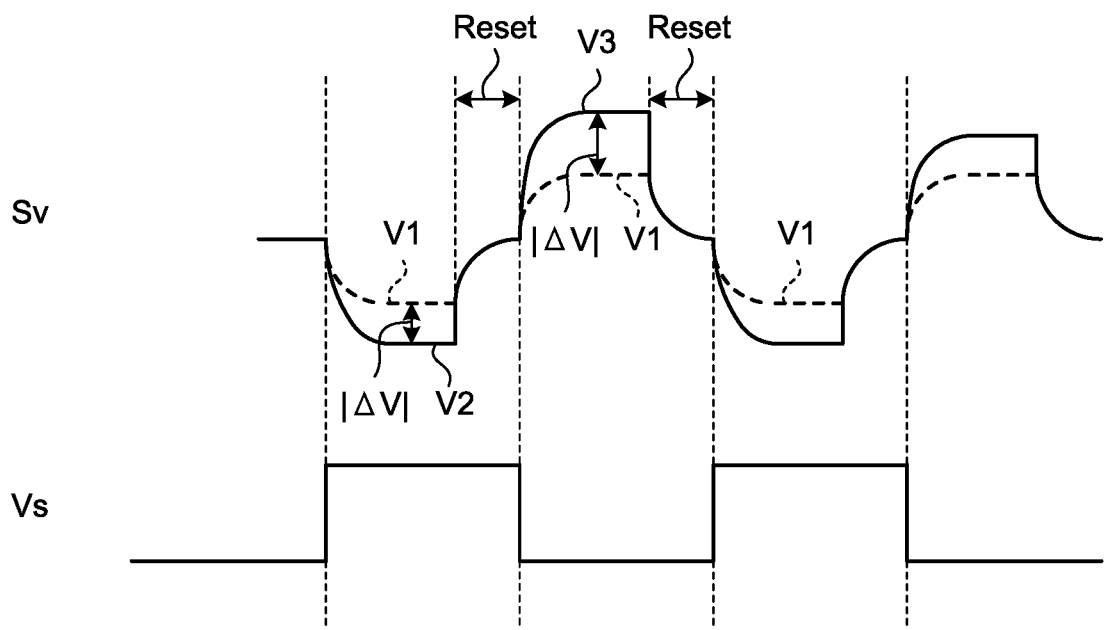
FIG. 6 is a diagram of an example of waveforms of the drive signal and a detection signal of the detection operation.

The sensor 1 illustrated in FIG. 1 to FIG. 3 detects changes in the capacitance of the detection electrode Rx. The following describes a detection operation by the sensor 1 with reference to FIG. 4 to FIG. 6. FIG. 4 is a diagram schematically illustrating how a drive signal is transmitted to a detection electrode from a drive electrode via the finger Fin. FIG. 5 is an illustrative diagram of an example of an equivalent circuit for illustrating a detection operation by a sensor and a detection circuit. FIG. 6 is a diagram of an example of waveforms of the drive signal and a detection signal of the detection operation.

As illustrated in FIG. 4, a capacitance element C1 is formed between the detection electrode Tx and the detection electrode Rx. As illustrated in FIG. 5, an alternating current (AC) signal source S is coupled to the detection electrode Tx. In other words, the drive signal Vs is supplied from the detection control circuit 11 to the detection electrode Tx. The detection electrode Rx is coupled to a voltage detector DET. The voltage detector DET corresponds to the detection signal amplifier circuit 42 of the detection circuit 40, for example. The voltage detector DET is an integrating circuit.

The drive signal Vs applied to the detection electrode Tx is an AC rectangular wave with a certain frequency (e.g., a frequency of the order of several kilohertz to several hundred kilohertz), for example. When the drive signal Vs is applied to the detection electrode Tx, the detection signal Sv is output from the detection electrode Rx via the voltage detector DET.

In a state in which the finger Fin is not in contact or proximity (a noncontact state), a current corresponding to the capacitance value of the capacitance element C1 flows with charging and discharging of the capacitance element C1. The detection circuit 40 converts variations in a current I1 corresponding to the drive signal Vs into variations in voltage (a dotted line waveform V1 (refer to FIG. 6)).

In contrast, in a state in which the finger Fin is in contact or proximity (a contact state), as illustrated in FIG. 4, the finger Fin is in contact with the detection electrode Tx. Then the drive signal Vs supplied to the detection electrode Tx from the detection control circuit 11 has an influence on the detection electrode Rx via the finger Fin and an insulating protective layer 33 (e.g., an insulating resin) protecting the sensor 1. That is to say, the finger Fin acts as part of the detection electrode Tx. Thus, in the contact state, the separating distance between the detection electrode Tx and the detection electrode Rx is substantially short, and the capacitance element C1 acts as a capacitance element with a capacitance value larger than a capacitance value in the noncontact state. Further, a difference in the separating distance to the detection electrode Rx occurs between the recess and the protrusion of the finger Fin, and the capacitance value of the capacitance element C1 occurring at the protrusion of the finger Fin is larger than that occurring at the recess of the finger Fin. As illustrated in FIG. 6, the detection circuit 40 converts variations in a current I2 or I3 corresponding to the drive signal Vs into variations in voltage (a solid line waveform V2 or waveform V3). The waveform V2 corresponds to a waveform in a state in which the recess of the finger Fin is in contact, whereas the waveform V3 corresponds to a waveform in a state in which the protrusion of the finger Fin is in contact.

In this case, the waveform V2 and the waveform V3 are larger in amplitude than the waveform V1 described above. In addition, the waveform V3 is larger in amplitude than the waveform V2. With this relation, the absolute value |ΔV| of a voltage difference between the waveform V1 and the waveform V2 changes depending on the contact or proximity of the external object such as the finger Fin and a recess or protrusion of the external object. In order to detect the absolute value |ΔV| of the voltage difference between the waveform V1 and the waveform V2 or the waveform V3 with high precision, the voltage detector DET more preferably performs an operation including a period Reset in which the charging and discharging of a capacitor are reset by switching within the circuit in accordance with the frequency of the drive signal Vs.

The detection circuit 40 compares the absolute value |ΔV| with the first threshold Vth1. If the absolute value |ΔV| is less than the first threshold Vth1, the detection circuit 40 determines that the finger Fin is in a noncontact state. In contrast, if the absolute value |ΔV| is equal to or greater than the first threshold Vth1, the detection circuit 40 determines that the finger Fin is in a contact-or-proximity state. Further, the detection circuit 40 compares the absolute value |ΔV| with the second threshold Vth2. If the absolute value |ΔV| is less than the second threshold Vth2, the detection circuit 40 determines that the recess of the finger Fin is in contact. In contrast, if the absolute value |ΔV| is equal to or greater than the second threshold Vth2, the detection circuit 40 determines that the protrusion of the finger Fin is in contact. The second threshold Vth2 is a value larger than the first threshold Vth1.

Figure 7:
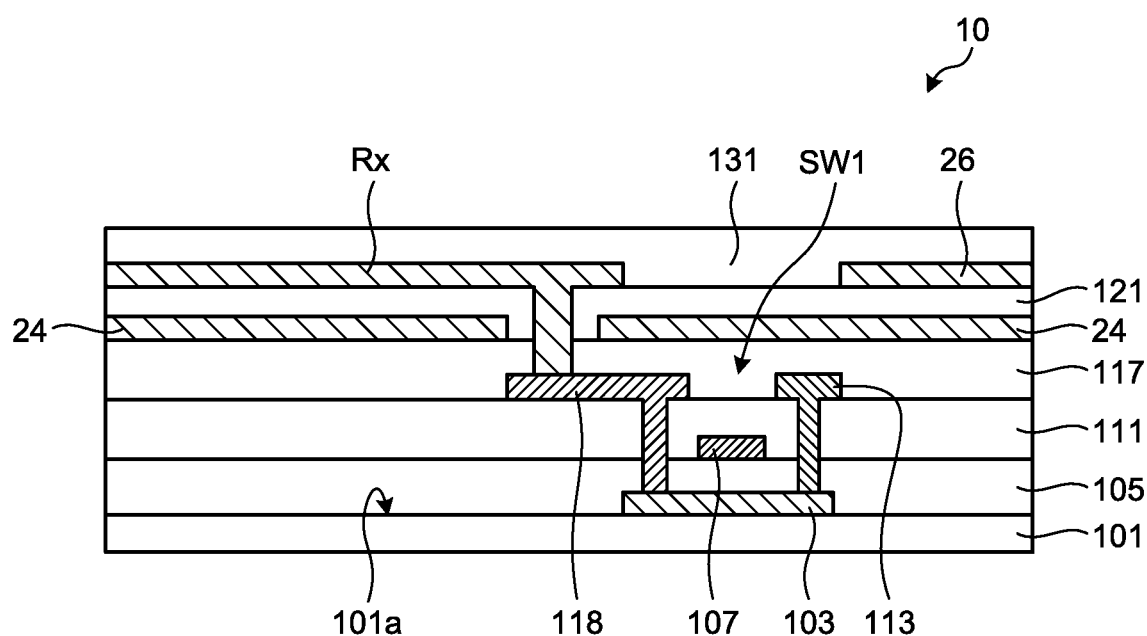
FIG. 7 is a sectional view of a configuration example of a substrate of the detection apparatus.

FIG. 7 is a sectional view of a configuration example of a substrate of the detection apparatus. FIG. 7 is a diagram of part of a section obtained by cutting FIG. 8, which will be described later, along an A11-A12 line. The sensor 1 described above is provided on a substrate 10. As illustrated in FIG. 7, the substrate 10 has the base member 101, a semiconductor layer 103, an insulating film 105, a gate electrode 107, a wiring layer 109, an insulating film 111, a source electrode 113, a drain electrode 118, an insulating film 117, the shield layer 24, an insulating film 121, the detection electrode Rx, the conductor 26, and a protective film 131.

The semiconductor layer 103 is provided on the one face 101a of the base member 101. The insulating film 105 is provided on the base member 101 to cover the semiconductor layer 103. An upper face of the insulating film 105 is flattened.

The gate electrode 107 is provided on the insulating film 105. The insulating film 111 is provided on the insulating film 105 to cover the gate electrode 107. An upper face of the insulating film 111 is flattened.

Through holes bottomed by the semiconductor layer 103 are provided in the insulating film 111 and the insulating film 105. The source electrode 113 and the drain electrode 118 are provided on the insulating film 111. The source electrode 113 and the drain electrode 118 are individually coupled to the semiconductor layer 103 via the through holes provided in the insulating film 111 and the insulating film 105.

The insulating film 117 is provided on the insulating film 111 to cover the source electrode 113 and the drain electrode 118. An upper face of the insulating film 117 is flattened. The shield layer 24 is provided on the insulating film 117. The insulating film 121 is provided on the insulating film 117 to cover the shield layer 24. An upper face of the insulating film 121 is flattened. A through hole bottomed by the drain electrode 118 is provided in the insulating film 117 and the insulating film 121. The detection electrode Rx is provided on the insulating film 121. The detection electrode Rx is coupled to the drain electrode 118 via the through hole provided in the insulating film 121 and the insulating film 117. The conductor 26 is provided on the insulating film 121. The protective film 131 is provided on the insulating film 121 to cover the detection electrode Rx and the conductor 26.

The following describes examples of the materials of the respective films laminated on the base member 101. The insulating film 105, the insulating film 111, the insulating film 117, and the insulating film 121 are formed of inorganic films such as a silicon oxide film, a silicon nitride film, and a silicon oxide nitride film. Any one of the insulating film 105, the insulating film 111, the insulating film 117, and the insulating film 121 may be an organic insulating film. The insulating film 105, the insulating film 111, the insulating film 117, and the insulating film 121 are each not limited to a single layer and may be each a film with a laminated structure. The insulating film 105 may be a film with a laminated structure in which a silicon nitride film is formed on a silicon oxide film, for example.

The semiconductor layer 103 is formed of any of an amorphous silicon film, a polysilicon film, and an oxide semiconductor film, for example. The gate electrode 107 is formed of aluminum (Al), copper (Cu), silver (Ag), molybdenum (Mo), or an alloy film thereof. The source electrode 113 and the drain electrode 118 are each formed of a titanium-aluminum (TiAl) film as an alloy of titanium and aluminum. The shield layer 24, the detection electrode Rx, and the conductor 26 are each formed of a conductor film that allows visible light to pass therethrough. In the following, the property that allows visible light to pass will be referred to as translucency. Examples of the conductor film with translucency include an indium tin oxide (ITO) film. The detection electrode Rx and the conductor 26 may be formed of metallic thin lines having mesh-like openings. The protective film 131 is a passivation film, for example. The protective film 131 is an insulating film, for example, and is formed of a film of an inorganic material such as a silicon nitride film or a resin film. The protective film 131 corresponds to the protective layer 33 illustrated in FIG. 4. The protective film 131 and the protective layer 33 may be separate layers and may be formed of different materials.

Although the gate electrode 107 has a top gate structure, in which it is arranged above the semiconductor layer 103, but its structure is not limited thereto; the gate electrode 107 may have a bottom gate structure, in which it is arranged below the semiconductor layer 103. The detection apparatus 100 does not necessarily have the shield layer 24 and the insulating film 121.

Figure 8:
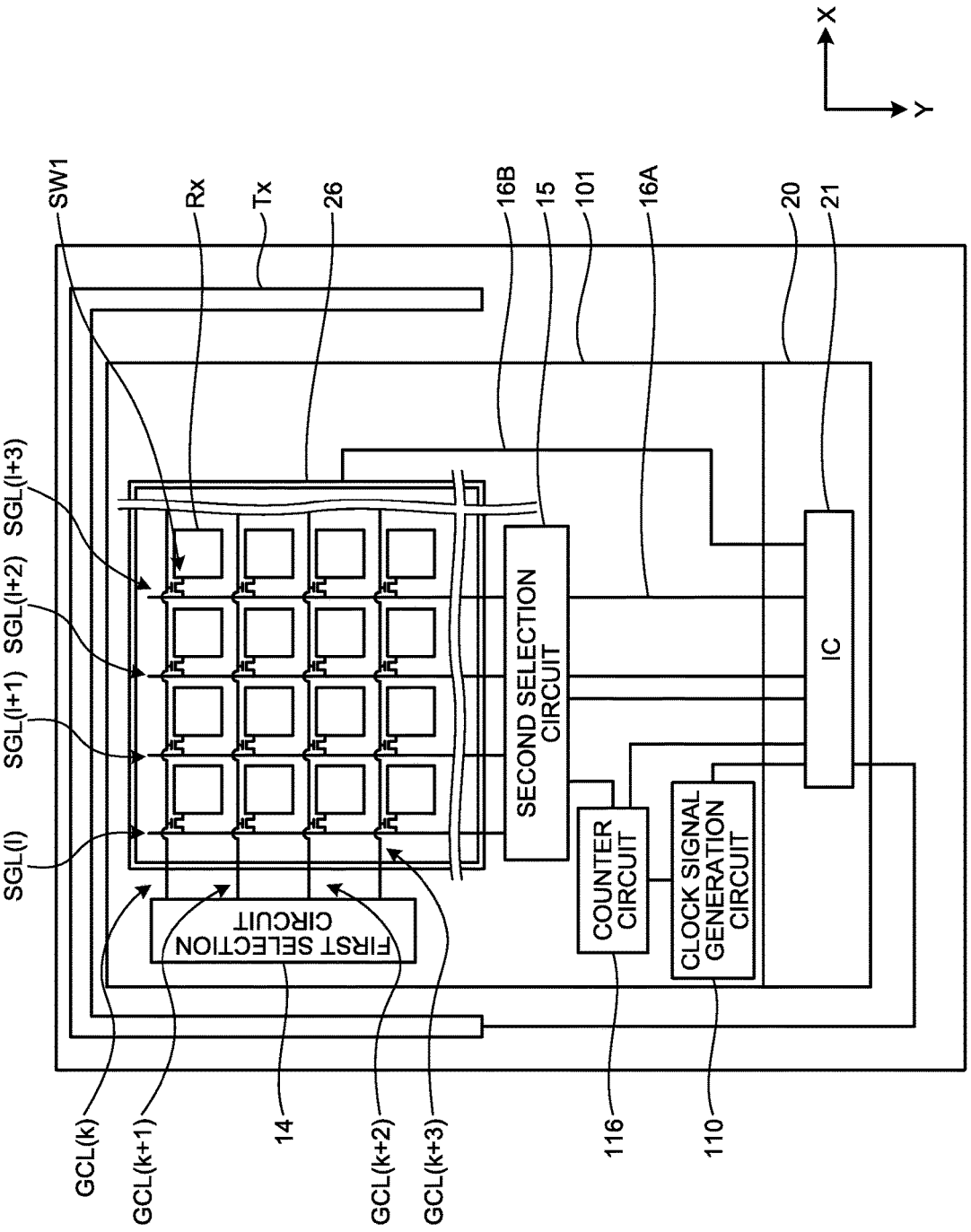
FIG. 8 is a plan view of a configuration example of the detection apparatus.

FIG. 8 is a plan view of a configuration example of the detection apparatus. As illustrated in FIG. 8, the detection apparatus 100 includes the substrate 10, a first circuit board 20, and a second circuit board 30. The substrate 10 and the first circuit board 20 are arranged on one face 30a of the second circuit board 30, for example. The first circuit board 20 is a flexible board, for example. The second circuit board 30 is a rigid board such as a printed circuit board (PCB), for example. The first circuit board 20 couples the substrate 10 and the second circuit board 30 to each other.

As illustrated in FIG. 8, the substrate 10 is provided with the sensor 1, for example, the clock signal generation circuit 110, and the counter circuit 116. The counter circuit 116 includes the first selection circuit 14 and the second selection circuit 15. The detection electrodes Rx included in the sensor 1 are coupled to the first selection circuit 14 via the scan lines GCL. The detection electrodes Rx included in the sensor 1 are coupled to an input side of the second selection circuit 15 via the data lines SGL. The counter circuit 116 is coupled to the first selection circuit 14, the second selection circuit 15, and the clock signal generation circuit 110 via wiring. The first selection circuit 14 is arranged between the detection electrodes Rx and the detection electrode Tx. The conductor 26 is arranged between the first selection circuit 14 and the detection electrodes Rx.

The first circuit board 20 is provided with an IC 21. An output side of the second selection circuit 15 is coupled to a plurality of terminals of the IC 21 via a plurality of wiring lines 16A. The conductor 26 is coupled to one terminal of the IC 21 via a wiring line 16B. The counter circuit 116 is coupled to the IC 21 via wiring. The clock signal generation circuit 110 is coupled to the IC 21 via wiring.

On the one face 30a of the second circuit board 30, the detection electrode Tx is provided. The clock signal generation circuit 110 is coupled to the detection electrode Tx via the IC 21 and wiring on the second circuit board 30. The detection electrode Tx may be of a ring shape surrounding the sensor 1 or, as illustrated in FIG. 8, may be of a shape lacking part of the ring surrounding the sensor 1. The detection electrode Tx may be of a shape lacking one side out of four sides in a rectangular ring surrounding the sensor 1, for example. The detection electrode Tx may be arranged so as not to overlap, in a plan view, the data lines SGL that couple the sensor 1 to the second selection circuit 15, for example. The detection electrode Tx may be arranged so as not to overlap, in a plan view, the wiring lines 16A that couple the second selection circuit 15 to the IC 21. With this arrangement, the drive signal Vs to be supplied to the detection electrode Tx can be inhibited from having an influence on the data lines SGL or the wiring lines 16A, and thus noise, which would otherwise be caused, can be suppressed.

At least partial components of the detection control circuit 11 and at least partial components of the detection circuit 40 illustrated in FIG. 1 are included in the IC 21. Among the various components of the detection circuit 40 illustrated in FIG. 1, the detection signal amplifier circuit 42, the A/D conversion circuit 43, the signal computing circuit 44, the coordinates extraction circuit 45, the combination circuit 46, the detection timing control circuit 47, and the storage circuit 48 are included in the IC 21, for example. Among the various components of the detection control circuit 11 illustrated in FIG. 1, the clock signal generation circuit 110 is included in the IC 21. At least partial components of the detection circuit 40 illustrated in FIG. 1 are formed on the substrate 10. Among the various kinds of components of the detection control circuit 11 illustrated in FIG. 1, the counter circuit 116 and the clock signal generation circuit 110 are formed on the substrate 10, for example. The IC 21 may have a protective circuit as a circuit to be coupled to the clock signal generation circuit 110 and the detection electrode Tx. The protective circuit, for example, is a diode that prevents the sensor 1 from electro-static discharge (ESD), which would otherwise be conveyed to the sensor 1 from the detection electrode Tx through the IC 21.

At least partial components of the detection control circuit 11 illustrated in FIG. 1 may be included in the first selection circuit 14. The first control circuit 114 may be included in the first selection circuit 14, for example. At least partial components of the detection control circuit 11 or at least partial components of the detection circuit 40 illustrated in FIG. 1 may be included in an IC provided separately from the IC 21 and arranged on the second circuit board 30. The protective circuit may be provided on the second circuit board 30 and coupled to the clock signal generation circuit 110 and the detection electrode Tx not through the IC 21, for example. At least partial components of the detection control circuit 11 and the detection circuit 40 may be included in a central processing unit (CPU) arranged on an external substrate coupled to the second circuit board 30. The substrate 10 may have an integrated circuit not illustrated. In this case, at least partial components of the detection control circuit 11 or at least partial components of the detection circuit 40 illustrated in FIG. 1 may be included in the integrated circuit of the substrate 10. Among the various kinds of components of the detection circuit 40, the detection signal amplifier circuit 42 may be included in the integrated circuit of the substrate 10, for example.

Figure 9:
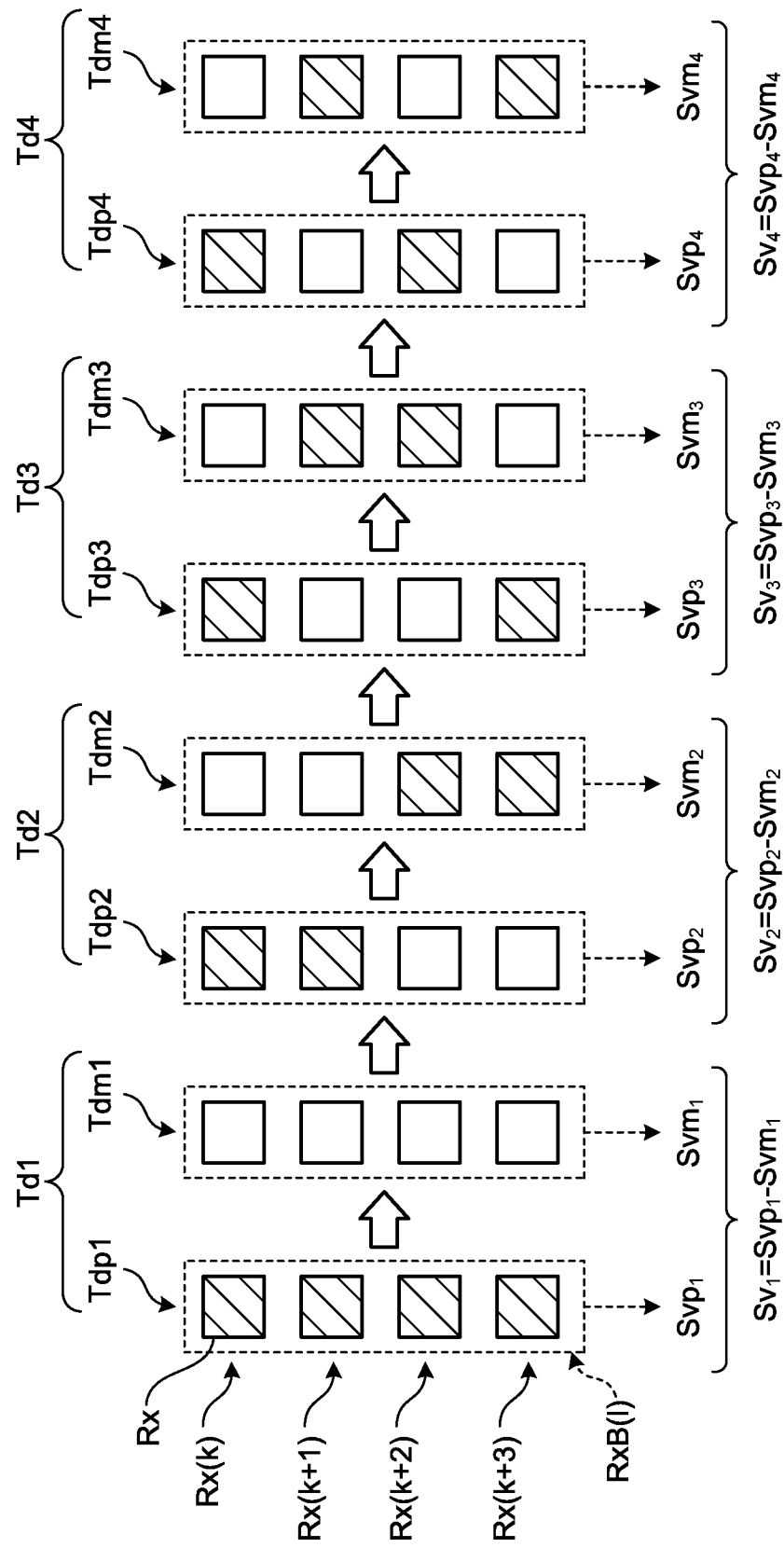
FIGS. 9A to 9D are diagrams illustrating selection patterns of detection electrodes by sign selection driving.
Figure 10:
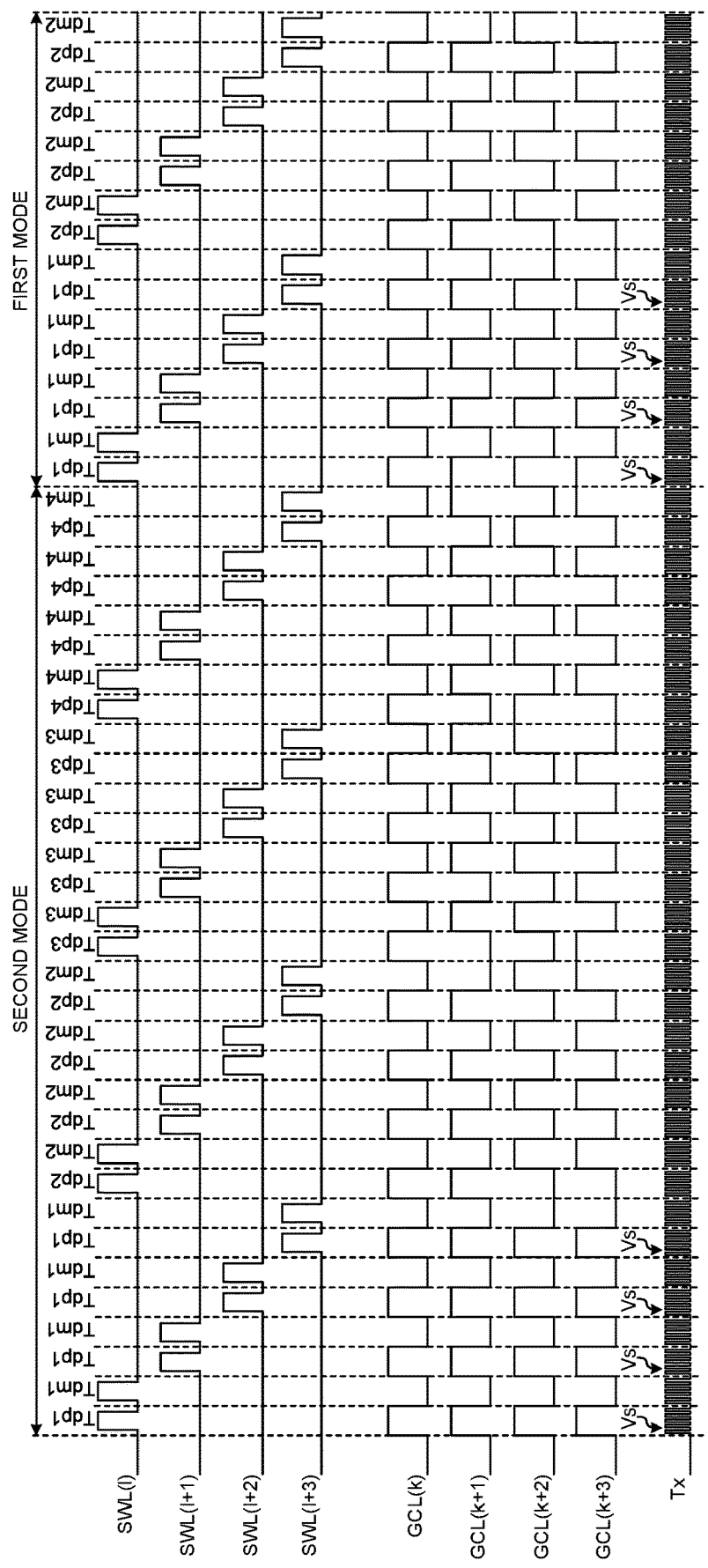
FIG. 10 is a timing waveform diagram of an operation example of the detection apparatus according to the first embodiment.

The following describes a method for detecting a fingerprint by the detection apparatus 100. The detection apparatus 100 performs sign selection driving for the detection electrode block RxB including a plurality of detection electrodes Rx to detect a fingerprint. The sign selection driving is a detection operation based on a certain sign. FIGS. 9A to 9D are diagrams illustrating selection patterns of detection electrodes by the sign selection driving. FIG. 9A illustrates a selection pattern of the detection electrodes Rx in a detection operation Td1. FIG. 9B illustrates a selection pattern of the detection electrodes Rx in a detection operation Td2. FIG. 9C illustrates a selection pattern of the detection electrodes Rx in a detection operation Td3. FIG. 9D illustrates a selection pattern of the detection electrodes Rx in a detection operation Td4. FIG. 10 is a timing waveform diagram of an operation example of the detection apparatus according to the first embodiment.

The following first describes performing the sign selection driving for one detection electrode block RxB(1). As illustrated in FIGS. 9A to 9D, the detection electrode block RxB(1) includes n detection electrodes Rx arranged in the column direction (the Y direction). The n is an integer equal to or greater than 1 and, in the first embodiment, n is 4. The n is a value equal to or less than the order d of a square matrix Hv as the certain sign; in the first embodiment, n is equal to the order d of the square matrix Hv and is 4. The four detection electrodes Rx are coupled, via the switch elements SW1, to the data line SGL(1) (refer to FIG. 3) shared among the four detection electrodes Rx. In addition, the n detection electrodes Rx are coupled to the respective n scan lines GCL. The detection control circuit 11 supplies the drive signal Vs to the detection electrode Tx. The first selection circuit 14 supplies a scan signal to a scan line GCL corresponding to a detection electrode Rx selected from the first detection electrode block RxB(1) and turns on a switch element SW1 corresponding to the selected detection electrode Rx (a first selection target). With this operation, the selected detection electrode Rx is coupled to the data line SGL(1), and the detection signal Sv is output to the second selection circuit 15 from the data line SGL(1).

When the certain sign is the square matrix Hv and a g-th element on an f-th row as any element thereof is $Hvf_g$, the relation between a detection signal Scf output in an f-th detection operation Td based on the square matrix Hv and a detection signal $Si_g$ output from a g-th detection electrode Rx included in the detection electrode block RxB is represented by Expression (1) below. As described in Expression (1), a value obtained by integrating the detection signals $Si_g$ of the selected detection electrodes Rx is output as the detection signal Sv. That is to say, the detection signal Scf is represented by the sum of the detection signals $Si_g$ output from the selected detection electrodes Rx. The f and g are each an integer equal to or greater than 1, for example.

$$Sc_f = \sum_{g=1}^{n} Hv_{fg} Si_g \qquad (1)$$

A detection signal Sc is determined by computing signals output from the detection electrodes Rx selected from the detection electrode block RxB(1) based on the certain sign. The certain sign is defined by the square matrix Hv, for example. The square matrix Hv is a Walsh Hadamard matrix and is a square matrix including "1" or "−1" as its elements, and any different two rows therein form an orthogonal matrix. The Walsh Hadamard matrix is an Hadamard matrix in which rows are arranged in ascending order of the number of times of sign changes from one row (the topmost row) consisting of elements of a positive sign "1" toward another row (a lower row). The order d of the square matrix Hv is indicated by $2^{Na}$. The Na is an integer equal to or greater than 1 and is 2 as described by Expression (2) below in the first embodiment. The order of an Hadamard matrix indicates the number of elements in the vertical direction of the matrix, for example. In the detection electrode block RxB(1), selection of the detection electrodes Rx is performed based on the positive and negative signs of the square matrix Hv as the Walsh Hadamard matrix, for example. Consequently, the detection signal Sv output from the selected detection electrodes Rx of the detection electrode block RxB(1) is determined by the positive and negative signs of the Walsh Hadamard matrix. The detection signal Sv output from the detection electrode block RxB(1) corresponds to the number of a plurality of detection electrodes Rx as the first selection targets in a first selection operation and the arrangement of the detection electrodes Rx as the first selection targets.

$$Hv = \begin{pmatrix} 1 & 1 & 1 & 1 \\ 1 & 1 & -1 & -1 \\ 1 & -1 & -1 & 1 \\ 1 & -1 & 1 & -1 \end{pmatrix} \quad (2)$$

The order d of the square matrix Hv is greater than the number n of the detection electrodes Rx included in the detection electrode block RxB(1). In the first embodiment, the order d of the square matrix Hv and the number n of the detection electrodes Rx included in the detection electrode block RxB(1) are equal and are 4.

The following describes an example of the sign selection driving by dividing it into four detection operations: the detection operation Td1, the detection operation Td2, the detection operation Td3, and the detection operation Td4 as illustrated in FIG. 9A to FIG. 9D. The detection operation Td1, the detection operation Td2, the detection operation Td3, and the detection operation Td4 include positive sign selection operations Tdp1, Tdp2, Tdp3, and Tdp4, respectively, and negative sign selection operations Tdm1, Tdm2, Tdm3, and Tdm4, respectively. In the following description, when there is no need to separately describe the positive sign selection operations Tdp1, Tdp2, Tdp3, and Tdp4, they will be referred to simply as a positive sign selection operation Tdp. When there is no need to separately describe the detection operation Td1, the detection operation Td2, the detection operation Td3, and the detection operation Td4, they will be referred to as a detection operation Td. Similarly, when there is no need to separately describe the negative sign selection operations Tdm1, Tdm2, Tdm3, and Tdm4, they will be referred to simply as a negative sign selection operation Tdm. The positive sign selection operation corresponds to "a first selection operation" of the present disclosure. The negative sign selection operation corresponds to "a second selection operation" of the present disclosure.

As illustrated in FIG. 10, the positive sign selection operation Tdp and the negative sign selection operation Tdm are successively performed. The positive sign selection operation Tdp and the negative sign selection operation Tdm are alternately performed. In the first embodiment, in the positive sign selection operation Tdp performed in a first period, the detection control circuit 11 (refer to FIG. 1) selects the detection electrodes Rx as the first selection targets in accordance with the selection signal Vgclp corresponding to the elements "1" of the square matrix Hv. The detection control circuit 11 selects the detection electrodes Rx as second selection targets that are not included in the detection electrodes Rx as the first selection targets among the detection electrodes Rx. The detection control circuit 11 supplies the selection signal Vgclp to the first selection circuit 14 (refer to FIG. 1), and the first selection circuit 14 supplies a scan signal based on the selection signal Vgclp to the scan line GCL (refer to FIG. 3).

With this operation, the detection electrodes Rx as the first selection targets are caused to be a coupled state with respect to the detection circuit 40 (refer to FIG. 1), whereas the detection electrodes Rx as the second selection targets are caused to be a non-coupled state with respect to the detection circuit 40. The coupled state refers to a state in which the selected detection electrodes Rx are coupled to the detection circuit 40 via the data lines SGL and the second selection circuit 15 (refer to FIG. 1). The non-coupled state refers to a state in which the selected detection electrodes Rx are not coupled to the detection circuit 40. In FIGS. 9A to 9D, to easily distinguish the first selection targets and the second selection targets from each other, the detection electrodes Rx as the first selection targets are hatched.

A detection signal Svp is output to the detection circuit 40 from the detection electrode Rx via one data line SGL and the second selection circuit 15. The detection signal Svp is a signal obtained by integrating detection signals Si output from the detection electrodes Rx as the first selection targets in accordance with the selection signal Vgclp. As described above, the selection signal Vgclp corresponds to the element "1" of the square matrix Hv.

In the negative sign selection operation Tdm performed in a second period different from the first period, the detection control circuit 11 selects the detection electrodes Rx as the first selection targets in accordance with the selection signal Vgclm corresponding to the elements "−1" of the square matrix Hv. The detection control circuit 11 selects the detection electrodes Rx as the second selection targets that are not included in the detection electrodes Rx as the first selection targets among the detection electrodes Rx. The detection control circuit 11 supplies the selection signal Vgclm to the first selection circuit 14 (refer to FIG. 1), and the first selection circuit 14 supplies a scan signal based on the selection signal Vgclm to the scan line GCL (refer to FIG. 3). With this operation, the detection electrodes Rx as the first selection targets are in the coupled state, whereas the detection electrodes Rx as the second selection targets are in the non-coupled state. In one detection operation Td, the detection electrodes Rx as the first selection targets in the positive sign selection operation Tdp correspond to the detection electrodes Rx as the second selection targets in the negative sign selection operation Tdm. That is to say, in one detection operation Td, the negative sign selection operation Tdm is an operation with selection patterns obtained by inverting the selection patterns of the detection electrodes Rx of the positive sign selection operation Tdp.

A detection signal Svm is output to the detection circuit 40 from the detection electrode Rx via one data line SGL and the second selection circuit 15. The detection signal Svm is a signal obtained by integrating the detection signals Si output from the detection electrodes Rx as the first selection targets selected in accordance with the selection signal Vgclm. As described above, the selection signal Vgclm corresponds to the element "−1" of the square matrix Hv.

The signal computing circuit 44 of the detection circuit 40 (refer to FIG. 1) computes the difference between the detection signal Svp and the detection signal Svm to calculate the detection signal Sc. More specifically, the signal computing circuit 44 subtracts the detection signal Svm from the detection signal Svp to output the detection signal Sc. The signal computing circuit 44 outputs the detection signal Sc to the storage circuit 48 to temporarily store therein the detection signal Sc. In other words, a matrix ScX consisting of the detection signals Sc of all the detection operations Td is equal to HvSiX obtained by multiplying the square matrix Hv by a matrix SiX consisting of the detection signals Si output from all the detection electrodes Rx included in the detection electrode block RxB. HvSiX is equal to a result of subtraction of HvmSiX from HvpSiX, HvmSiX being obtained by multiplying a square matrix Hvm by the matrix SiX, HvpSiX being obtained by multiplying a square matrix Hvp by the matrix SiX. The square matrix Hvm is a matrix obtained by replacing the elements "1" in the square matrix Hv with 0 and the elements "−1" therein with "1", and the square matrix Hvp is a matrix obtained by replacing the elements "−1" in the square matrix Hv with 0. HvpSiX corresponds to a matrix SvpX of detection signals Svp detected by all the positive sign selection operations Tdp. HvmSiX corresponds to a matrix SvmX of detection signals Svm detected by all the negative sign selection operations Tdm.

When the order d of the square matrix Hv is 4, as described in Expression (3) below, four detection signals Sc ($Sc_1$, $Sc_2$, $Sc_3$, $Sc_4$) are obtained from one detection electrode block RxB. In this case, the detection signals Sc ($Sc_1$, $Sc_2$, $Sc_3$, $Sc_4$) are each determined from four detection signals Svp ($Svp_1$, $Svp_2$, $Svp_3$, $Svp_4$) and four detection signals Svm ($Svm_1$, $Svm_2$, $Svm_3$, $Svm_4$).

$$ScX = \begin{pmatrix} Sc_1 \\ Sc_2 \\ Sc_3 \\ Sc_4 \end{pmatrix} = \begin{pmatrix} 1 & 1 & 1 & 1 \\ 1 & 1 & -1 & -1 \\ 1 & -1 & -1 & 1 \\ 1 & -1 & 1 & -1 \end{pmatrix} \begin{pmatrix} Si_1 \\ Si_2 \\ Si_3 \\ Si_4 \end{pmatrix} \quad (3)$$

$$= HvSiX$$

$$= \begin{pmatrix} 1 & 1 & 1 & 1 \\ 1 & 1 & 0 & 0 \\ 1 & 0 & 0 & 1 \\ 1 & 0 & 1 & 0 \end{pmatrix} \begin{pmatrix} Si_1 \\ Si_2 \\ Si_3 \\ Si_4 \end{pmatrix} - \begin{pmatrix} 0 & 0 & 0 & 0 \\ 0 & 0 & 1 & 1 \\ 0 & 1 & 1 & 0 \\ 0 & 1 & 0 & 1 \end{pmatrix} \begin{pmatrix} Si_1 \\ Si_2 \\ Si_3 \\ Si_4 \end{pmatrix}$$

$$= HvpSiX - HvmSiX$$

$$= \begin{pmatrix} Svp_1 \\ Svp_2 \\ Svp_3 \\ Svp_4 \end{pmatrix} - \begin{pmatrix} Svm_1 \\ Svm_2 \\ Svm_3 \\ Svm_4 \end{pmatrix}$$

$$= SvpX - SvmX$$

The following description describes a case in which the detection signals Si are ($Si_1$, $Si_2$, $Si_3$, $Si_4$)=(1, 3, 2, 7) as an example. The detection signal $Si_1$ is a signal output from a detection electrode Rx(k). The detection signal $Si_2$ is a signal output from a detection electrode Rx(k+1). The detection signal $Si_3$ is a signal output from a detection electrode Rx(k+2). The detection signal $Si_4$ is a signal output from a detection electrode Rx(k+3). In the sensor 1, one detection signal Sv obtained by integrating the detection signals $Si_1$, $Si_2$, $Si_3$, and $Si_4$ is output from one detection electrode block RxB. The detection circuit 40 calculates the individual detection signals Si by operations below.

As illustrated in FIG. 9A, in the positive sign selection operation Tdp1 of the detection operation Td1, the detection control circuit 11 (refer to FIG. 1) selects four detection electrodes Rx(k), Rx(k+1), Rx(k+2), and Rx(k+3) as the first selection targets corresponding to the elements "1" on the first row of the square matrix Hv. With this operation, the detection electrodes Rx(k), Rx(k+1), Rx(k+2), and Rx(k+3) become the coupled state. The detection electrodes Rx as the second selection targets are not selected. In this process, the detection control circuit 11 supplies the drive signal Vs to the detection electrode Tx, and the detection signal $Svp_1$ is output from the detection electrode block RxB(1). The detection signal $Svp_1$ is a signal value obtained by integrating the detection signals Si output from the detection electrodes Rx as the first selection targets in the positive sign selection operation Tdp1. From Expression (3), the detection signal $Svp_1$ is $Svp_1$=1×1+1×7+1×3+1×2=13.

In the negative sign selection operation Tdm1 of the detection operation Td1, there are no elements "−1" on the first row of the square matrix Hv, therefore, the detection control circuit 11 does not select any detection electrodes Rx as the first selection targets corresponding to the element "−1". The detection control circuit 11 selects the four detection electrodes Rx(k), Rx(k+1), Rx(k+2), and Rx(k+3) as the second selection targets. In this process, the detection control circuit 11 supplies the drive signal Vs to the detection electrode Tx, and the detection signal $Svm_1$ is output from the detection electrode block RxB(1). The detection signal $Svm_1$ is a signal value obtained by integrating the detection signals Si output from the detection electrodes Rx as the first selection targets in the negative sign selection operation Tdm1. As described above, in the negative sign selection operation Tdm1, no detection electrodes Rx are selected as the first selection targets. Consequently, the detection signal $Svm_1$ is $Svm_1$=0×1+0×7+0×3+0×2=0. The detection signal $Sc_1$ is the difference between the detection signal $Svp_1$ and the detection signal $Svm_1$, and $Sc_1$=$Svp_1$−$Svm_1$=13−0=13 is obtained.

Next, as illustrated in FIG. 9B, in the positive sign selection operation Tdp2 of the detection operation Td2, the detection control circuit 11 selects the detection electrodes Rx(k) and Rx(k+1) as the first selection targets corresponding to the elements "1" on the second row of the square matrix Hv and brings them into the coupled state. The detection control circuit 11 selects the detection electrodes Rx(k+2) and Rx(k+3) as the second selection targets and brings them into the non-coupled state. In this process, the detection control circuit 11 supplies the drive signal Vs to the detection electrode Tx, and the detection signal is output from the detection electrode block RxB(1). From Expression (3), the detection signal $Svp_2$ is $Svp_2$=1×1+1×7+0×3+0×2=8.

In the negative sign selection operation Tdm2 of the detection operation Td2, the detection control circuit 11 selects the detection electrodes Rx(k+2) and Rx(k+3) as the first selection targets corresponding to the elements "−1" on the second row of the square matrix Hv and brings them into the coupled state. The detection control circuit 11 selects the detection electrodes Rx(k) and Rx(k+1) as the second selection targets and brings the detection electrodes Rx(k) and Rx(k+1) into the non-coupled state. In this process, the detection control circuit 11 supplies the drive signal Vs to the detection electrode Tx, and the detection signal $Svm_2$ is output from the detection electrode block RxB(1). The detection signal $Svm_2$ is $Svm_2$=0×1+0×7+1×3+1×2=5. The detection signal $Sc_2$ is the difference between the detection signal $Svp_2$ and the detection signal $Svm_2$, and $Sc_2$=$Svp_2$−$Svm_2$=8−5=3 is obtained.

Next, as illustrated in FIG. 9C, in the positive sign selection operation Tdp3 of the detection operation Td3, the detection control circuit 11 selects the detection electrodes Rx(k) and Rx(k+3) as the first selection targets corresponding to the elements "1" on the third row of the square matrix Hv and brings them into the coupled state. The detection control circuit 11 selects the detection electrodes Rx(k+1)

and Rx(k+2) as the second selection targets and brings them into the non-coupled state. In this process, the detection control circuit 11 supplies the drive signal Vs to the detection electrode Tx, and the detection signal $Svp_3$ is output from the detection electrode block RxB(1). From Expression (3), the detection signal $Svp_3$ is $Svp_3=1\times1+0\times7+0\times3+1\times2=3$.

In the negative sign selection operation Tdm3 of the detection operation Td3, the detection control circuit 11 selects the detection electrodes Rx(k+1) and Rx(k+2) as the first selection targets corresponding to the elements "−1" on the third row of the square matrix Hv and brings them into the coupled state. The detection control circuit 11 selects the detection electrodes Rx(k) and Rx(k+3) as the second selection targets and brings them into the non-coupled state. In this process, the detection control circuit 11 supplies the drive signal Vs to the detection electrode Tx, and the detection signal $Svm_3$ is output from the detection electrode block RxB(1). The detection signal $Svm_3$ is $Svm_3=0\times1+1\times7+1\times3+0\times2=10$. The detection signal $Sc_3$ is the difference between the detection signal $Svp_3$ and the detection signal $Svm_3$, and $Sc_3=Svp_3-Svm_3=3-10=-7$ is obtained.

Next, as illustrated in FIG. 9D, in the positive sign selection operation Tdp4 of the detection operation Td4, the detection control circuit 11 selects the detection electrodes Rx(k) and Rx(k+2) as the first selection targets corresponding to the elements "1" on the fourth row of the square matrix Hv and brings them into the coupled state. The detection control circuit 11 selects the detection electrodes Rx(k+1) and Rx(k+3) as the second selection targets and brings them into the non-coupled state. In this process, the detection control circuit 11 supplies the drive signal Vs to the detection electrode Tx, and the detection signal $Svp_4$ is output from the detection electrode block RxB(1). From Expression (3), the detection signal $Svp_4$ is $Svp_4=1\times1+0\times7+1\times3+0\times2=4$.

In the negative sign selection operation Tdm4 of the detection operation Td4, the detection control circuit 11 selects the detection electrodes Rx(k+1) and Rx(k+3) as the first selection targets corresponding to the elements "−1" on the fourth row of the square matrix Hv and brings them into the coupled state. The detection control circuit 11 selects the detection electrodes Rx(k) and Rx(k+2) as the second selection targets and brings them into the non-coupled state. In this process, the detection control circuit 11 supplies the drive signal Vs to the detection electrode Tx, and the detection signal $Svm_4$ is output from the detection electrode block RxB(1). The detection signal $Svm_4$ is $Svm_4=0\times1+1\times7+1\times3+0\times2=10$. The detection signal $Sc_4$ is the difference between the detection signal $Svp_4$ and the detection signal $Svm_4$, and $Sc_4=Svp_4-Svm_4=4-9=-5$ is obtained.

The signal computing circuit 44 successively calculates the detection signals Sc from the detection signals Svp and the detection signals Svm and successively outputs the detection signals Sc ($Sc_1$, $Sc_2$, $Sc_3$, $Sc_4$)=(13, 3, −7, −5) to the storage circuit 48. The signal computing circuit 44 may store the four detection signals $Svp_1$, $Svp_2$, $Svp_3$, and $Svp_4$ and the four detection signals $Svm_1$, $Svm_2$, $Svm_3$, and $Svm_4$ separately in the storage circuit 48 and perform computation of the four third detection signals $Sc_1$, $Sc_2$, $Sc_3$, and $Sc_4$ after the detections of all the periods are performed.

The signal computing circuit 44 multiplies the square matrix Hv by the matrix ScX consisting of the detection signals Sc corresponding to all the detection operations Td to obtain a matrix SidX. The matrix SidX is a matrix consisting of decoded detection signals Sid obtained by multiplying the detection signals Si of the respective detection electrodes Rx by the order d of the square matrix Hv. Specifically, the detection signals Sc ($Sc_1$, $Sc_2$, $Sc_3$, $Sc_4$)= (13, 3, −7, −5) are decoded by Expression (4) below. The signal computing circuit 44 calculates the decoded detection signals Sid ($Si_1d$, $Si_2d$, $Si_3d$, $Si_4d$)=(4, 12, 8, 28) based on Expression (4).

$$SidX = \begin{pmatrix} Si_1d \\ Si_2d \\ Si_3d \\ Si_4d \end{pmatrix} = \begin{pmatrix} 1 & 1 & 1 & 1 \\ 1 & 1 & -1 & -1 \\ 1 & -1 & -1 & 1 \\ 1 & -1 & 1 & -1 \end{pmatrix} \begin{pmatrix} Sc_1 \\ Sc_2 \\ Sc_3 \\ Sc_4 \end{pmatrix} = HvScX \quad (4)$$

The decoded detection signal $Si_1d$ is assigned to the detection electrode Rx(k). The decoded detection signal $Si_2d$ is assigned to the detection electrode Rx(k+1). The decoded detection signal $Si_3d$ is assigned to the detection electrode Rx(k+2). The decoded detection signal $Si_4d$ is assigned to the detection electrode Rx(k+3). When the recess or protrusion of a finger Fin is in contact with or proximity to the detection apparatus, the value of the decoded detection signal Sid of the detection electrode Rx corresponding to the contact or proximity position changes.

In the sign selection driving described above, the signal computing circuit 44 performs the decoding processing using Expression (4) for the detection signals Si ($Si_1$, $Si_2$, $Si_3$, $Si_4$)=(1, 3, 2, 7), and thus the decoded detection signals Sid ($Si_1d$, $Si_2d$, $Si_3d$, $Si_4d$)=(4, 12, 8, 28) can be obtained. As can be seen from a comparison between the detection signals Si and the decoded detection signals Sid, the decoded detection signals Sid are the quadruple of the detection signals Si in signal intensity. That is to say, the signal intensity can be obtained four times as great as that obtained by time-division selection driving, without increasing the voltage of the drive signal Vs. The detection signal Sc is determined from the difference between the detection signal Svp and the detection signal Svm, and even when noise comes in from the outside, a noise component of the detection signal Svp and a noise component of the detection signal Svm are cancelled out. With this operation, the resistance to noise in the detection apparatus 100 can be improved.

In the first embodiment, the detection control circuit 11 switches between the coupled state and the non-coupled state for the detection electrodes Rx as the first selection targets selected based on the certain sign and the detection electrodes Rx as the second selection targets that are not included in the first selection targets. The detection circuit 40 performs decoding processing on the detection signals output from the detection electrodes Rx for each of different selection patterns of the detection electrodes Rx.

FIG. 10 is a timing waveform diagram of an operation example of the detection apparatus according to the first embodiment. As illustrated in FIG. 10, the positive sign selection operation Tdp and the negative sign selection operation Tdm included in one detection operation Td1 are successively performed. The positive sign selection operation Tdp and the negative sign selection operation Tdm are alternately performed. For one detection electrode block RxB(1) (refer to FIGS. 11A to 11E), the positive sign selection operation Tdp1, the negative sign selection operation Tdm1, the positive sign selection operation Tdp2, the negative sign selection operation Tdm2, the positive sign selection operation Tdp3, the negative sign selection operation Tdm3, the positive sign selection operation Tdp4, and the negative sign selection operation Tdm4 are successively performed in this order, for example. The positive sign selection operation Tdp and the negative sign selection operation Tdm are performed at different timings. This hinders capacitive coupling between detection electrodes, and favorable detection sensitivity can be achieved.

The following describes performing the sign selection driving for a plurality of detection electrode blocks RxB(l), RxB(l+1), RxB(l+2), and RxB(l+3). FIG. 11A to FIG. 14B are diagrams of selection patterns of detection electrodes by the sign selection driving for a plurality of detection electrode blocks.

As illustrated in FIG. 11A to FIG. 14B, the four detection electrode blocks RxB(l), RxB(l+1), RxB(l+2), and RxB(l+3) each have four detection electrodes Rx(k), Rx(k+1), Rx(k+2), and Rx(k+3) arranged in the column direction. The four detection electrode blocks RxB(l), RxB(l+1), RxB(l+2), and RxB(l+3) are arranged at regular intervals in the row direction.

The n detection electrodes Rx included in one detection electrode block RxB are coupled to one data line SGL via the switch elements SW1. The four detection electrodes Rx included in the detection electrode block RxB(l) are coupled to the data line SGL(l) via the switch elements SW1, for example. Similarly, the four detection electrodes Rx included in the detection electrode blocks RxB(l+1), RxB(l+2), and RxB(l+3) are coupled to the data lines SGL(l+1), SGL(l+2), and SGL(l+3), respectively, via the switch elements SW1. In the following description, when there is no need to separately describe the detection electrode blocks RxB(l), RxB(l+1), RxB(l+2), and RxB(l+3), they will be referred to simply as a detection electrode block RxB.

The second selection circuit 15 includes four switch elements SW2(l), SW2(l+1), SW2(l+2), and SW2(l+3), for example. The switch element SW2(l) is turned on and off to couple and uncouple the data line SGL(l) to and from the detection circuit 40. Similarly, the switch elements SW2(l+1), SW2(l+2), and SW2(l+3) are respectively turned on and off to couple and uncouple the data lines SGL(l+1), SGL(l+2), and SGL(l+3) to and from the detection circuit 40. In the following description, when there is no need to separately describe the switch elements SW2(l), SW2(l+1), SW2(l+2), and SW2(l+3), they will be referred to simply as a switch element SW2.

The detection apparatus 100 performs the positive sign selection operation Tdp1 and the negative sign selection operation Tdm1 of the detection operation Td1, the positive sign selection operation Tdp2 and the negative sign selection operation Tdm2 of the detection operation Td2, the positive sign selection operation Tdp3 and the negative sign selection operation Tdm3 of the detection operation Td3, and the positive sign selection operation Tdp4 and the negative sign selection operation Tdm4 of the detection operation Td4 for each of the detection electrode blocks RxB. Thus, the first selection operation employed in the positive sign selection operation Tdp1 and the second selection operation employed in the negative sign selection operation Tdm1 have a plurality of patterns.

The order of performing the positive sign selection operations Tdp1, Tdp2, Tdp3, and Tdp4 and the negative sign selection operations Tdm1, Tdm2, Tdm3, and Tdm4 for each of the detection electrode blocks RxB is preferably the order illustrated in FIG. 10, for example, in which the positive sign selection operation Tdp and the negative sign selection operation Tdm are alternately performed, the negative sign selection operation Tdm being the inversion of the positive sign selection operation Tdp.

Figure 11A:
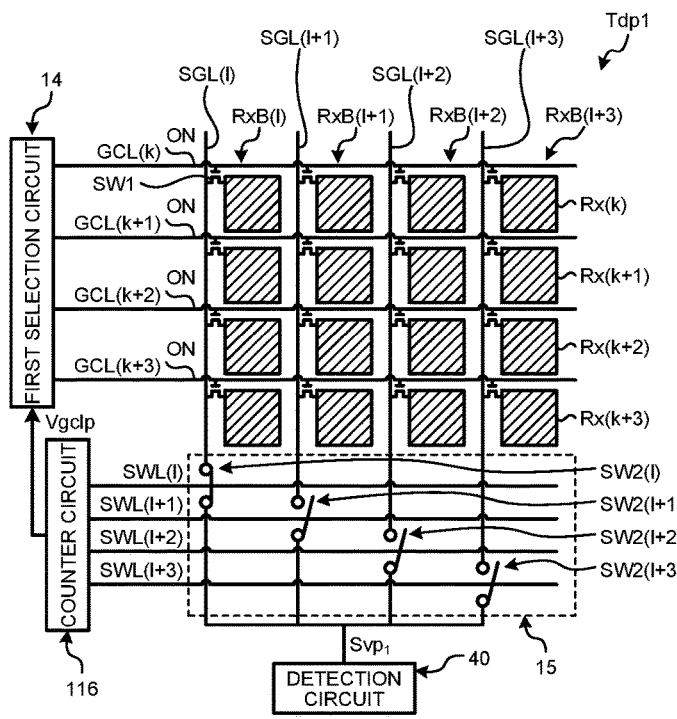
Figure 11B:
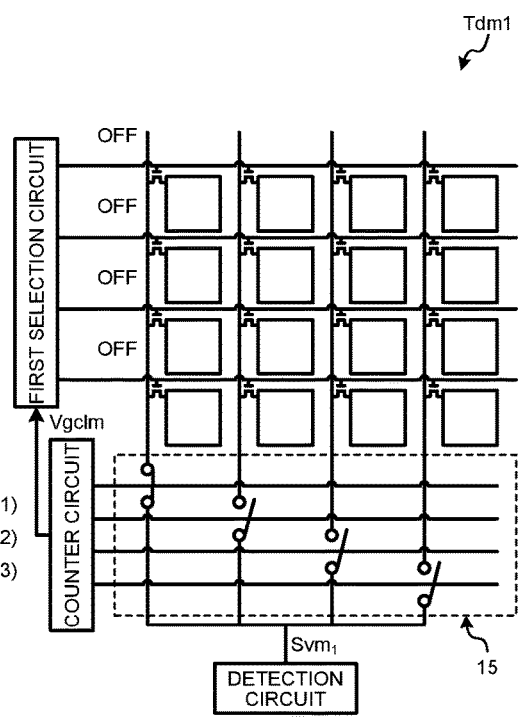

The detection apparatus 100 successively performs the detection operation Td1 for the detection electrode blocks RxB, for example. Specifically, as illustrated in FIG. 11A, the second selection circuit 15 turns on the switch element SW2(l) and turns off the switch elements SW2(l+1), SW2(l+2), and SW2(l+3) based on the selection signal Vsel supplied from the second control circuit 115 (refer to FIG. 1). With this operation, the data line SGL(l) coupled to the detection electrode block RxB(l) among the four data lines SGL is coupled to the detection circuit 40, whereas the other data lines SGL are not coupled to the detection circuit 40. In this state, the first selection circuit 14 (refer to FIG. 1) performs the positive sign selection operation Tdp1 of the detection operation Td1 as illustrated in FIG. 11A based on the selection signal Vgclp supplied from the first control circuit 114 (refer to FIG. 1). Next, the first selection circuit 14 performs the negative sign selection operation Tdm1 of the detection operation Td1 as illustrated in FIG. 11B based on the selection signal Vgclm supplied from the first control circuit 114. The procedures of the positive sign selection operation Tdp1 and the negative sign selection operation Tdm1 of the detection operation Td1 are the same as the procedures described with reference to FIG. 9A. With this operation, the detection signal $Svp_1$ is output from the data line SGL(l), and then the detection signal $Svm_1$ is output from the data line SGL(l).

Figure 11C:
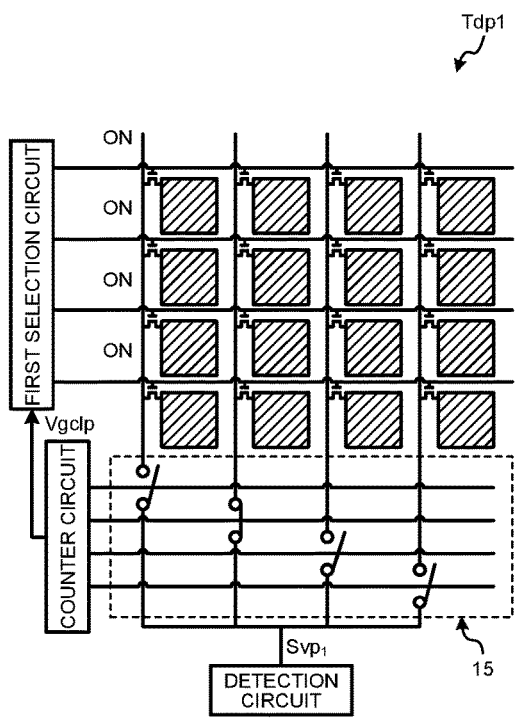

Next, as illustrated in FIG. 11C, the second selection circuit 15 turns on the switch element SW2(l+1) and turns off the switch elements SW2(l), SW2(l+2), and SW2(l+3) based on a signal from the second control circuit 115. With this operation, the data line SGL(l+1) coupled to the detection electrode block RxB(l+1) is coupled to the detection circuit 40, whereas the other data lines SGL are not coupled to the detection circuit 40. In this state, the first selection circuit 14 performs the positive sign selection operation Tdp1 of the detection operation Td1 based on the selection signal Vgclp supplied from the first control circuit 114. Next, the first selection circuit 14 performs the negative sign selection operation Tdm1 of the detection operation Td1 based on the selection signal Vgclm supplied from the first control circuit 114. With this operation, the detection signal $Svp_1$ is output from the data line SGL(l+1), and then the detection signal $Svm_1$ is output from the data line SGL(l+1).

Next, as illustrated in FIG. 11D, the second selection circuit 15 turns on the switch element SW2(l+2) and turns off the switch elements SW2(l), SW2(l+1), and SW2(l+3) based on a signal from the second control circuit 115. With this operation, the data line SGL(l+2) coupled to the detection electrode block RxB(l+2) is coupled to the detection circuit 40, whereas the other data lines SGL are not coupled to the detection circuit 40. In this state, the first selection circuit 14 performs the positive sign selection operation Tdp1 of the detection operation Td1 based on the selection signal Vgclp supplied from the first control circuit 114. Next, the first selection circuit 14 performs the negative sign selection operation Tdm1 of the detection operation Td1 based on the selection signal Vgclm supplied from the first control circuit 114. With this operation, the detection signal $Svp_1$ is output from the data line SGL(l+2), and then the detection signal $Svm_1$ is output from the data line SGL(l+2).

Next, as illustrated in FIG. 11E, the second selection circuit 15 turns on the switch element SW2(l+3) and turns off the switch elements SW2(l), SW2(l+1), and SW2(l+2) based on a signal from the second control circuit 115. With this operation, the data line SGL(l+3) coupled to the detection electrode block RxB(l+3) is coupled to the detection circuit 40, whereas the other data lines SGL are not coupled to the detection circuit 40. In this state, the first selection circuit 14 performs the positive sign selection operation Tdp1 of the detection operation Td1 based on the selection signal Vgclp supplied from the first control circuit 114. Next, the first selection circuit 14 performs the negative sign selection operation Tdm1 of the detection operation Td1 based on the selection signal Vgclm supplied from the first control circuit 114. With this operation, the detection signal $Svp_1$ is output from the data line SGL(l+3), and then the detection signal $Svm_1$ is output from the data line SGL(l+3).

Figure 12A:
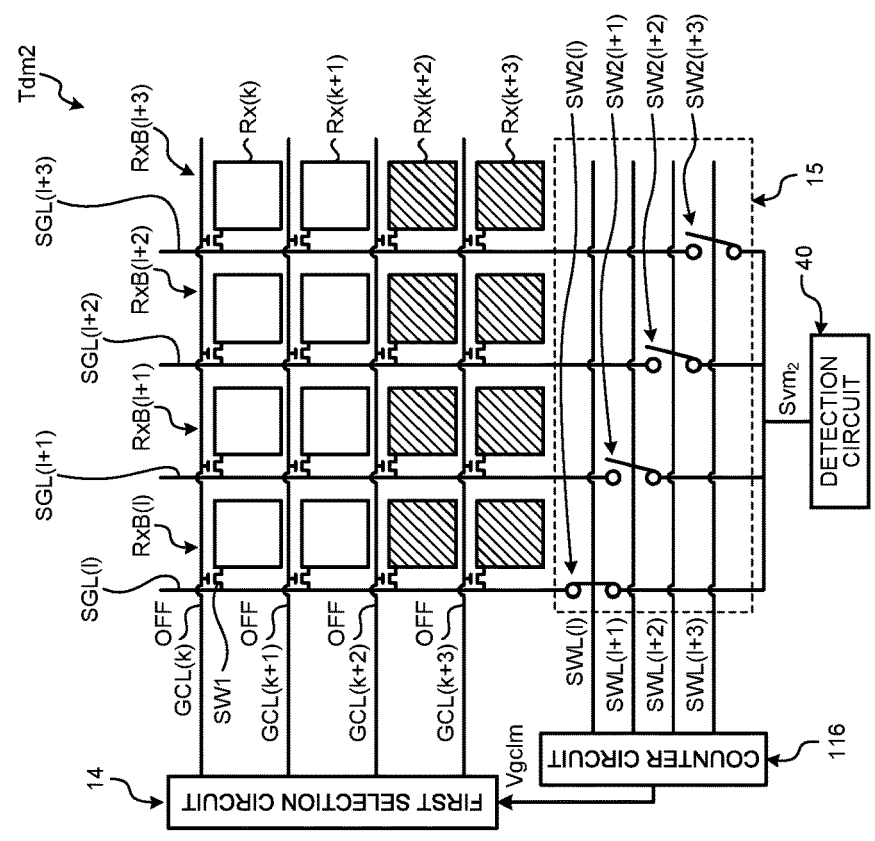
FIGS. 12A and 12B are diagrams of selection patterns of the detection electrodes by the sign selection driving for the detection electrode blocks.
Figure 12B:
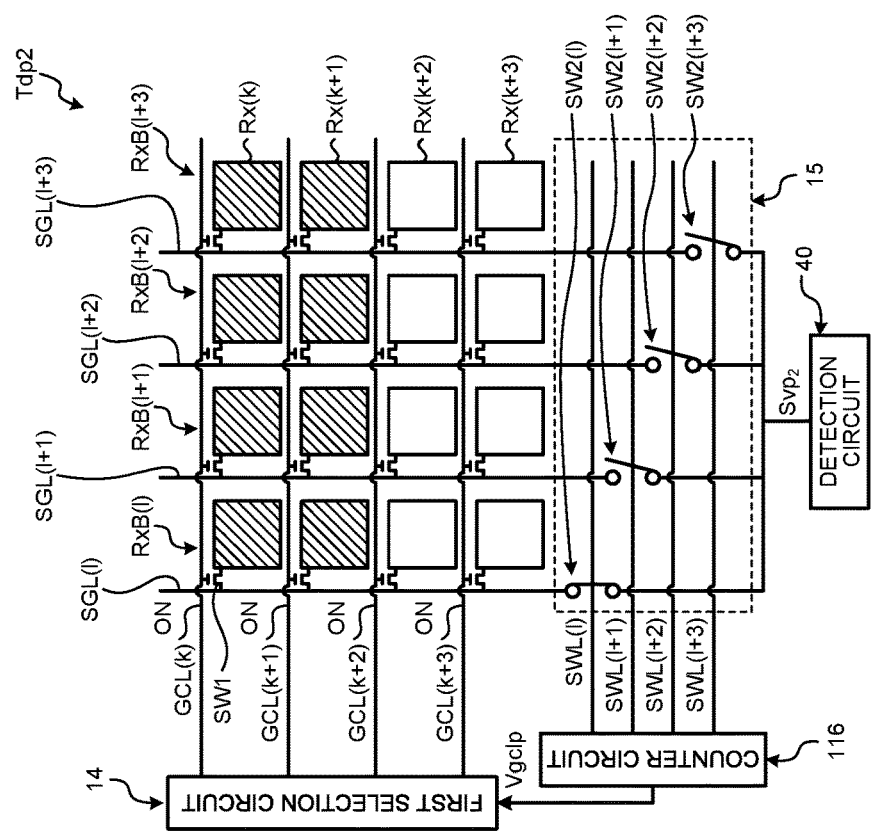

Next, the detection apparatus 100 successively performs the detection operation Td2 for the detection electrode blocks RxB in a manner similar to the detection operation Td1. Specifically, as illustrated in FIGS. 12A and 12B, the second selection circuit 15 turns on the switch element SW2(1) based on a signal from the second control circuit 115 to couple the data line SGL(1) coupled to the detection electrode block RxB(1) and the detection circuit 40 to each other. In this state, the second selection circuit 15 performs the positive sign selection operation Tdp2 of the detection operation Td2 as illustrated in FIG. 12A based on the selection signal Vgclp. Next, the second selection circuit 15 performs the negative sign selection operation Tdm2 of the detection operation Td2 as illustrated in FIG. 12B based on the selection signal Vgclm. The procedures of the positive sign selection operation Tdp2 and the negative sign selection operation Tdm2 of the detection operation Td2 are the same as the procedures described with reference to FIG. 9B. With this operation, the detection signal $Svp_2$ is output from the data line SGL(1), and then the detection signal $Svm_2$ is output from the data line SGL(1).

In the detection operation Td2 as well, the second selection circuit 15 switches the switch elements SW2 to couple the data lines SGL(1), SGL(l+1), SGL(l+2), and SGL(l+3) one by one to the detection circuit 40 in a manner similar to the detection operation Td1. The first selection circuit 14 performs the positive sign selection operation Tdp2 of the detection operation Td2 and then performs the negative sign selection operation Tdm2 of the detection operation Td2 for the detection electrode block RxB coupled to the detection circuit 40 via the data line SGL. With this operation, from the data line SGL, the detection signal $Svp_2$ is output to the detection circuit 40, and then the detection signal $Svm_2$ is output thereto.

Figure 13A:
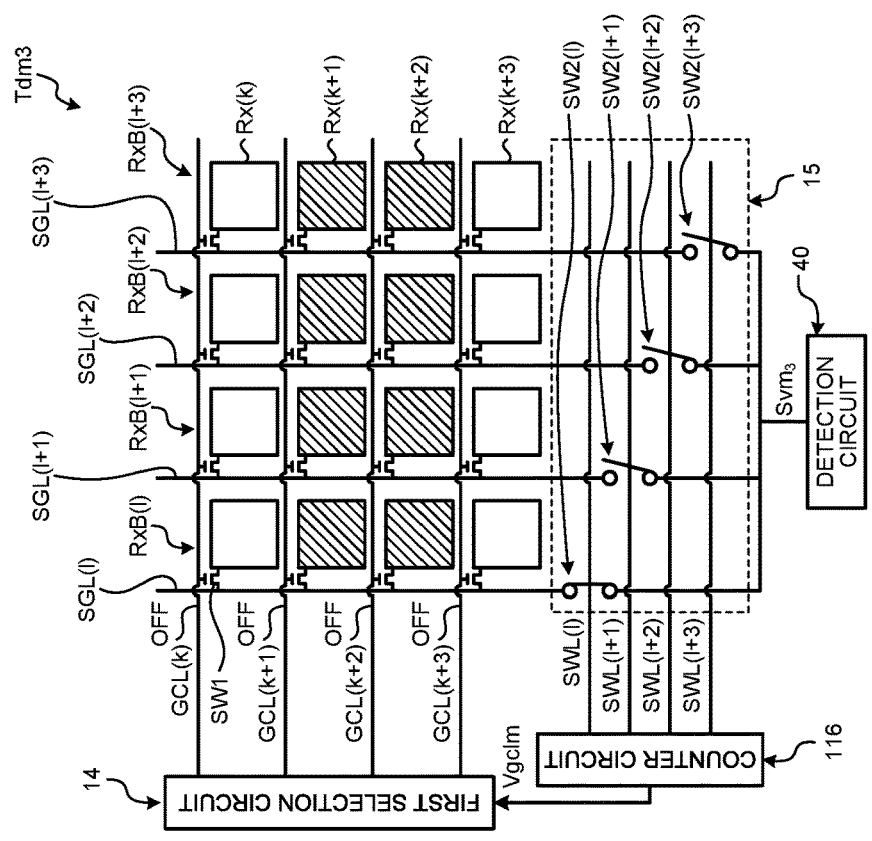
FIGS. 13A and 13B are diagrams of selection patterns of the detection electrodes by the sign selection driving for the detection electrode blocks.
Figure 13B:
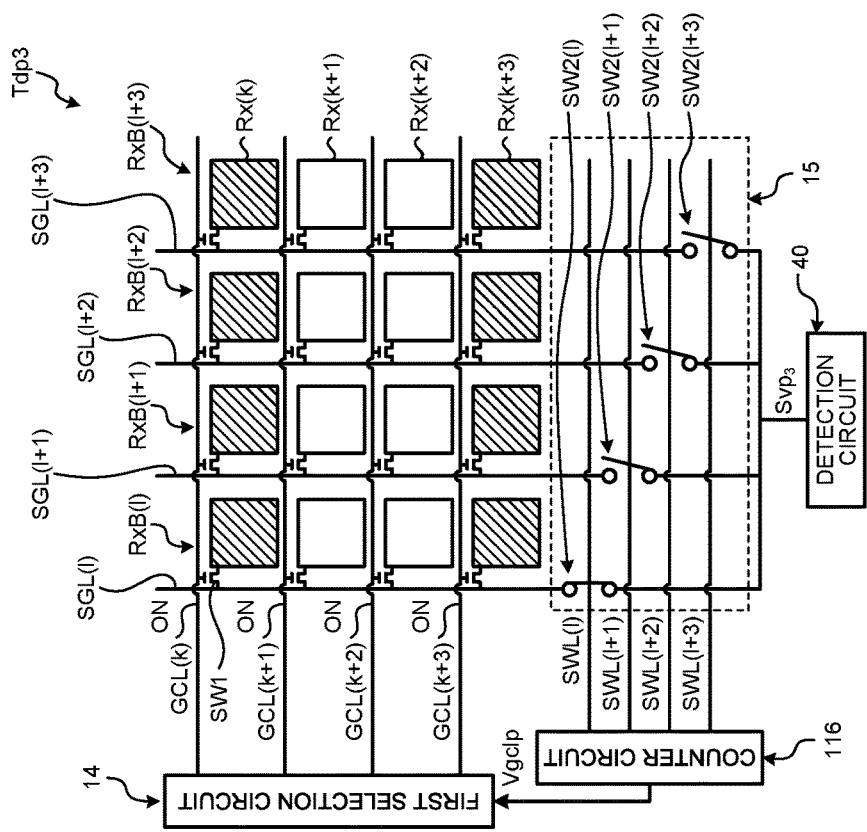

Next, the detection apparatus 100 successively performs the detection operation Td3 for the detection electrode blocks RxB. Specifically, as illustrated in FIGS. 13A and 13B, the second selection circuit 15 turns on the switch element SW2(1) to couple the data line SGL(1) to the detection circuit 40. In this state, the first selection circuit 14 performs the positive sign selection operation Tdp3 of the detection operation Td3 as illustrated in FIG. 13A and then performs the negative sign selection operation Tdm3 of the detection operation Td3 as illustrated in FIG. 13B. The procedures of the positive sign selection operation Tdp3 and the negative sign selection operation Tdm3 of the detection operation Td3 are the same as the procedures described with reference to FIG. 9C. With this operation, from the data line SGL(1), the detection signal $Svp_3$ is output, and then the detection signal $Svm_3$ is output.

In the detection operation Td3 as well, the second selection circuit 15 switches the switch elements SW2 to couple the data lines SGL(1), SGL(l+1), SGL(l+2), and SGL(l+3) one by one to the detection circuit 40 in a manner similar to the detection operation Td1 and the detection operation Td2. The first selection circuit 14 performs the positive sign selection operation Tdp3 of the detection operation Td3 and then performs the negative sign selection operation Tdm3 of the detection operation Td3 for the detection electrode block RxB coupled to the detection circuit 40 via the data line SGL. With this operation, from the data line SGL, the detection signal $Svp_3$ is output to the detection circuit 40, and then the detection signal $Svm_3$ is output thereto.

Figure 14A:
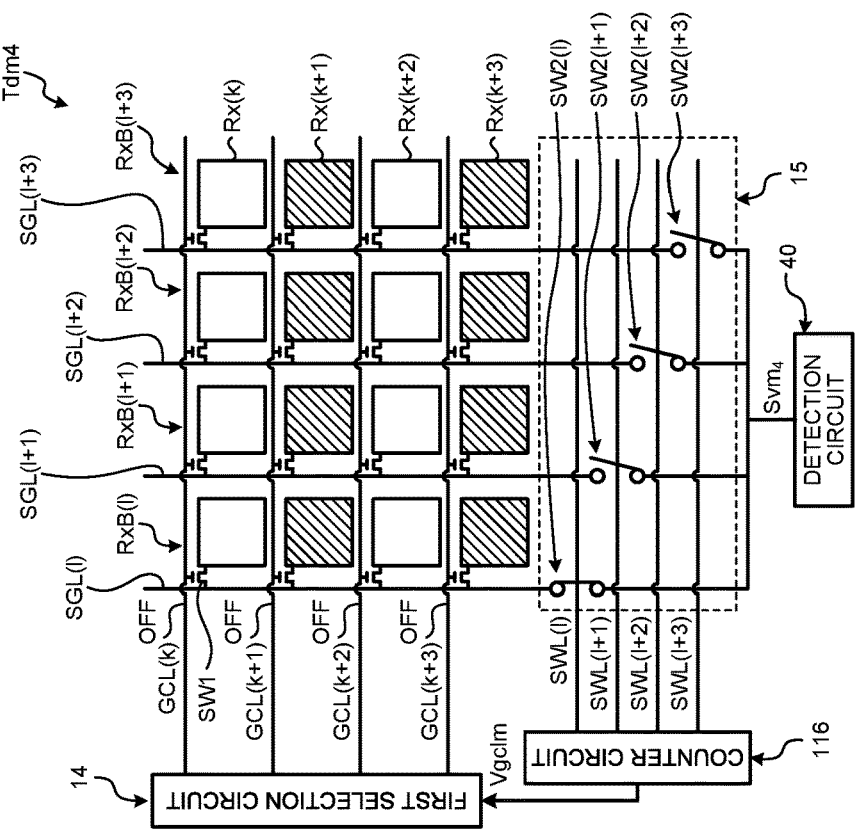
FIGS. 14A and 14B are diagrams of selection patterns of the detection electrodes by the sign selection driving for the detection electrode blocks.
Figure 14B:
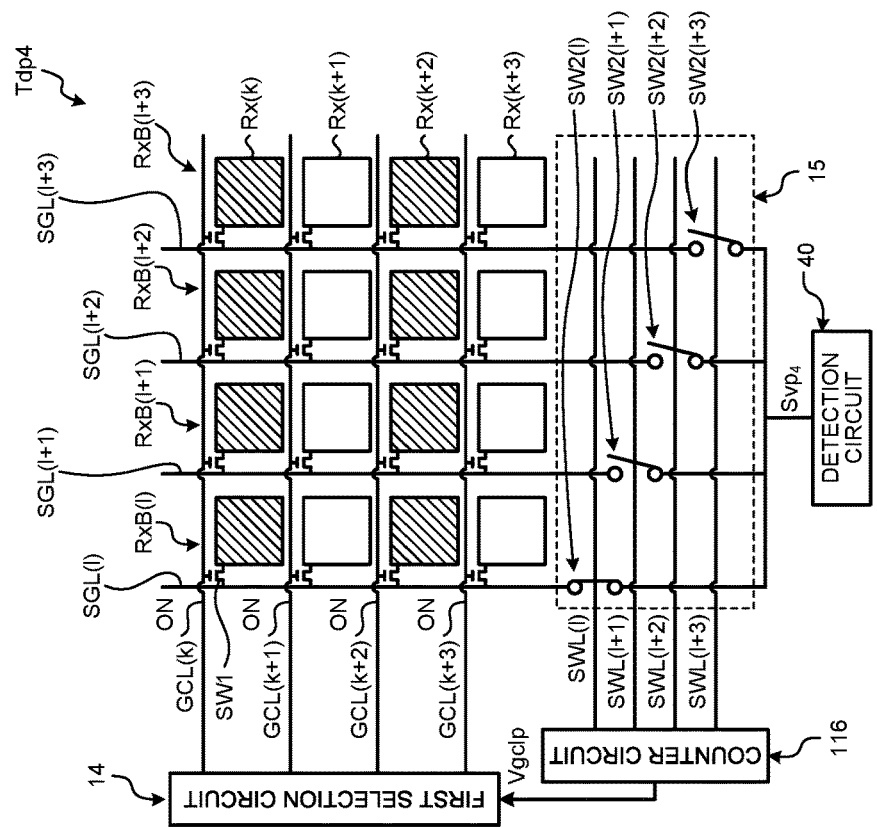

Next, the detection apparatus 100 successively performs the detection operation Td4 for the detection electrode blocks RxB. Specifically, as illustrated in FIGS. 14A and 14B, the second selection circuit 15 turns on the switch element SW2(1) to couple the data line SGL(1) to the detection circuit 40. In this state, the first selection circuit 14 performs the positive sign selection operation Tdp4 of the detection operation Td4 as illustrated in FIG. 14A and then performs the negative sign selection operation Tdm4 of the detection operation Td4 as illustrated in FIG. 14B. The procedures of the positive sign selection operation Tdp4 and the negative sign selection operation Tdm4 of the detection operation Td4 are the same as the procedures described with reference to FIG. 9D. With this operation, from the data line SGL(1), the detection signal $Svp_4$ is output, and then the detection signal $Svm_4$ is output.

In the detection operation Td4 as well, the second selection circuit 15 switches the switch elements SW2 to couple the data lines SGL(1), SGL(l+1), SGL(l+2), and SGL(l+3) one by one to the detection circuit 40 in a manner similar to the detection operation Td1, the detection operation Td2, and the detection operation Td3. The first selection circuit 14 performs the positive sign selection operation Tdp4 of the detection operation Td4 and then performs the negative sign selection operation Tdm4 of the detection operation Td4 for the detection electrode block RxB coupled to the detection circuit 40 via the data line SGL. With this operation, from the data line SGL, the detection signal $Svp_4$ is output to the detection circuit 40, and then the detection signal $Svm_4$ is output thereto.

The signal computing circuit 44 (refer to FIG. 1) subtracts the detection signal Svm from the detection signal Svp to output the detection signal Sc for each of the detection electrode blocks RxB. The detection signal $Svm_1$ is subtracted from the detection signal $Svp_1$ to output the detection signal $Sc_1$, for example. Similarly, for each of the detection electrode blocks RxB, the four detection signals $Sc_1$, $Sc_2$, $Sc_3$, and $Sc_4$ are output to the storage circuit 48. The signal computing circuit 44 decodes the detection signal Sc by Expression (4) described above for each of the detection electrode blocks RxB. Specifically, the signal computing circuit 44 decodes the four detection signals $Sc_1$, $Sc_2$, $Sc_3$, and $Sc_4$ by the square matrix Hv for each of the detection electrode blocks RxB and outputs the four decoded detection signals $Si_1d$, $Si_2d$, $Si_3d$, and $Si_4d$.

In each of the detection electrode blocks RxB, the decoded detection signal $Si_1d$ is assigned to the detection electrode Rx(k). The decoded detection signal $Si_2d$ is assigned to the detection electrode Rx(k+1). The decoded detection signal $Si_3d$ is assigned to the detection electrode Rx(k+2). The decoded detection signal $Si_4d$ is assigned to the detection electrode Rx(k+3). In each of the detection electrode blocks RxB, when the recess or protrusion of a finger Fin is in contact with or proximity to the detection apparatus, the value of the decoded detection signal Sid of the detection electrode Rx corresponding to the contact or proximity position changes.

The coordinates extraction circuit 45 can determine the coordinates of the detection electrode Rx, with which or to which the recess or protrusion of the finger Fin is in contact or proximity, among the detection electrodes Rx in each of the detection electrode blocks RxB based on the decoded detection signal Sid. The coordinates extraction circuit 45 outputs the detected coordinates to the combination circuit 46. The combination circuit 46 combines the decoded detection signals $Si_1d$, $Si_2d$, $Si_3d$, and $Si_4d$ to generate two-dimensional information indicating the recess or protrusion shape of an external object being in contact or proximity. The combination circuit 46 outputs the two-dimensional information in the form of the output signal Vout of the detection circuit 40. Alternatively, the combination circuit 46 may generate an image based on the two-dimensional information and output its image information as the output signal Vout. The detection circuit 40 may output the coordinates that are output by the coordinates extraction circuit 45, as the output signal Vout. The detection circuit 40 may not include the coordinates extraction circuit 45 and the combination circuit 46 and may output the decoded detection signal Sid as the output signal Vout.

The positive sign selection operations Tdp and the negative sign selection operations Tdm are preferably performed alternately, that is, in a manner such as the following: Tdp1, Tdm1, Tdp2, Tdm2, . . . as illustrated in FIG. 10. With this operation, the interval of the detection times of the detection signal Svp and the detection signal Svm reduces, and the difference between a noise component contained in the detection signal Svp and a noise component contained in the detection signal Svm reduces. The detection signal Sc is determined by the difference between the detection signal Svp and the detection signal Svm in such a manner that Sc=Svp−Svm. Consequently, in the detection signal Sc, the noise component of the detection signal Svp and the noise component of the detection signal Svm are cancelled out.

Figure 15A:
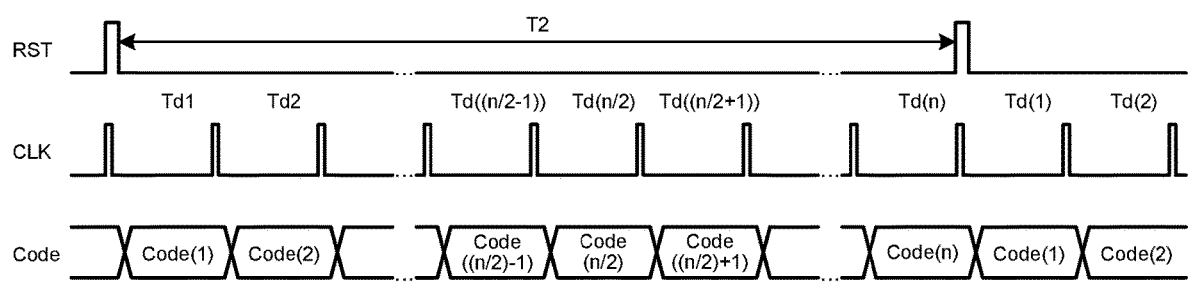
FIGS. 15A and 15B are diagrams of signal waveform examples when a detection electrode block includes n detection electrodes arranged in a column direction.
Figure 15B:
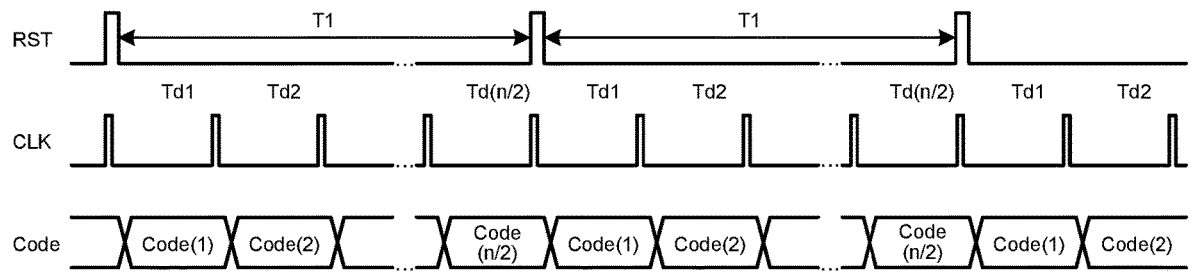

The following describes an operational mode of the detection apparatus 100. FIGS. 15A and 15B are diagrams of signal waveform examples when the detection electrode block RxB includes n detection electrodes Rx arranged in the column direction. FIG. 15A is a timing chart of a signal waveform example when the detection apparatus 100 operates on a second mode. FIG. 15B is a timing chart of a signal waveform example when the detection apparatus 100 operates on a first mode. A description with reference to FIG. 15A and FIG. 15B describes a case in which the order d of the square matrix Hv is equal to the number n of the detection electrodes Rx included in the detection electrode block RxB. A code Code includes signals corresponding to an instruction group causing the first selection circuit 14 and the second selection circuit 15 to perform the detection operation Td. A first code Code(1) includes signals corresponding to an instruction group causing the first selection circuit 14 and the second selection circuit 15 to perform the detection operation Td1, for example. As with the first code Code(1), an n-th code Code(n) includes signals corresponding to an instruction group causing the first selection circuit 14 and the second selection circuit 15 to perform an n-th detection operation Tdn.

The detection apparatus 100 starts a detection operation with a reset signal RST as a trigger of the start. The detection apparatus 100 successively performs the detection operations Td such as the detection operation Td1, the detection operation Td2, . . . in accordance with the timing of a clock signal CLK that is periodically output. The reset signal RST is output from the detection control circuit 11 to the detection circuit 40 based on a count by the counter circuit 116, for example. An exclusive circuit for outputting the reset signal RST may be provided, or the reset signal RST may be input from an external apparatus. The clock signal CLK is output from the clock signal generation circuit 110, for example. An exclusive circuit for outputting the clock signal CLK may be provided, or the clock signal CLK may be input from an external apparatus.

The operational modes of the first selection circuit 14 and the second selection circuit 15 include the first mode and the second mode. The first mode is an operational mode in which the selection operation Td corresponding to rows of part included in the square matrix Hv is performed in a period T1. The second mode is an operational mode in which the first selection operation corresponding to all the rows included in the square matrix Hv is performed in a period T2. In other words, in the first mode, r selection operations Td corresponding to the first row to the r-th row of the square matrix are performed, whereas, in the second mode, n selection operations Td corresponding to the first row to the n-th row of the square matrix are performed; the r as the number of times of the selection operations Td of the first mode is less than n as the number of times of the selection operations Td of the second mode.

The following first describes the second mode. In the second mode illustrated in FIG. 15A, a first code Code(1) to an n-th code Code(n) corresponding to the first row to the n-th row of the square matrix Hv are output in one frame of the detection operation Td. With this operation, all the positive sign selection operations Tdp and the negative sign selection operations Tdm corresponding to the first row to the n-th row of the square matrix Hv are performed. The one frame indicates a period from the time when the reset signal RST is once output until the time when it is next output. In other words, the one frame indicates a period from the time when one code Code is started until the time when the same code Code is next started.

The following describes the first mode. In the first mode, the period T1 from the start of one frame of the detection operation Td until the time when a reset of the detection operation Td is performed by the reset signal RST, is shorter than the period T2 in the second mode. Although FIG. 15A and FIG. 15B exemplify a case in which the ratio between the period T1 and the period T2 is T1:T2=2:1, the ratio is not limited thereto; it is only required that the period T1 be longer than the period T2. In the first mode, the r selection operations Td are performed. The number of times n of performing the selection operations Td of the second mode corresponds to $2^{Na}$; Na is an integer equal to or greater than 1. The number of times r of performing the selection operations Td of the first mode corresponds to $2^{Nb}$; Nb is an integer equal to or greater than 0 and is less than Na. In other words, the number of times r of the selection operations of the first mode is indicated by $n/2^{Na-Nb}$. In the first embodiment, the difference between Na and Nb is Na−Nb=1. Consequently, in the first mode illustrated in FIG. 15B, the first code Code(1) to an (n/2)-th code Code(n/2) are output in one frame of the detection operation. With this operation, the positive sign selection operations Tdp and the negative sign selection operations Tdm corresponding to the first row to the (n/2)-th row of the square matrix Hv are performed. The positive sign selection operations Tdp and the negative sign selection operations Tdm performed in a period from the start of the second mode until the time when the period T1 elapses, are the same as the positive sign selection operations Tdp and the negative sign selection operations Tdm performed in the first mode. In the first mode, the selection operation Td corresponding to the r-th row may be performed a plurality of times in the period T2. In FIG. 15B, for example, in a period (T1×2) corresponding to the period T2 in FIG. 15A, the r positive sign selection operations Tdp and negative sign selection operations Tdm corresponding to the first row to the r-th row of the square matrix Hv are performed twice.

More specifically, the following describes a case in which the number of times r of the selection operations performed in the first mode is 2 when the order d of the square matrix Hv is 4 in the first mode. In other words, the following describes a case in which the detection operations Td corresponding to the first row to the second row are performed in the first mode. As illustrated in FIG. 10, in the first mode, the detection operation Td1 and the detection operation Td2 are performed for each of the detection electrode blocks RxB. More specifically, the positive sign selection operations Tdp1 and Tdp2 and the negative sign selection operations Tdm1 and Tdm2 are performed, whereby the detection signals $Svp_1$, $Svp_2$, $Svm_1$, and $Svm_2$ are output to the detection circuit 40. The signal computing circuit 44 outputs detection signals $Sc_1$ and $Sc_2$ by subtracting the detection signals Svm from the detection signals Svp, respectively, as described in Expression (5).

$$\begin{pmatrix} Sc_1 \\ Sc_2 \end{pmatrix} = \begin{pmatrix} 1 & 1 & 1 & 1 \\ 1 & 1 & -1 & -1 \end{pmatrix} \begin{pmatrix} Si_1 \\ Si_2 \\ Si_3 \\ Si_4 \end{pmatrix}$$

$$= \begin{pmatrix} 1 & 1 & 1 & 1 \\ 1 & 1 & 0 & 0 \end{pmatrix} \begin{pmatrix} Si_1 \\ Si_2 \\ Si_3 \\ Si_4 \end{pmatrix} - \begin{pmatrix} 0 & 0 & 0 & 0 \\ 0 & 0 & 1 & 1 \end{pmatrix} \begin{pmatrix} Si_1 \\ Si_2 \\ Si_3 \\ Si_4 \end{pmatrix}$$

$$= HvpX - HvmX$$

$$= \begin{pmatrix} Svp_1 \\ Svp_2 \end{pmatrix} - \begin{pmatrix} Svm_1 \\ Svm_2 \end{pmatrix}$$

(5)

The signal computing circuit 44 decodes the detection signals Sc using an r-th column of the square matrix Hv. More specifically, the signal computing circuit 44 outputs four detection signals $(d/2)(Si_1+Si_2)$, $(d/2)(Si_1+Si_2)$, $(d/2)(Si_3+Si_4)$, and $(d/2)(Si_3+Si_4)$ decoded by multiplying a matrix of the first column to the second column of the square matrix Hv by the matrix ScX consisting of the detection signals $Sc_1$ and $Sc_2$ acquired in the first mode as described in Expressions (6) and (7) below. In the first embodiment, d/2 is 2.

$$\begin{pmatrix} (d/2)(Si_1+Si_2) \\ (d/2)(Si_1+Si_2) \\ (d/2)(Si_3+Si_4) \\ (d/2)(Si_3+Si_4) \end{pmatrix} = \begin{pmatrix} 1 & 1 \\ 1 & 1 \\ 1 & -1 \\ 1 & -1 \end{pmatrix} \begin{pmatrix} Sc_1 \\ Sc_2 \\ 0 \\ 0 \end{pmatrix}$$

$$= \begin{pmatrix} 1 & 1 & 0 & 0 \\ 1 & 1 & 0 & 0 \\ 1 & -1 & 0 & 0 \\ 1 & -1 & 0 & 0 \end{pmatrix} \begin{pmatrix} Sc_1 \\ Sc_2 \\ 0 \\ 0 \end{pmatrix}$$

$$= \begin{pmatrix} 1 & 1 \\ 1 & 1 \\ 1 & -1 \\ 1 & -1 \end{pmatrix} \begin{pmatrix} Sc_1 \\ Sc_2 \\ 0 \\ 0 \end{pmatrix}$$

(6)

$$\begin{pmatrix} (d/2)(Si_1+Si_2) \\ (d/2)(Si_1+Si_2) \\ (d/2)(Si_3+Si_4) \\ (d/2)(Si_3+Si_4) \\ (d/2)(Si_5+Si_6) \\ (d/2)(Si_5+Si_6) \\ (d/2)(Si_7+Si_8) \\ (d/2)(Si_7+Si_8) \end{pmatrix} = \begin{pmatrix} 1 & 1 & 1 & 1 \\ 1 & 1 & 1 & 1 \\ 1 & 1 & -1 & -1 \\ 1 & 1 & -1 & -1 \\ 1 & -1 & -1 & 1 \\ 1 & -1 & -1 & 1 \\ 1 & -1 & 1 & -1 \\ 1 & -1 & 1 & -1 \end{pmatrix} \begin{pmatrix} Sc_1 \\ Sc_2 \\ Sc_3 \\ Sc_4 \\ 0 \\ 0 \\ 0 \\ 0 \end{pmatrix}$$

$$= \begin{pmatrix} 1 & 1 & 1 & 1 & 0 & 0 & 0 & 0 \\ 1 & 1 & 1 & 1 & 0 & 0 & 0 & 0 \\ 1 & 1 & -1 & -1 & 0 & 0 & 0 & 0 \\ 1 & 1 & -1 & -1 & 0 & 0 & 0 & 0 \\ 1 & -1 & -1 & 1 & 0 & 0 & 0 & 0 \\ 1 & -1 & -1 & 1 & 0 & 0 & 0 & 0 \\ 1 & -1 & 1 & -1 & 0 & 0 & 0 & 0 \\ 1 & -1 & 1 & -1 & 0 & 0 & 0 & 0 \end{pmatrix} \begin{pmatrix} Sc_1 \\ Sc_2 \\ Sc_3 \\ Sc_4 \\ 0 \\ 0 \\ 0 \\ 0 \end{pmatrix}$$

$$= \begin{pmatrix} 1 & 1 & 1 & 1 \\ 1 & 1 & 1 & 1 \\ 1 & 1 & -1 & -1 \\ 1 & 1 & -1 & -1 \\ 1 & -1 & -1 & 1 \\ 1 & -1 & -1 & 1 \\ 1 & -1 & 1 & -1 \\ 1 & -1 & 1 & -1 \end{pmatrix} \begin{pmatrix} Sc_1 \\ Sc_2 \\ Sc_3 \\ Sc_4 \\ 0 \\ 0 \\ 0 \\ 0 \end{pmatrix}$$

(7)

The signal computing circuit 44 associates the decoded detection signals with the detection electrodes Rx included in the detection electrode block RxB. Specifically, the signal computing circuit 44 associates the detection signal $(d/2)(Si_1+Si_2)$ with the detection electrode Rx(k) and the detection electrode Rx(k+1) and associates $(d/2)(Si_3+Si_4)$ with the detection electrode Rx(k+2) and the detection electrode Rx(k+3). In other words, the same signal is assigned to $2^{Na-Nb}$ adjacent detection electrodes adjacent to each other included in the detection electrode block RxB. This signal corresponds to a $d/2^{Na-Nb}$ multiple of a detection signal when the first selection circuit 14 selects the adjacent detection electrodes. In the first embodiment, the order d of the square matrix Hv is 4, Na−Nb is 1, and $d/2^{Na-Nb}$ is 2. Specifically, the detection electrode Rx(k) corresponds to the double of a detection signal $(Si_1+Si_2)$ output when the detection electrode Rx(k) and the detection electrode Rx(k+1), which is adjacent to the detection electrode Rx(k), are selected by the first selection circuit 14. The detection apparatus 100 detects the recess or protrusion of a finger Fin as the external object based on the decoded detection signals $(d/2)(Si_1+Si_2)$ and $(d/2)(Si_3+Si_4)$.

Such a second mode is included, whereby the adjacent detection electrodes share the same detection signal, and one frame of the detection operation Td can be completed in the period T1, which is shorter than the period T2, although detection resolution in a direction in which the adjacent detection electrodes are arranged (e.g., the column direction) reduces.

Switching between the first mode and the second mode may be controlled in any way. When the detection operation Td is performed on the first mode, the detection circuit 40 outputs the output signal Vout to a user authentication circuit, and a user is not authenticated when user authentication is performed based on fingerprint information registered in the user authentication circuit, a mode switching signal may be output, and then the detection operation Td may be performed on the second mode when the detection circuit 40 or the detection control circuit 11 receives the mode switching signal. The user authentication circuit may be included in the IC 21 or included in an IC, a CPU, or the other device arranged on the second circuit board 30 different from the IC 21. Not limited to user authentication, an operational mode may be set for each application, and the mode switching signal may be output to the detection circuit 40 or the detection control circuit 11 based on the set operational mode. Mode switching control may be performed by an external apparatus or the detection control circuit 11 based on a detection result of the detection circuit 40, or the detection circuit 40 may autonomously switch the operational mode.

As described above, according to the first embodiment, the detection can be performed on the first mode, which is shorter than the second mode. Consequently, higher-speed detection can be achieved. The order of performing the positive sign selection operations Tdp corresponds to the order of arrangement from a row corresponding to positive and negative signs of a row having more positive signs in a Walsh Hadamard matrix. The Walsh Hadamard matrix is an Hadamard matrix in which rows are arranged in ascending order of the number of times of sign changes from one row (the topmost row) consisting of elements of a positive sign "1" toward another row (a lower row). With this operation, the detection operation including the detection operation Td1 using all the detection electrodes Rx included in the detection electrode block RxB(1) can be performed even in the first mode, and detection accuracy can be ensured. The detection electrodes Rx to be selected are switched in accordance with the order from the one row toward the other of the Walsh Hadamard matrix, whereby a detection operation of higher priority can be performed more preferentially for ensuring accuracy. Consequently, both the ensuring of detection accuracy and higher-speed detection with a fewer number of times of selection operations can be achieved.

The detection electrodes Rx are arranged in a first direction and a second direction crossing the first direction. The first direction is the row direction, whereas the second direction is the column direction, for example. With this configuration, the resolution of detection of the shape and fingerprint of a finger Fin can be improved.

The detection apparatus 100 includes a plurality of detection electrodes Rx, the detection circuit 40 coupled to the detection electrodes Rx, the detection electrode Tx arranged at a position adjacent to the detection electrodes Rx, and the drive signal generation circuit 112 coupled to the detection electrode Tx. The drive signal generation circuit 112 supplies the drive signal Vs for detection to the detection electrode Tx. The detection circuit 40 detects the detection signal Sv corresponding to the changes in the capacitance of the detection electrodes Rx. With this operation, the drive signal Vs can be transmitted to the detection electrodes Rx from the detection electrode Tx via a finger Fin or the like. A recess or protrusion on the surface of the finger Fin is more easily reflected on the changes in capacitance of the detection electrodes Rx, and fingerprint detection sensitivity is higher, than a case in which the drive signal Vs does not involve the finger Fin. Consequently, the detection apparatus 100 that can improve detection accuracy for the external object (e.g., a finger Fin) or the like can be provided.

The substrate 10 includes the base member 101. The detection electrodes Rx are positioned on the one face 101a of the base member 101. As illustrated in FIG. 4, for example, a height h3 of the detection electrode Tx from the one face 101a is greater than a height h1 of the detection electrode Rx from the one face 101a. As illustrated in FIG. 4, for example, the height h3 of the detection electrode Tx from the one face 101a is greater than a height h2 of the protective layer 33 from the one face 101a. With this structure, when a finger Fin approaches the detection electrode Rx, it is easy for the finger Fin to be naturally in contact with the detection electrode Tx.

The detection apparatus 100 includes a coupling circuit that couples the detection electrodes Rx to the detection circuit 40 coupled and uncouples the detection electrodes Rx from the detection circuit 40. The coupling circuit is the detection control circuit 11, the first selection circuit 14, and/or the second selection circuit 15, for example. The coupling circuit performs the positive sign selection operation Tdp in which the detection electrodes Rx as the first selection targets among a plurality of detection electrodes Rx are caused to be coupled to the detection circuit 40, that is, the coupled state; and the detection electrodes Rx as the second selection targets that are not included in the first selection targets are caused to be uncoupled from the detection circuit 40, that is, the non-coupled state. The coupling circuit performs the negative sign selection operation Tdm at a timing different from the positive sign selection operation Tdp. The negative sign selectin operation is an operation in which the detection electrodes Rx as the first selection targets in the positive sign selection operation Tdp are caused to be the non-coupled state, and the detection electrodes as the second selection targets in the positive sign selection operation Tdp are caused to be the coupled state. With this operation, a fingerprint can be detected by the sign selection driving, and a signal higher in intensity than that of time-division selection driving can be obtained without increasing the voltage of the drive signal Vs. The positive sign selection operation Tdp and the negative sign selection operation Tdm are performed at different timings. This hinders capacitive coupling between the detection electrodes Rx, and favorable detection sensitivity can be achieved.

In the positive sign selection operation Tdp, the detection signal Svp is output from the detection electrodes Rx as the first selection targets to the detection circuit 40. In the negative sign selection operation Tdm, the detection signal Svm is output from the detection electrodes Rx as the second selection targets in the positive sign selection operation Tdp to the detection circuit 40. The detection circuit 40 calculates the difference between the detection signal Svp and the detection signal Svm. The detection signal Sc is determined by the difference between the detection signal Svp and the detection signal Svm, and even when noise comes in from the outside, the noise component of the detection signal Svp and the noise component of the detection signal Svm are cancelled out. With this operation, the resistance to noise in the detection apparatus 100 can be improved.

The detection circuit 40 calculates the detection signals Sc output from the respective detection electrodes Rx based on the detection signals Svp obtained by integrating the detection signals Si output from the detection electrodes Rx as the first selection targets of the positive sign selection operation Tdp and the detection signals Svm obtained by integrating the detection signals Si output from the detection electrodes Rx as the second selection targets of the positive sign selection operation Tdp. The detection signals Sc are calculated from the differences between the detection signals Svp and the detection signals Svm, for example. The detection signals Sc are decoded to calculate the detection signals Sid output from the respective detection electrodes Rx. The detection circuit 40 performs decoding processing based on the detection signals Sv obtained by integrating the detection signals Si of the respective electrodes Rx, whereby signal intensity higher than that of time-division selection driving can be obtained without increasing the voltage of the signal value of each node.

The coupling circuit alternately successively performs the positive sign selection operation Tdp and the negative sign selection operation Tdm in which selection targets and non-selection targets in the positive sign selection operation Tdp are inverted. With this operation, the interval of the detection times of the detection signal Svp and the detection signal Svm reduces, and the difference between a noise component contained in the detection signal Svp and a noise component contained in the detection signal Svm reduces. Consequently, the resistance to noise in the detection apparatus 100 can further be improved.

The detection apparatus 100 includes the first circuit board 20 coupled to the substrate 10 and also includes the IC 21 provided on the first circuit board 20. The detection electrodes Rx are coupled to the IC 21 via the second selection circuit 15. The conductor 26 is coupled to the IC 21 without involving the second selection circuit 15. With this structure, in the standby mode in which only the conductor 26 is operated, there is no need to operate the second selection circuit 15. Consequently, the detection apparatus 100 can reduce the power consumption of the standby mode.

The capacitance of the conductor 26 is smaller than the capacitance of the detection electrode Tx. With this relation, a loss of power along with the operation of the standby mode is reduced as compared with a case in which the detection electrode Tx is used in place of the conductor 26 as the standby mode. Consequently, the detection apparatus 100 can reduce the power consumption of the standby mode.

The conductor 26 is arranged between the detection electrodes Rx and the detection electrode Tx. The conductor 26 may be smaller in area than the detection electrode Tx. With this structure, the capacitance of the conductor 26 is easily lowered.

In the first embodiment, the shape and fingerprint of a finger Fin are detected by the detection apparatus 100. However, the object to be detected by the detection apparatus 100 is not limited to the finger Fin. The object to be detected by the detection apparatus 100 is only required to be an external object having a fine recess or protrusion forming capacitance with the detection electrode Rx, not limited to the finger Fin. The object to be detected may be a palm, for example. The detection apparatus 100 may detect both the finger Fin and the palm as the object to be detected. The detection apparatus 100 detects a capacitance change by the recess or protrusion of the palm to detect the shape and palm print of the palm.

Although the first embodiment exemplifies a case in which the negative sign selection operation Tdm1 corresponding to the first row of the square matrix Hv is performed, the operation of the detection apparatus is not limited thereto. All the elements on the first row of the square matrix Hv are "1", and there is no detection electrodes Rx as the first selection targets in the negative sign selection operation Tdm1. In other words, no detection electrodes Rx included in the detection electrode block RxB are coupled to the data line SGL, and the detection signal $Svm_1$ can be regarded as substantially zero. Consequently, without executing the negative sign selection operation Tdm1, the detection signal $Svm_1$ may be held in the storage circuit 48 as zero in advance and be read by the signal computing circuit 44. Since the detection signal $Svm_1$ is zero, the detection signal $Svp_1$ may be held as the detection signal $Sc_1$, and the processing of reading the detection signal $Svp_1$ and the detection signal $Svm_1$ to calculate the detection signal $Sc_1$ may be omitted.

First Modification

Figure 16:
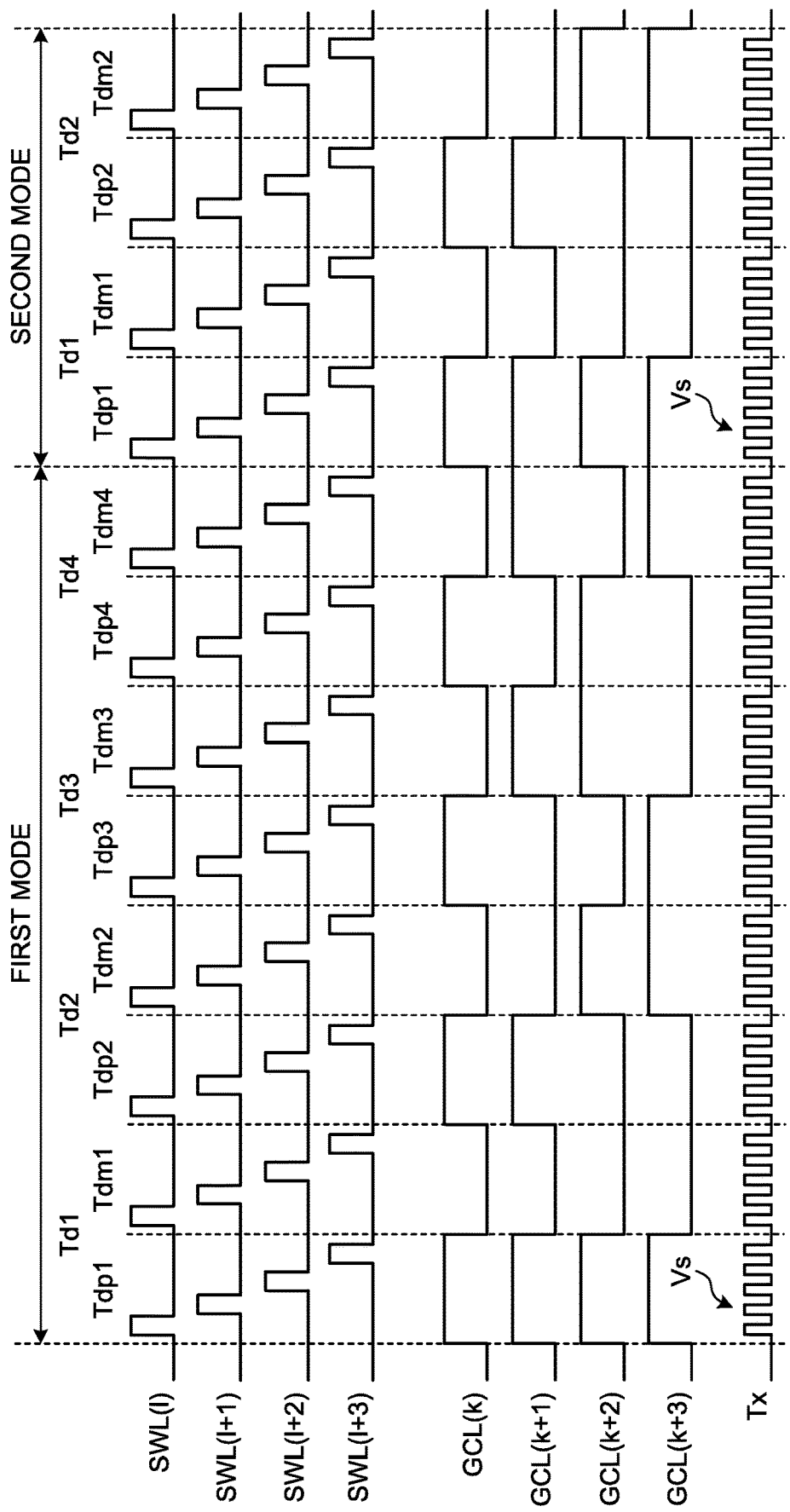
FIG. 16 is a timing waveform diagram of an operation example of a detection apparatus according to a first modification.

Although the first embodiment exemplifies a case in which the detection operation Td1 is performed for one detection electrode block RxB(1), and then the same detection operation Td1 is performed for the adjacent detection electrode block RxB(l+1) as illustrated in FIG. 10, the operation sequence is not limited thereto. FIG. 16 is a timing waveform diagram of an operation example of a detection apparatus according to a first modification. A detection apparatus 100A according to the first modification performs the positive sign selection operation Tdp of the detection operation Td for all the detection electrode blocks RxB and then performs the negative sign selection operation Tdm of the same detection operation Td. With such operations, the number of times of switching between the positive sign selection operation Tdp and the negative sign selection operation Tdm when one detection operation Td is performed by the first selection circuit 14 can be reduced.

Second Modification

Figure 17:
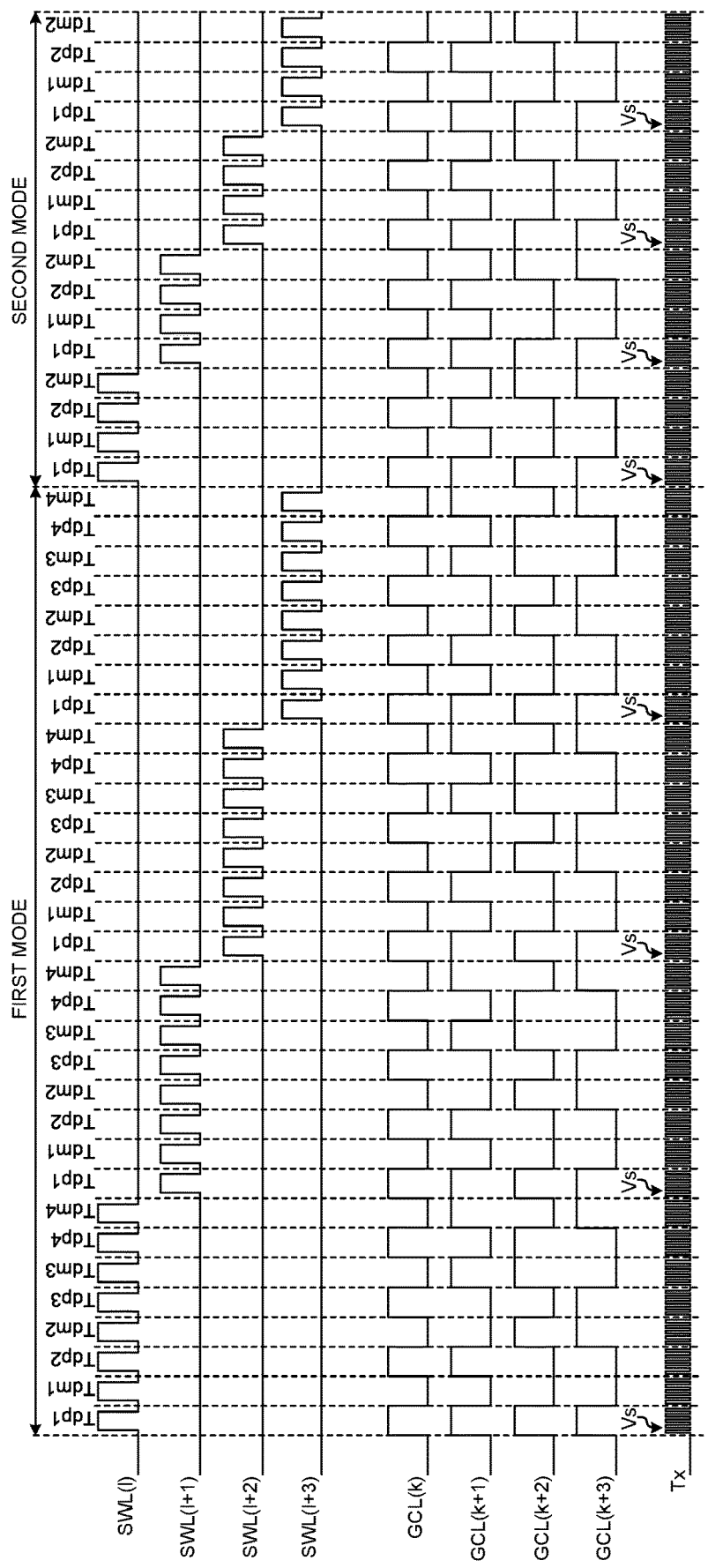
FIG. 17 is a timing waveform diagram of an operation example of a detection apparatus according to a second modification.

FIG. 17 is a timing waveform diagram of an operation example of a detection apparatus according to a second modification. A detection apparatus 100B according to the second modification performs all the detection operations Td for one detection electrode block RxB and then performs the detection operation Td for the next detection operation block RxB. With such operations, upon completion of all the detection operations Td for one detection electrode block RxB, decoding processing by the signal computing circuit 44 can be performed in parallel with the detection operation Td for the next detection electrode block RxB. When the detection operation Td1 to the detection operation Td4 for the detection electrode block RxB(1) have been performed, for example, decoding processing can be performed based on the detection signal Sc from the detection electrode block RxB(1) and the square matrix Hv in parallel with the start of the detection operation Td1 for the detection electrode block RxB(l+1). This can reduce a time for completing all the detection operations Td for one detection electrode block RxB. When, before all the detection operations Td for one detection electrode block RxB(1) are completed, the operation detection Td for another detection electrode block RxB(l+1) is performed, the detection signal Sv based on the detection operations Td of both the detection electrode block RxB(1) and the other detection electrode block RxB(l+1) need to be held in the storage circuit 48. However, the detection operation Td for the other detection electrode block RxB(l+1) is not performed until all the detection operations Td for the one detection electrode block RxB(1) are completed, and thus the amount of data held in the storage circuit 48 can be reduced.

Second Embodiment

Figure 18:
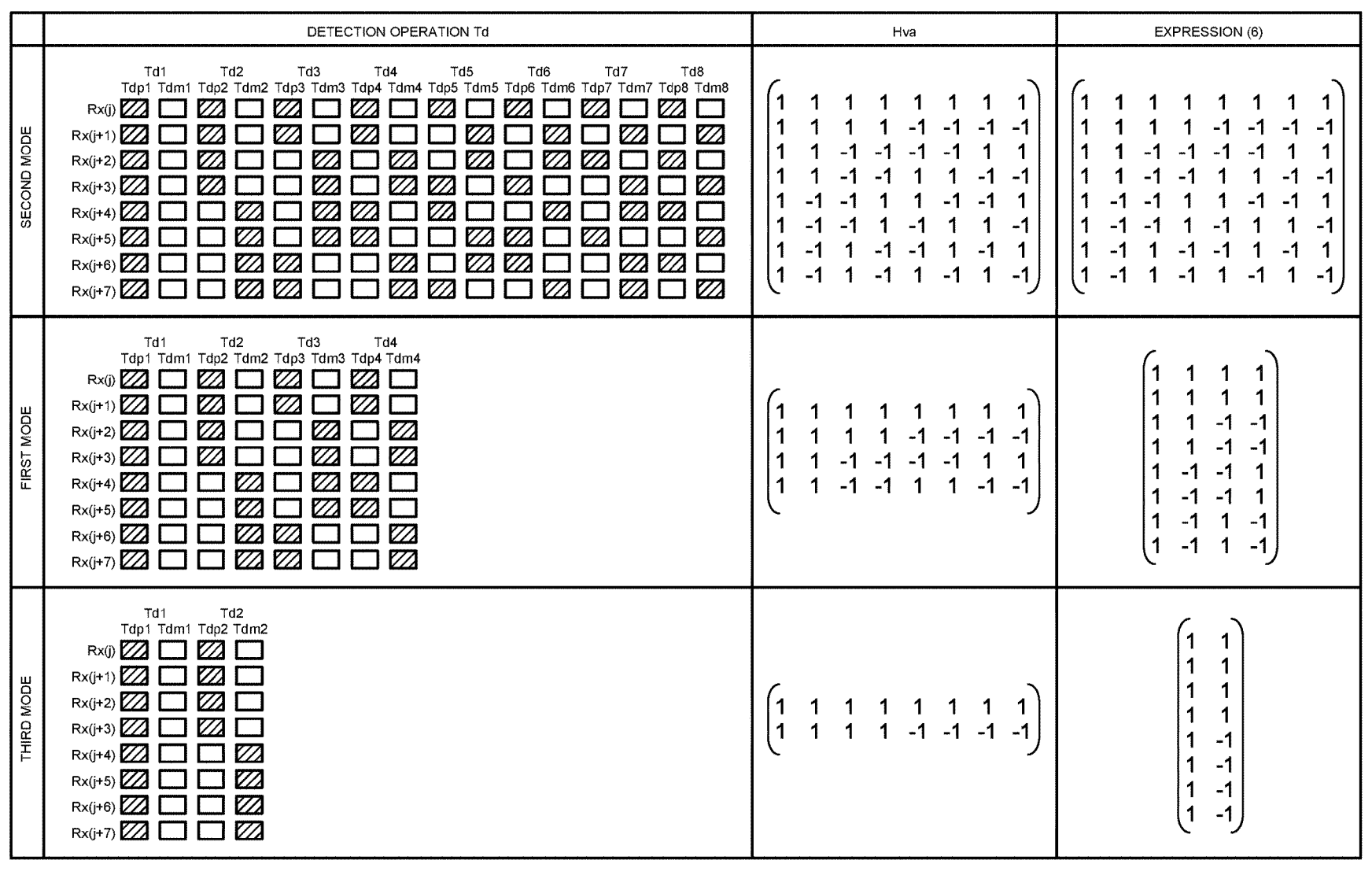

Although the first embodiment exemplifies a case in which the order d of the square matrix Hv as the certain sign is 4, the order d is not limited thereto. A second embodiment exemplifies a case in which the order d is 8. Although the first embodiment exemplifies a case in which the number of the operational modes is two: the first mode and the second mode, the number of the operational modes is not limited thereto. The second embodiment exemplifies a case in which a first mode, a second mode, and a third mode are included. FIG. 18 is a diagram of a correspondence relation between a detection operation and a certain sign in each operational mode in the second embodiment.

In the second embodiment, in a detection apparatus 200, the detection electrode block RxB includes eight detection electrodes Rx arranged in the column direction (n=8). The detection electrode block RxB(1) includes eight detection electrodes Rx(j), Rx(j+1), Rx(j+2), Rx(j+3), Rx(j+4), Rx(j+5), Rx(j+6), and Rx(j+7), for example.

The eight detection electrodes Rx(j) to Rx(j+7) are coupled to scan lines GCL(j), GCL(j+1), GCL(j+2), GCL(j+3), GCL(j+4), GCL(j+5), GCL(j+6), and GCL(j+7), respectively, via the respective switch elements SW1. The eight scan lines GCL(j) to GCL(j+7) are coupled to the first selection circuit 14. A plurality of detection electrodes Rx arranged in the row direction as illustrated in FIG. 3 are coupled to each of the scan lines GCL.

As illustrated in FIG. 18, the detection apparatus 200, in a manner similar to that illustrated in FIGS. 9A to 9D and FIG. 10, performs the positive sign selection operation Tdp1 of the detection operation Td1 corresponding to the elements "1" on the first row of a square matrix Hva and then performs the negative sign selection operation Tdm1 of the detection operation Td1 corresponding to the elements "−1" on the first row of the square matrix Hva. Similarly, the detection apparatus 200 alternately performs the positive sign selection operations Tdp and the negative sign selection operations Tdm of the detection operations Td corresponding to the second to the eighth rows of the square matrix Hva. In the positive sign selection operation Tdp1 of the detection operation Td1, the first selection circuit 14 of the detection apparatus 200 supplies a scan signal to Rx(j), Rx(j+1), Rx(j+2), Rx(j+3), Rx(j+4), Rx(j+5), Rx(j+6), and Rx(j+7) as the first selection targets based on the selection signal Vgclp from the first control circuit 114 in a manner similar to that illustrated in FIGS. 9A to 9D. The detection electrode Rx to which the scan signal has been supplied is coupled to the data line SGL via the switch element SW1, and the detection signal $Svp_1$ is output. Next, in the negative sign selection operation Tdm1 of the detection operation Td1, the first selection circuit 14 does not supply a scan signal to any detection electrodes Rx based on the selection signal Vgclm from the first control circuit 114, because there are no detection electrodes Rx as the first selection targets. A signal obtained when no detection electrodes Rx are coupled to the data lines SGL via the switch elements SW1 is output as the detection signal $Svm_1$. Similarly, the detection apparatus 200, in the second mode, performs n detection operations corresponding to n rows from the first row to the n-th row of the square matrix Hva in the period T2. The n is $2^{Na}$ and is 8 in the second embodiment. The detection apparatus 200 performs the detection operations Td from the detection operation Td1 to a detection operation Td8, and eight detection signals Svp ($Svp_1$, $Svp_2$, $Svp_3$, $Svp_4$, $Svp_5$, $Svp_6$, $Svp_7$, $Svp_8$) and eight detection signals Svm ($Svm_1$, $Svm_2$, $Svm_3$, $Svm_4$, $Svm_5$, $Svm_6$, $Svm_7$, $Svm_8$) are output to the detection circuit 40.

As described in Expression (3), the detection circuit 40 of the detection apparatus 200 subtracts the eight detection signals Svm from the eight detection signals Svp, respectively, to calculate eight detection signals Sc ($Sc_1$, $Sc_2$, $Sc_3$, $Sc_4$, $Sc_5$, $Sc_6$, $Sc_7$, $Sc_8$). Further, as described in Expression (4), the detection circuit 40 of the detection apparatus 200 decodes, based on the square matrix Hva, eight detection signals Sid ($Si_1d$, $Si_2d$, $Si_3d$, $Si_4d$, $Si_5d$, $Si_6d$, $Si_7d$, $Si_8d$) from the eight detection signals Sc ($Sc_1$, $Sc_2$, $Sc_3$, $Sc_4$, $Sc_5$, $Sc_6$, $Sc_7$, $Sc_8$). The decoded detection signals Sid correspond to signal values obtained by increasing the detection signals Si of the respective detection electrodes Rx eightfold. The detection circuit 40 associates the detection signal $Si_1d$ with the detection electrode Rx(j). The detection circuit 40 associates the detection signal $Si_2d$ with the detection electrode Rx(j+1). The detection circuit 40 associates the detection signal $Si_3d$ with the detection electrode Rx(j+2). The detection circuit 40 associates the detection signal $Si_3d$ with the detection electrode Rx(j+3). The detection circuit 40 associates the detection signal $Si_5d$ with the detection electrode Rx(j+4). The detection circuit 40 associates the detection signal $Si_6d$ with the detection electrode Rx(j+5). The detection circuit 40 associates the detection signal $Si_7d$ with the detection electrode Rx(j+6). The detection circuit 40 associates the detection signal $Si_8d$ with the detection electrode Rx(j+7). The detection circuit 40 detects a signal change corresponding to the recess or protrusion of a finger Fin based on the detection signals Sid associated with the respective detection electrodes.

The following describes the first mode in the second embodiment. In the first mode, r detection operations Td corresponding to r rows from the first row to the r-th row of the square matrix Hva are performed in the period T1, which is shorter than the period T2. The r is $2^{Nb}$ and is 4 in the embodiment. The r detection operations Td in the first mode are performed in a manner similar to part of the n detection operations Td in the second mode. Specifically, the detection operation Td1 to the detection operation Td4 performed in the first mode correspond to the detection operation Td1 to the detection operation Td4 performed in the second mode. In the first mode, the detection apparatus 200 performs the detection operations Td from the detection operation Td1 to the detection operation Td4 to output the four detection signals Svp ($Svp_1$, $Svp_2$, $Svp_3$, $Svp_4$) and the four detection signals Svm ($Svm_1$, $Svm_2$, $Svm_3$, $Svm_4$) to the detection circuit 40. As described in Expression (5), the detection circuit 40 of the detection apparatus 200 subtracts the four detection signals Svm from the four detection signals Svp, respectively, to calculate the four detection signals Sc ($Sc_1$, $Sc_2$, $Sc_3$, $Sc_4$). Further, as described in Expression (7), the detection circuit 40 of the detection apparatus 200 calculates, based on a matrix of up to the r-th column in the square matrix Hva, eight decoded detection signals $(d/2)(Si_1+Si_2)$, $(d/2)(Si_1+Si_2)$, $(d/2)(Si_3+Si_4)$, $(d/2)(Si_3+Si_4)$, $(d/2)(Si_5+Si_6)$, $(d/2)(Si_5+Si_6)$, $(d/2)(Si_7+Si_8)$, and $(d/2)(Si_7+Si_8)$ from the four detection signals Sc ($Sc_1$, $Sc_2$, $Sc_3$, $Sc_4$). The detection circuit 40 associates the detection signal $(d/2)(Si_1+Si_2)$ with the detection electrode Rx(j) and the detection electrode Rx(j+1). The detection circuit 40 associates the detection signal $(d/2)(Si_3+Si_4)$ with the detection electrode Rx(j+2) and the detection electrode Rx(j+3). The detection circuit 40 associates the detection signal $(d/2)(Si_5+Si_6)$ with the detection electrode Rx(j+4) and the detection electrode Rx(j+5). The detection circuit 40 associates the detection signal (d/2)(Si$_7$+Si$_8$) with the detection electrode Rx(j+6) and the detection electrode Rx(j+7). In the second embodiment, d/2 is 4. The detection circuit 40 detects a signal change corresponding to the recess or protrusion of a finger Fin based on the decoded detection signals (d/2)(Si$_1$+Si$_2$), (d/2)(Si$_3$+Si$_4$), (d/2)(Si$_5$+Si$_6$), and (d/2)(Si$_7$+Si$_8$) associated with the detection electrodes.

In other words, the same signal is assigned to the $2^{Na-Nb}$ adjacent detection electrodes adjacent to each other included in the detection electrode block RxB. This signal corresponds to a $d/2^{Na-Nb}$ multiple of a detection signal when the first selection circuit 14 selects the adjacent detection electrodes. In the second embodiment, the order d of the square matrix Hva is 8, Na–Nb is 1, and $d/2^{Na-Nb}$ is 4. Specifically, the detection electrode Rx(j) corresponds to the quadruple of a detection signal (Si$_1$+Si$_2$) output when the detection electrode Rx(j) and the detection electrode Rx(j+1), which is adjacent to the detection electrode Rx(j), are selected by the first selection circuit 14. The detection apparatus 200 detects the recess or protrusion of a finger Fin as the external object based on the decoded detection signals (d/2)(Si$_1$+Si$_2$), (d/2)(Si$_3$+Si$_4$), (d/2)(Si$_5$+Si$_6$), and (d/2)(Si$_7$+Si$_8$).

Such a second mode is included, whereby the adjacent detection electrodes share the same detection signal, and one frame of the detection operation Td can be completed in the period T1, which is shorter than the period T2, although detection resolution in a direction in which the adjacent detection electrodes are arranged (e.g., the column direction) reduces.

The following describes the third mode in the second embodiment. In the third mode, s detection operations Td corresponding to s rows from the first row to the s-th row of the square matrix Hva are performed in a period T3, which is shorter than the period T1. The s is $2^{Nc}$ and is 2 in the second embodiment. The Nc is an integer equal to or greater than 0 and is a value less than Nb. The s detection operations Td in the third mode are performed in a manner similar to part of the s detection operations Td in the second mode. Specifically, the detection operation Td1 to the detection operation Td2 performed in the third mode correspond to the detection operation Td1 to the detection operation Td2 performed in the second mode. In the third mode, the detection apparatus 200 performs the detection operations Td from the detection operation Td1 to the detection operation Td2 to output the two detection signals Svp (Svp$_1$, Svp$_2$) and the two detection signals Svm (Svm$_1$, Svm$_2$) to the detection circuit 40. As described in Expression (5), the detection circuit 40 of the detection apparatus 200 subtracts the two detection signals Svm from the two detection signals Svp, respectively, to calculate the two detection signals Sc (Sc$_1$, Sc$_2$). Further, as described in Expression (8) below, the detection circuit 40 of the detection apparatus 200 calculates, based on a matrix up to the s-th column of the square matrix Hva, eight decoded detection signals (d/4)(Si$_1$+Si$_2$+Si$_3$+Si$_4$), (d/4)(Si$_1$+Si$_2$+Si$_3$+Si$_4$), (d/4)(Si$_1$+Si$_2$+Si$_3$+Si$_4$), (d/4)(Si$_1$+Si$_2$+Si$_3$+Si$_4$), (d/4)(Si$_5$+Si$_6$+Si$_7$+Si$_8$), (d/4)(Si$_5$+Si$_6$+Si$_7$+Si$_8$), (d/4)(Si$_5$+Si$_6$+Si$_7$+Si$_8$), and (d/4)(Si$_5$+Si$_6$+Si$_7$+Si$_8$) from the two detection signals Sc (Sc$_1$, Sc$_2$). The detection circuit 40 associates the detection signal (d/4)(Si$_1$+Si$_2$+Si$_3$+Si$_4$) with the detection electrodes Rx(j), Rx(j+1), Rx(j+2), and Rx(j+3). The detection circuit 40 associates the detection signal (d/4)(Si$_5$+Si$_6$+Si$_7$+Si$_8$) with the detection electrodes Rx(j+4), Rx(j+5), and Rx(j+6) and the detection electrode Rx(j+7). In the second embodiment, d/4 is 2. The detection circuit 40 detects a signal change corresponding to the recess or protrusion of a finger Fin based on the decoded detection signals (d/4)(Si$_1$+Si$_2$+Si$_3$+Si$_4$) and (d/4)(Si$_5$+Si$_6$+Si$_7$+Si$_8$) associated with the detection electrodes.

$$\begin{pmatrix} (d/4)(Si_1+Si_2+Si_3+Si_4) \\ (d/4)(Si_1+Si_2+Si_3+Si_4) \\ (d/4)(Si_1+Si_2+Si_3+Si_4) \\ (d/4)(Si_1+Si_2+Si_3+Si_4) \\ (d/4)(Si_5+Si_6+Si_7+Si_8) \\ (d/4)(Si_5+Si_6+Si_7+Si_8) \\ (d/4)(Si_5+Si_6+Si_7+Si_8) \\ (d/4)(Si_5+Si_6+Si_7+Si_8) \end{pmatrix} = \begin{pmatrix} 1 & 1 \\ 1 & 1 \\ 1 & 1 \\ 1 & 1 \\ 1 & -1 \\ 1 & -1 \\ 1 & -1 \\ 1 & -1 \end{pmatrix} \begin{pmatrix} Sc_1 \\ Sc_2 \\ 0 \\ 0 \\ 0 \\ 0 \\ 0 \\ 0 \end{pmatrix} \quad (8)$$

$$= \begin{pmatrix} 1 & 1 & 0 & 0 & 0 & 0 & 0 & 0 \\ 1 & 1 & 0 & 0 & 0 & 0 & 0 & 0 \\ 1 & 1 & 0 & 0 & 0 & 0 & 0 & 0 \\ 1 & 1 & 0 & 0 & 0 & 0 & 0 & 0 \\ 1 & -1 & 0 & 0 & 0 & 0 & 0 & 0 \\ 1 & -1 & -0 & 0 & 0 & 0 & 0 & 0 \\ 1 & -1 & 0 & 0 & 0 & 0 & 0 & 0 \\ 1 & -1 & 0 & 0 & 0 & 0 & 0 & 0 \end{pmatrix} \begin{pmatrix} Sc_1 \\ Sc_2 \\ 0 \\ 0 \\ 0 \\ 0 \\ 0 \\ 0 \end{pmatrix}$$

$$= \begin{pmatrix} 1 & 1 \\ 1 & 1 \\ 1 & 1 \\ 1 & 1 \\ 1 & -1 \\ 1 & -1 \\ 1 & -1 \\ 1 & -1 \end{pmatrix} \begin{pmatrix} Sc_1 \\ Sc_2 \\ 0 \\ 0 \\ 0 \\ 0 \\ 0 \\ 0 \end{pmatrix}$$

In other words, the same signal is assigned to the $2^{Na-Nc}$ adjacent detection electrodes adjacent to each other included in the detection electrode block RxB. This signal corresponds to a d/4 multiple of a detection signal when the first selection circuit 14 selects the adjacent detection electrodes. Specifically, the detection electrode Rx(j) corresponds to the double of a detection signal (Si$_1$+Si$_2$+Si$_3$+Si$_4$) output when the detection electrode Rx(j), the detection electrode Rx(j+1), which is adjacent to the detection electrode Rx(j), the detection electrode Rx(j+2), which is adjacent to the detection electrode Rx(j+1), and the detection electrode Rx(j+3), which is adjacent to the detection electrode Rx(j+2), are selected by the first selection circuit 14. The detection apparatus 200 detects the recess or protrusion of a finger Fin as the external object based on the decoded detection signals (d/4)(Si$_1$+Si$_2$+Si$_3$+Si$_4$) and (d/4)(Si$_5$+Si$_6$+Si$_7$+Si$_8$).

Such a third mode is included, whereby the adjacent detection electrodes share the same detection signal, and one frame of the detection operation Td can be completed in the period T3, which is shorter than the period T1, although detection resolution in a direction in which the adjacent detection electrodes are arranged (e.g., the column direction) reduces.

Although the second embodiment exemplifies a case in which the detection apparatus 200 has the three operational modes: the first mode to the third mode, the operational modes are not limited thereto. Four or more operational modes may be included. Although a case in which the number of times of the detection operations Td performed in the first mode and the second mode is ½ is exemplified, this is not limiting; the number of times of the detection operations Td performed in the first mode and the second mode is only required to be $½^{Na-Nb}$. The detection apparatus 200 may only have the second mode and the third mode except the first mode, for example. Although a case in which the number of times of the detection operations Td performed in the first mode and the third mode is ½ is exemplified, the number of times of the detection operations Td is not limited thereto. The number of times of the detection operations Td performed in the first mode and the third mode is only required to be $½^{Nb-Nc}$.

Third Embodiment

The first embodiment describes an operation example when the sign section driving is used for detection in the Y direction (the second direction). A third embodiment describes an operation example when the sign selection driving is used for detection in the X direction (the first direction) and the Y direction (the second direction). That is to say, in the third embodiment, the first selection operation and the second selection operation are performed for each of the X direction (the first direction) and the Y direction (the second direction).

Figure 19:
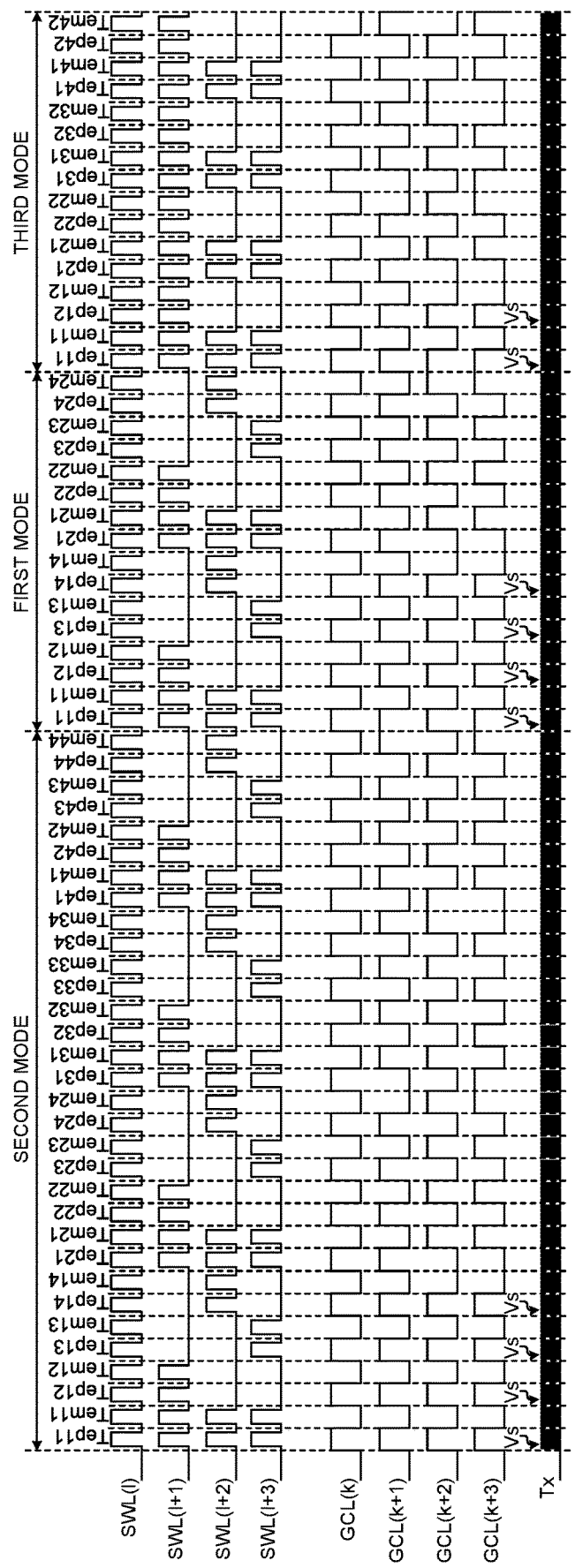
FIG. 19 is a timing waveform diagram of an operation example of a detection apparatus according to a third embodiment.

FIG. 19 is a timing waveform diagram of an operation example of a detection apparatus according to the third embodiment. FIG. 20A to FIG. 22F are diagrams of selection patterns of the detection electrodes by the sign selection driving for the detection electrode blocks according to the third embodiments. This detection apparatus 300 according to the third embodiment has second detection electrode blocks BKNB each including a plurality of detection electrodes Rx coupled to the same scan line GCL. The detection apparatus 300 has a second detection electrode block BKNB(k) including the detection electrodes Rx coupled to the scan line GCL(k), a second detection electrode block BKNB(k+1) including the detection electrodes Rx coupled to the scan line GCL(k+1), a second detection electrode block BKNB(k+2) including the detection electrodes Rx coupled to the scan line GCL(k+2), and a second detection electrode block BKNB(k+3) including the detection electrodes Rx coupled to the scan line GCL(k+3), for example. The detection circuit 40 of the detection apparatus 300 includes a first detection circuit DET1 and a second detection circuit DET2. Further, the detection apparatus 300 includes a plurality of switch elements SW2a and a plurality of switch elements SW2b as the second selection circuit 15. One end of one switch element SW2a and one end of one switch element SW2b are coupled to one data line SGL. One end of a switch element SW2a(1) and one end of a switch element SW2b(1) are coupled to the data line SGL(1), for example. The switch elements SW2a coupled to the detection electrodes Rx included in one second detection electrode block BKNB are coupled to the first detection circuit DET1 via common wiring. The other ends of the switch elements SW2a(1), SW2a(l+1), SW2a(l+2), and SW2a(l+3) coupled to the detection electrodes Rx included in the second detection electrode block BKNB(k) via the data lines SGL are coupled to the first detection circuit DET1 via the common wiring, for example. The switch elements SW2b coupled to the detection electrodes Rx included in one second detection electrode block BKNB are coupled to the second detection circuit DET2 via common wiring. The other ends of the switch elements SW2b(1), SW2b(l+1), SW2b(l+2), and SW2b(l+3) coupled to the detection electrodes Rx included in the second detection electrode block BKNB(k) via the data lines SGL are coupled to the second detection circuit DET2 via the common wiring, for example. Further, the switch element SW2a and the switch element SW2b coupled to one data line SGL are controlled by a switch control line SWL that is common thereto. The switch element SW2a and the switch element SW2b coupled to the data line SGL(1) are controlled by a switch control line SWL(1), for example. The switch element SW2a couples the first detection circuit DET1 and the data line SGL to each other when a first voltage is supplied from the switch control line SWL and uncouples the first detection circuit DET1 from the data line SGL when a second voltage is supplied. The switch element SW2b couples the second detection circuit DET2 and the data line SGL to each other when the second voltage is supplied from the switch control line SWL and uncouples the second detection circuit DET2 from the data line SGL when the first voltage is supplied. In the third embodiment, the first voltage is a voltage higher than the second voltage. The detection apparatus 300 selectively drives the switch elements SW2a and the switch elements SW2b of the second selection circuit 15 based on the certain sign to perform the sign selection driving in the X direction (the first direction).

Figure 20A:
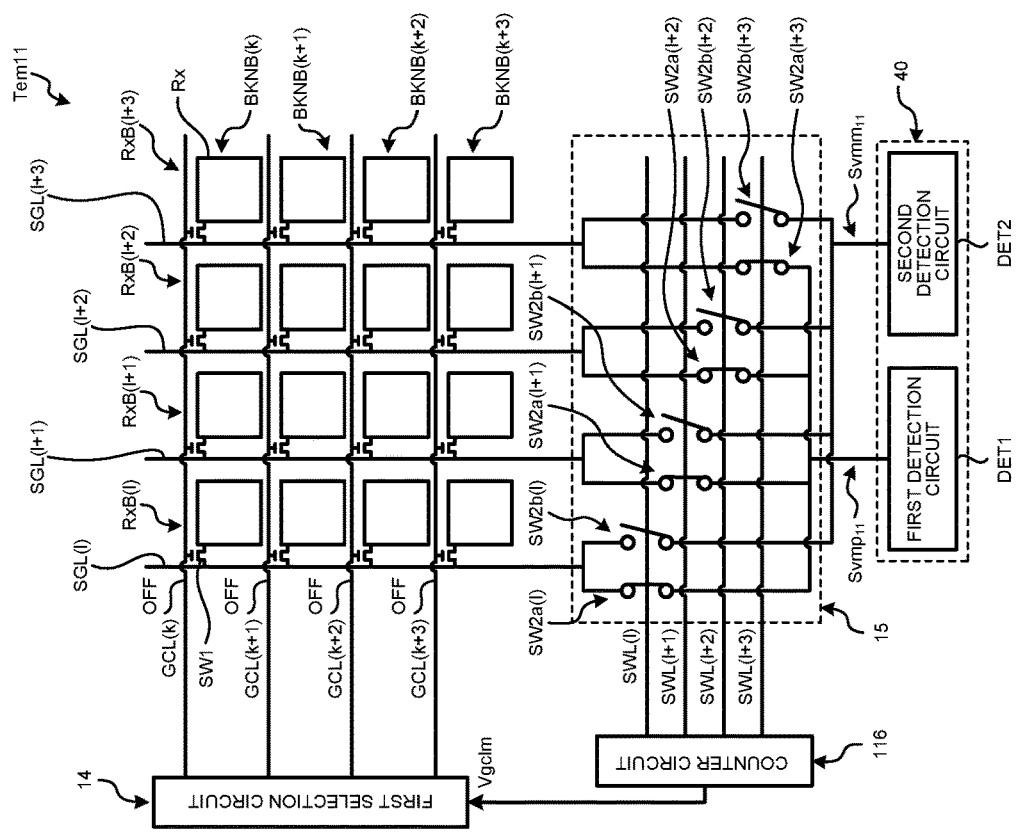
FIGS. 20A to 20D are diagrams of selection patterns of the detection electrodes by the sign selection driving for the detection electrode blocks according to the third embodiment.
Figure 20B:
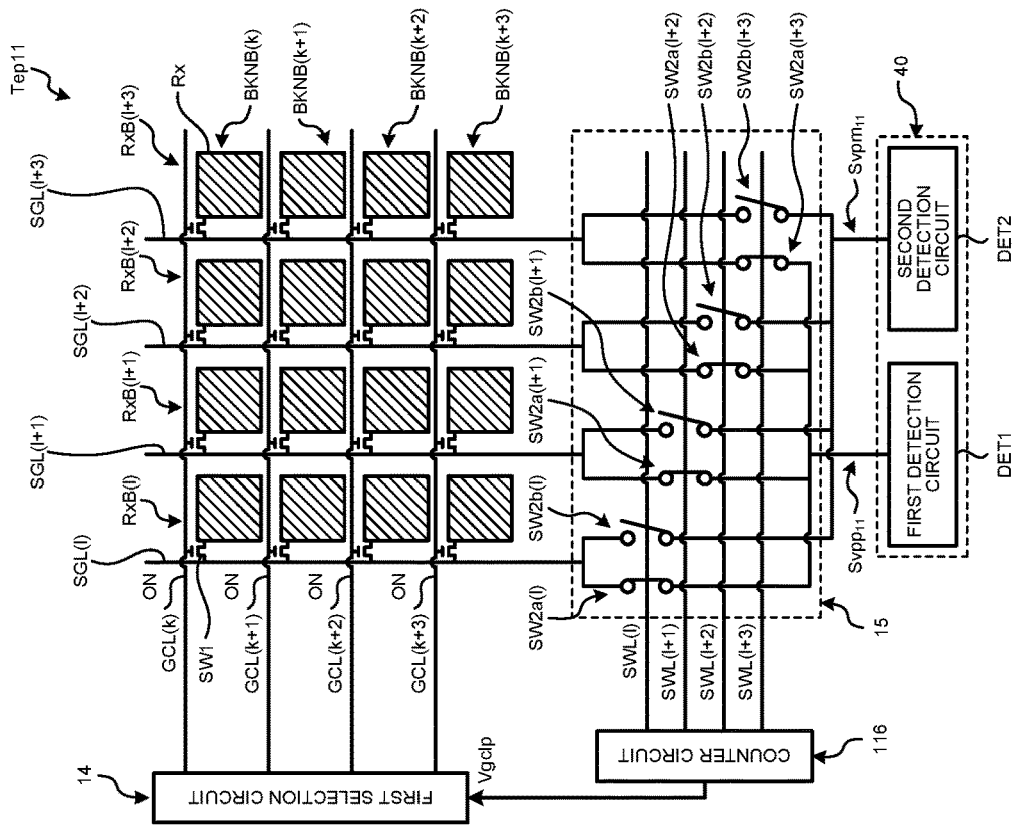
Figure 20C:
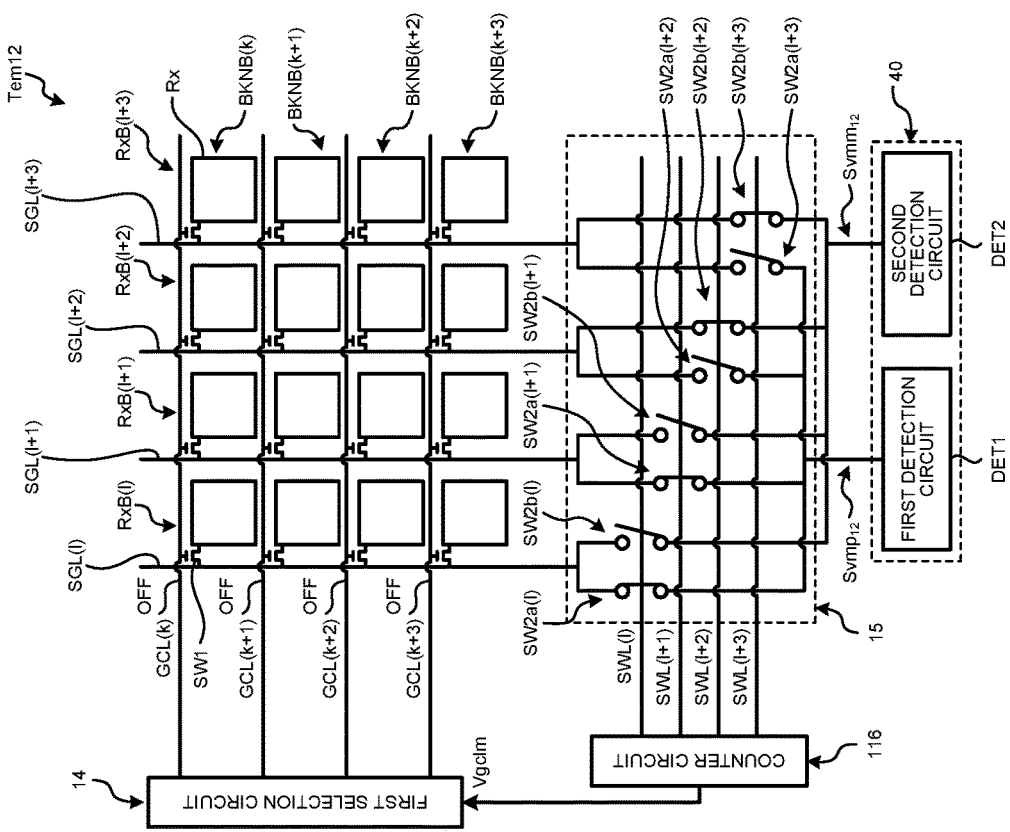
Figure 20D:
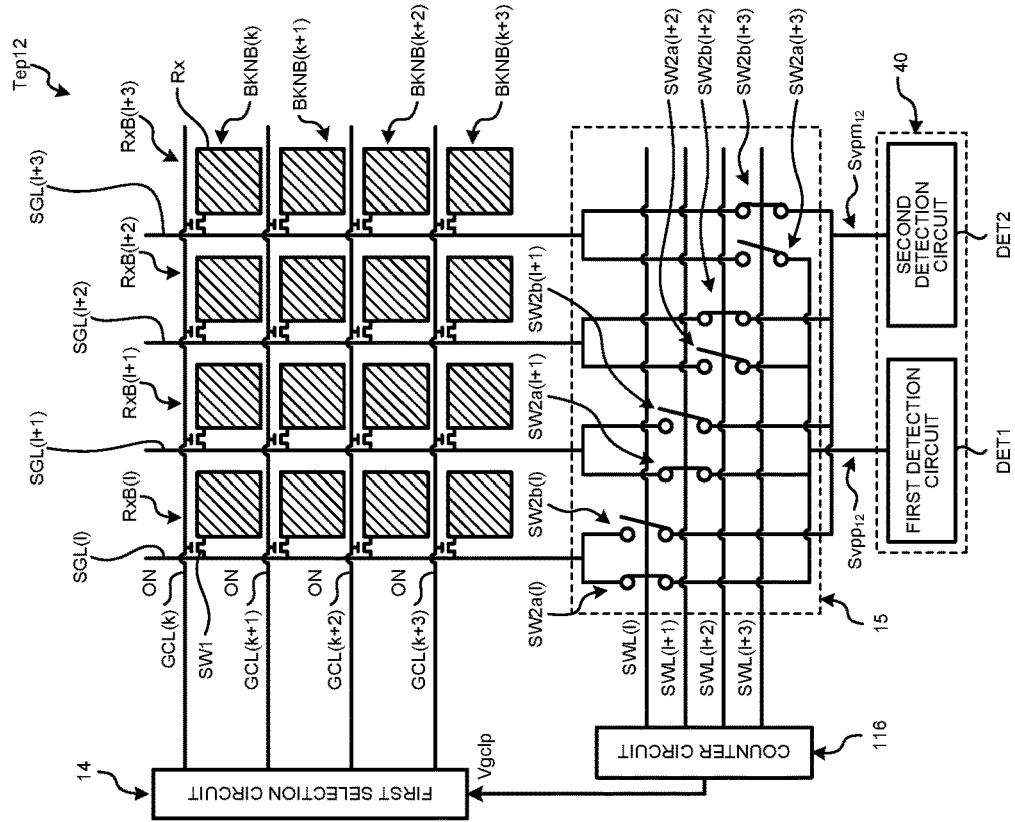

The following first describes a detection operation of the second mode performed by the detection apparatus 300. FIG. 20A illustrates a positive sign selection operation Tep11 of a detection operation Te11, FIG. 20B illustrates a negative sign selection operation Tem11 of the detection operation Te11, FIG. 20C illustrates a positive sign selection operation Tep12 of a detection operation Te12, and FIG. 20D illustrates a negative sign selection operation Tem12 of the detection operation Te12. In the detection apparatus 300, the certain sign used in the sign selection driving in the Y direction (the second direction) is the square matrix Hv. As in the first embodiment, the square matrix Hv is a Walsh Hadamard matrix, and the order d of the square matrix Hv is an integer equal to or greater than the number n of the detection electrodes Rx included in the detection electrode block RxB. In the third embodiment, the order d of the square matrix Hv is 4 as described in Expression (2). In the sign selection driving in the Y direction (the second direction) illustrated in FIG. 20A, the detection electrodes Rx belonging to the second detection electrode blocks BKNB (k), BKNB(k+1), BKNB(k+2), and BKNB(k+3) are selected as the detection electrodes Rx as the first selection targets of the square matrix Hv in accordance with the elements "1" on the first row of the square matrix Hv described in Expression (2).

In the third embodiment, the second selection circuit 15 simultaneously performs the positive sign selection operation and the negative sign selection operation corresponding to each column of the square matrix Hh in the X direction (the first direction). More specifically, in the positive sign selection operation in the X direction (the first direction), the detection electrode block RxB corresponding to the element "1" of the square matrix Hh is selected as the first selection target and is coupled to the first detection circuit DET1 via the switch element SW2a. The detection electrode block RxB as the second selection target other than the first selection target is coupled to the second detection circuit DET2. The second selection target in the positive sign selection operation corresponds to the element "−1" of the square matrix Hh and corresponds to the first selection target in the negative sign selection operation, and thus a detection signal to be supplied to the second detection circuit DET2 is equal to a detection signal in the negative sign selection operation. Consequently, in the present disclosure, the detection electrode block RxB corresponding to the element "1" of the square matrix Hh is the first selection target, whereas the detection electrode block RxB corresponding to the element "−1" of the square matrix Hh is the second selection target. In FIG. 20A, the sign selection driving in the X direction (the first direction) simultaneously performs the positive sign selection operation and the negative sign selection operation. In accordance with the elements "1" on the first column of the square matrix Hh described in Expression (9) below, the detection electrodes Rx belonging to the detection electrode blocks RxB(1), RxB(l+1), RxB(l+2), and RxB(l+3) are selected as the detection electrodes Rx as the first selection targets of the square matrix Hh and are coupled to the first detection circuit DET1 via the second selection circuit 15. There are no elements "−1" on the first column of the square matrix Hh, and thus no detection electrodes Rx are selected as the second selection targets of the square matrix Hh corresponding to the component "−1".

$$Hh = \begin{pmatrix} 1 & 1 & 1 & 1 \\ 1 & 1 & -1 & -1 \\ 1 & -1 & -1 & 1 \\ 1 & -1 & 1 & -1 \end{pmatrix} \quad (9)$$

The certain sign for use in the sign selection driving in the X direction (the first direction) is the square matrix Hh. The square matrix Hh is a Walsh Hadamard matrix and is a square matrix in which "1" or "−1" are included as its elements and any different two rows form an orthogonal matrix. An order t of the square matrix Hh is equal to or greater than a number u of the detection electrodes Rx included in the second detection electrode block BKNB (k). In the third embodiment, the order t of the square matrix Hh is equal to the number u of the detection electrodes Rx included in one second detection electrode block BKNB and is 4 as indicated in Expression (9). The order d of the square matrix Hv as the certain sign of the sign selection driving in the Y direction (the second direction) and the order t of the square matrix Hh as the certain sign of the sign selection driving in the X direction (the first direction) may be different from each other.

In the positive sign selection operation Tep11 of the detection operation Te11, a signal obtained by integrating the detection signals Si of the respective detection electrodes Rx is output to the first detection circuit DET1 as a detection signal $Svpp_{11}$. In the positive sign selection operation Tep11 of the detection operation Te11, a detection signal $Svpm_{11}$ to be output to the second detection circuit DET2 is 0 ($Svpm_{11}=0$). From the difference therebetween, the signal computing circuit 44 of the detection apparatus 300 calculates a detection signal $Svhp_{11}$ ($Svhp_{11}=Svpp_{11}-Svpm_{11}$).

In FIG. 20B, because there are no elements "−1" on the first row of the square matrix Hv, the sign selection driving in the Y direction (the second direction) does not select any detection electrodes Rx belonging to the second detection electrode blocks BKNB(k), BKNB(k+1), BKNB(k+2), and BKNB(k+3) as the first selection targets of the square matrix Hv corresponding to the element "−1".

In the negative sign selection operation Tem11 of the detection operation Te11, a detection signal $Svmp_{11}$ to be output to the first detection circuit DET1 and a detection signal $Svmm_{11}$ to be output to the second detection circuit DET2 are 0 ($Svmp_{11}=Svmm_{11}=0$). From the difference therebetween, the signal computing circuit 44 calculates a detection signal $Svhm_{11}$ ($Svhm_{11}=Svmp_{11}-Svmm_{11}$). From the difference between the $Svhp_{11}$ and the detection signal $Svhm_{11}$, the signal computing circuit 44 calculates a detection signal $Svh_{11}$ in the detection operation Te11.

In FIG. 20C, the positive sign selection operation in the Y direction (the second direction) corresponding to the elements "1" on the first row of the square matrix Hv is performed in a manner similar to that illustrated in FIG. 20A. In FIG. 20D, the negative sign selection operation in the Y direction (the second direction) corresponding to the elements "−1" on the first row of the square matrix Hv is performed in a manner similar to that illustrated in FIG. 20B. In the positive sign selection operation Tep12 and the negative sign selection operation Tem12 of the detection operation Te12, as illustrated in FIG. 20C and FIG. 20D, the sign selection driving in the X direction (the first direction) selects the detection electrodes Rx of the detection electrode blocks RxB(1) and RxB(l+1) as the first selection targets of the square matrix Hh in accordance with the elements "1" on the second column of the square matrix Hh and selects the detection electrodes Rx of the detection electrode blocks RxB(l+2) and RxB(l+3) as the second selection targets of the square matrix Hh in accordance with the elements "−1" on the second column of the square matrix Hh. In the positive sign selection operation Tep12 of the detection operation Te12 illustrated in FIG. 20C, the signal computing circuit 44 calculates a detection signal $Svhp_{12}$ ($Svhp_{12}=Svpp_{12}-Svpm_{12}$). In the negative sign selection operation Tem12 of the detection operation Te12 illustrated in FIG. 20D, the signal computing circuit 44 calculates a detection signal $Svhm_{12}$ ($Svhm_{12}=Svmp_{12}-Svmm_{12}$). From the difference between the detection signal $Svhp_{12}$ and the detection signal $Svhm_{12}$, the signal computing circuit 44 calculates a detection signal $Svh_{12}$ in the detection operation Te12.

Figure 21A:
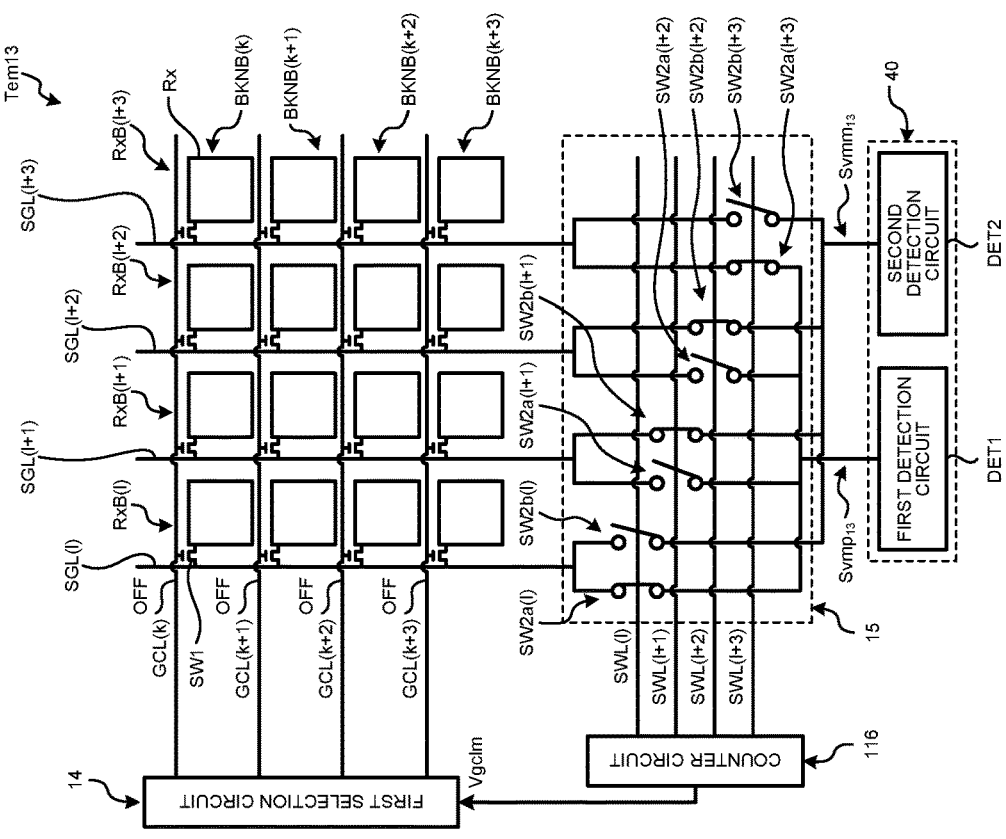
FIGS. 21A to 21D are diagrams of selection patterns of the detection electrodes by the sign selection driving for the detection electrode blocks according to the third embodiment.
Figure 21B:
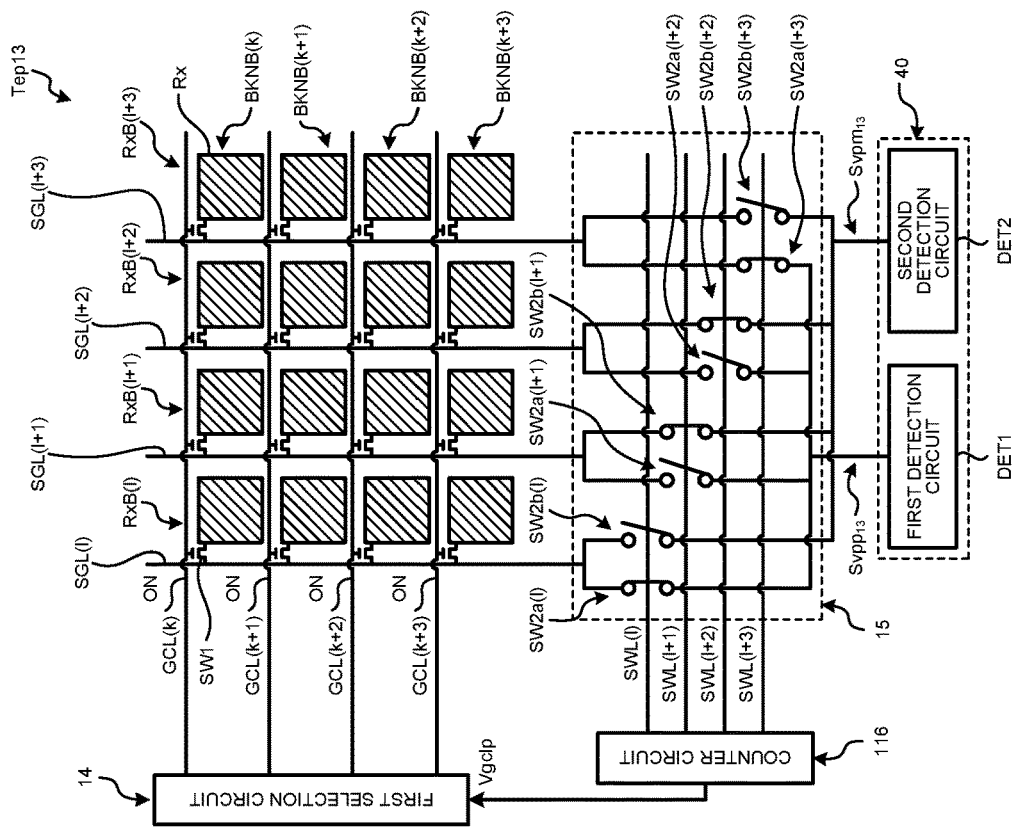
Figure 21C:
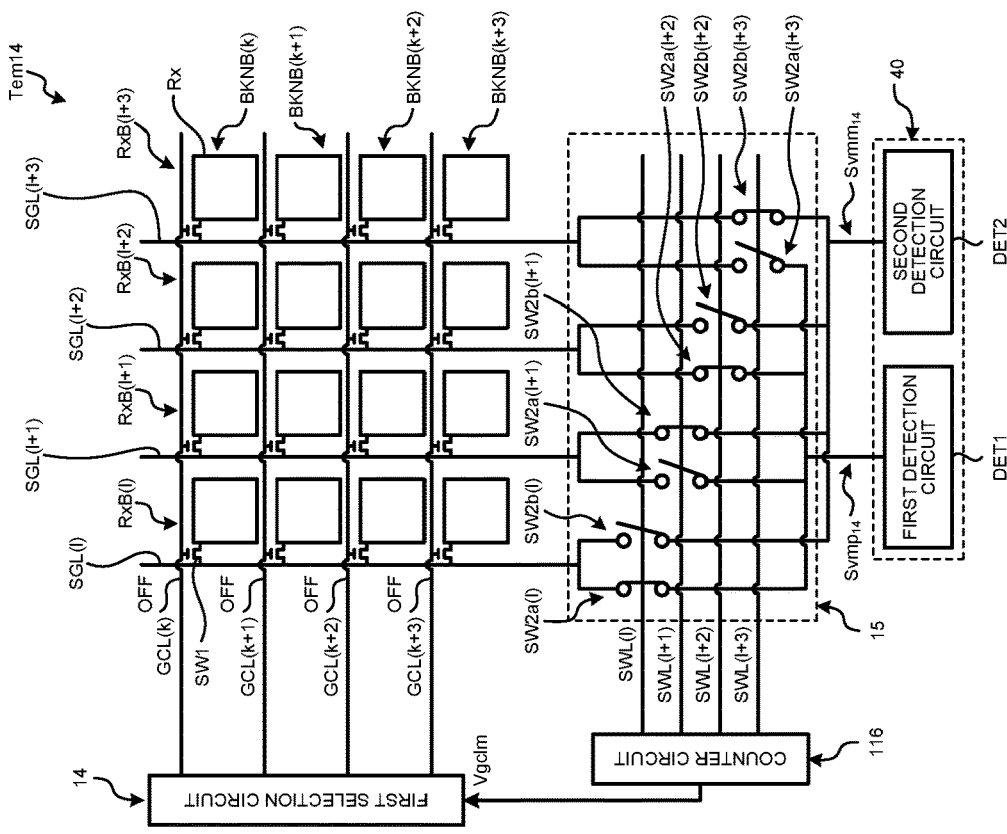
Figure 21D:
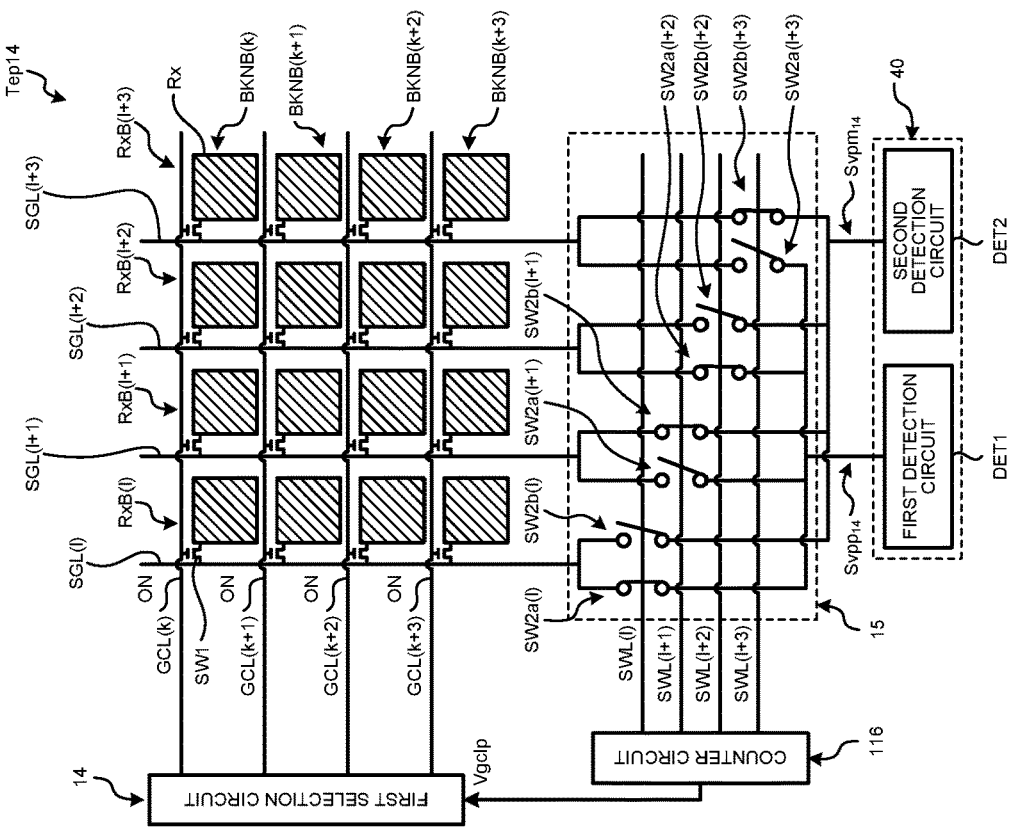

FIG. 21A illustrates a positive sign selection operation Tep13 of a detection operation Te13, FIG. 21B illustrates a negative sign selection operation Tem13 of the detection operation Te13, FIG. 21C illustrates a positive sign selection operation Tep14 of a detection operation Te14, and FIG. 21D illustrates a negative sign selection operation Tem14 of the detection operation Te14. The sign selection driving in the Y direction (the second direction) illustrated in FIG. 21A to FIG. 21D is similar to that illustrated in FIG. 20A to FIG. 20D. That is to say, in FIG. 21A and FIG. 21C, the positive sign selection operations in the Y direction (the second direction) corresponding to the elements "1" on the first row of the square matrix Hv are performed, whereas in FIG. 21B and FIG. 21D, the negative sign selection operations in the Y direction (the second direction) corresponding to the elements "−1" on the first row of the square matrix Hv are performed.

In FIG. 21A and FIG. 21B, the sign selection driving in the X direction (the first direction) selects the detection electrodes Rx of the detection electrode blocks RxB(1) and RxB(l+3) as the first selection targets of the square matrix Hh in accordance with the elements "1" on the third column of the square matrix Hh and selects the detection electrodes Rx of the detection electrode blocks RxB(l+1) and RxB(l+2) as the second selection targets of the square matrix Hh in accordance with the elements "−1" on the third column of the square matrix Hh. In the positive sign selection operation Tep13 of the detection operation Te13 illustrated in FIG. 21A, the signal computing circuit 44 calculates a detection signal $Svhp_{13}$ ($Svhp_{13}=Svpp_{12}-Svpm_{13}$). In the negative sign selection operation Tem13 of the detection operation Te13 illustrated in FIG. 21B, the signal computing circuit 44 calculates a detection signal $Svhm_{13}$ ($Svhm_{13}=Svmp_{13}-Svmm_{13}$). From the difference between the detection signal $Svhp_{13}$ and the detection signal $Svhm_{13}$, the signal computing circuit 44 calculates a detection signal $Svh_{13}$ in the detection operation Te13.

In FIG. 21C and FIG. 21D, the sign selection driving in the X direction (the first direction) selects the detection electrodes Rx of the detection electrode blocks RxB(1) and RxB(l+2) as the first selection targets of the square matrix Hh in accordance with the elements "1" on the fourth column of the square matrix Hh and selects the detection electrodes Rx of the detection electrode blocks RxB(l+1) and RxB(l+3) as the second selection targets of the square matrix Hh in accordance with the elements "−1" on the four column of the square matrix Hh. In the positive sign selection operation Tep14 of the detection operation Te14 illustrated in FIG. 21C, the signal computing circuit 44 calculates a detection signal $Svhp_{14}$ ($Svhp_{14}=Svpp_{14}-Svpm_{14}$). In the negative sign selection operation Tem14 of the detection operation Te14 illustrated in FIG. 21D, a detection signal $Svhm_{14}$ ($Svhm_{14}=Svmp_{14}-Svmm_{14}$) is calculated. From the difference between the detection signal $Svhp_{14}$ and the detection signal $Svhm_{14}$, the signal computing circuit 44 calculates a detection signal $Svh_{14}$ in the detection operation Te14.

Figure 22A:
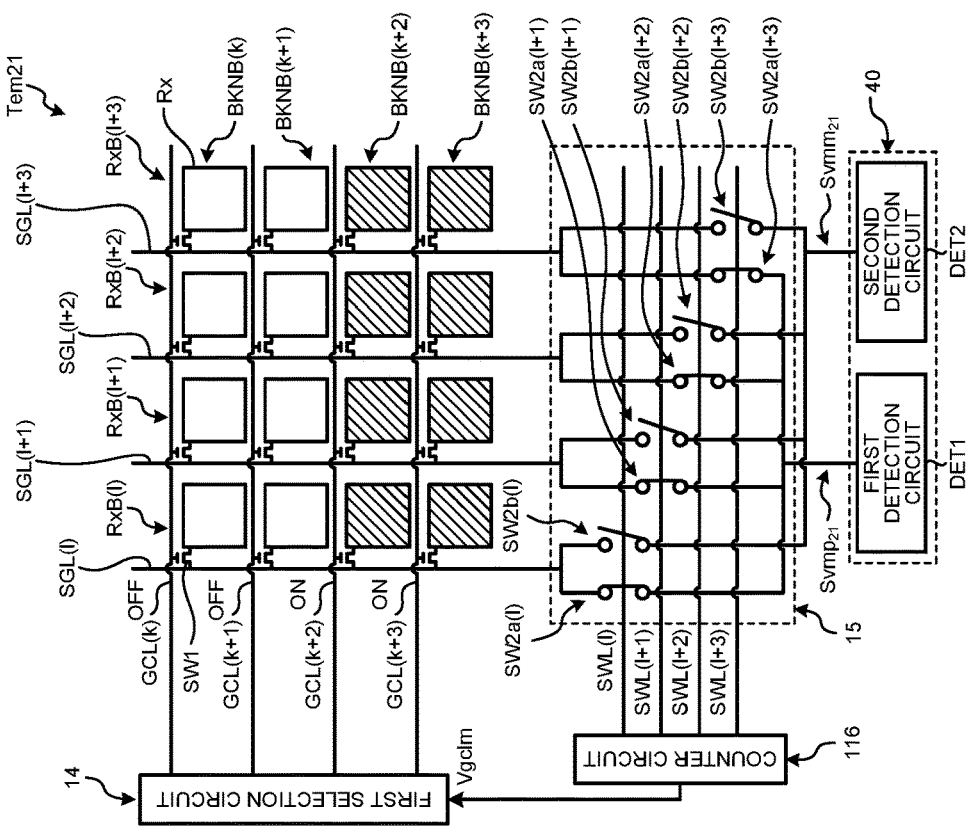
Figure 22B:
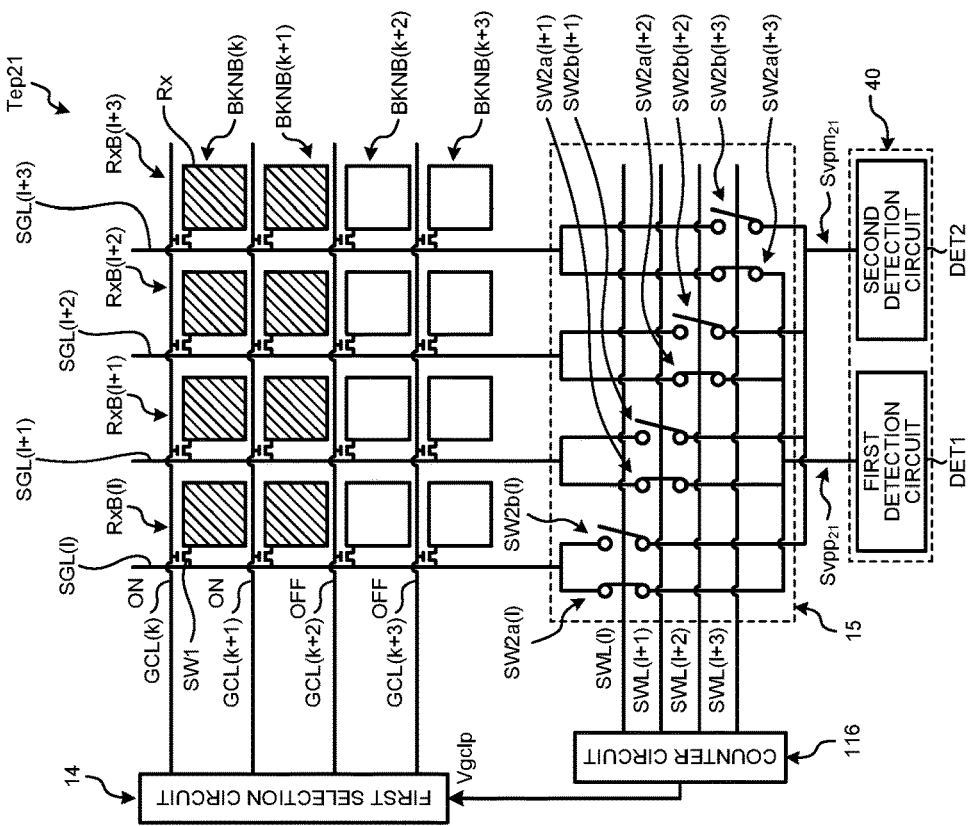

FIG. 22A illustrates a positive sign selection operation Tep21 of a detection operation Te21, whereas FIG. 22B illustrates a negative sign selection operation Tem21 of the detection operation Te21.

In the positive sign selection operation Tep21 of the detection operation Te21 illustrated in FIG. 22A, the detection electrodes Rx of the second detection electrode blocks BKNB(k) and BKNB(k+1) are selected as the detection electrodes Rx as the first selection targets of the square matrix Hv in accordance with the elements "1" on the second row of the square matrix Hv, and the detection electrodes Rx belonging to the detection electrode blocks RxB(1), RxB(l+1), RxB(l+2), and RxB(l+3) are selected as the detection electrodes Rx as the first selection targets of the square matrix Hh in accordance with the elements "1" on the first column of the square matrix Hh. In the positive sign selection operation Tep21 of the detection operation Te21 illustrated in FIG. 22A, the signal computing circuit 44 calculates a detection signal $Svhp_{21}$ ($Svhp_{21}=Svpp_{21}-Svpm_{21}$).

In the negative sign selection operation Tem21 of the detection operation Te21 illustrated in FIG. 22B, the detection electrodes Rx of the second detection electrode blocks BKNB(k+2) and BKNB(k+3) are selected as the detection electrodes Rx as the first selection targets of the square matrix Hv in accordance with the elements "−1" on the second row of the square matrix Hv. In the negative sign selection operation Tem21 of the detection operation Te21 illustrated in FIG. 22B, the signal computing circuit 44 calculates a detection signal $Svhm_{21}$ ($Svhm_{21}=Svmp_{21}-Svmm_{21}$). From the difference between the detection signal $Svhp_{21}$ and the detection signal $Svhm_{21}$, the signal computing circuit 44 calculates a detection signal $Svh_{11}$ in the detection operation Te21.

Subsequently, the detection apparatus 300, in a manner similar to that illustrated in FIG. 20C to FIG. 21D, performs detection operations Te22, Te23, and Te24 in this order. In a positive sign selection operation Tep22 of the detection operation Te22, a positive sign selection operation Tep23 of the detection operation Te23, and a positive sign selection operation Tep24 of the detection operation Te24, the first control circuit 114 and the first selection circuit 14 perform the positive sign selection operation in the Y direction (the second direction) corresponding to the elements "1" on the second row of the square matrix Hv in a manner similar to that illustrated in FIG. 22A. In a negative sign selection operation Tem22 of the detection operation Te22, a negative sign selection operation Tem23 of the detection operation Te23, and a negative sign selection operation Tem24 of the detection operation Te24, the first control circuit 114 and the first selection circuit 14 perform the negative sign selection operation in the Y direction (the second direction) corresponding to the elements "−1" on the second row of the square matrix Hv in a manner similar to that illustrated in FIG. 22B. In the detection operation Te22, the second control circuit 115 and the second selection circuit 15 perform the sign selection driving in the X direction (the first direction) based on the elements "1" and "−1" on the second column of the square matrix Hh in a manner similar to that illustrated in FIG. 20C and FIG. 20D. In the detection operation Te23, the second control circuit 115 and the second selection circuit 15 perform the sign selection driving in the X direction (the first direction) is performed based on the elements "1" and "−1" on the third column of the square matrix Hh in a manner similar to that illustrated in FIG. 21A and FIG. 21B. In the detection operation Te24, the second control circuit 115 and the second selection circuit 15 perform the sign selection driving in the X direction (the first direction) is performed based on the elements "1" and "−1" on the fourth column of the square matrix Hh in a manner similar to that illustrated in FIG. 21C and FIG. 21D.

In the detection apparatus 300, the detection operations Te22, Te23, and Te24 are performed in this order, whereby the signal computing circuit 44 calculates detection signals $Svhp_{22}$, $Svhp_{23}$, and $Svhp_{24}$ as the differences between detection signals $Svpp_{22}$, $Svpp_{23}$, and $Svpp_{24}$ and detection signals $Svpm_{22}$, $Svpm_{23}$, and $Svpm_{24}$, respectively. The detection signals $Svpp_{22}$, $Svpp_{23}$, and $Svpp_{24}$ are signals that are output to the first detection circuit DET1, and the detection signals $Svpm_{22}$, $Svpm_{23}$, and $Svpm_{24}$ are signals that are output to the second detection circuit DET2. The signal computing circuit 44 calculates detection signals $Svhm_{22}$, $Svhm_{23}$, and $Svhm_{24}$ as the differences between three detection signals $Svmp_{22}$, $Svmp_{23}$, and $Svmp_{24}$ and three detection signals $Svmm_{22}$, $Svmm_{23}$, and $Svmm_{24}$, respectively. The detection signals $Svmp_{22}$, $Svmp_{23}$, and $Svmp_{24}$ are signals that are output to the first detection circuit DET1, and the detection signals $Svmm_{22}$, $Svmm_{23}$, and $Svmm_{24}$ are signals that are output to the second detection circuit DET2. The signal computing circuit 44 calculates a detection signal $Svh_{22}$ of the detection operation Te22, a detection signal $Svh_{23}$ of the detection operation Te23, and a detection signal $Svh_{24}$ of the detection operation Te24 from the differences between the detection signals $Svhp_{22}$, $Svhp_{23}$, and $Svhp_{24}$, and the detection signals $Svhm_{22}$, $Svhm_{23}$, and $Svhm_{24}$, respectively.

Figure 22C:
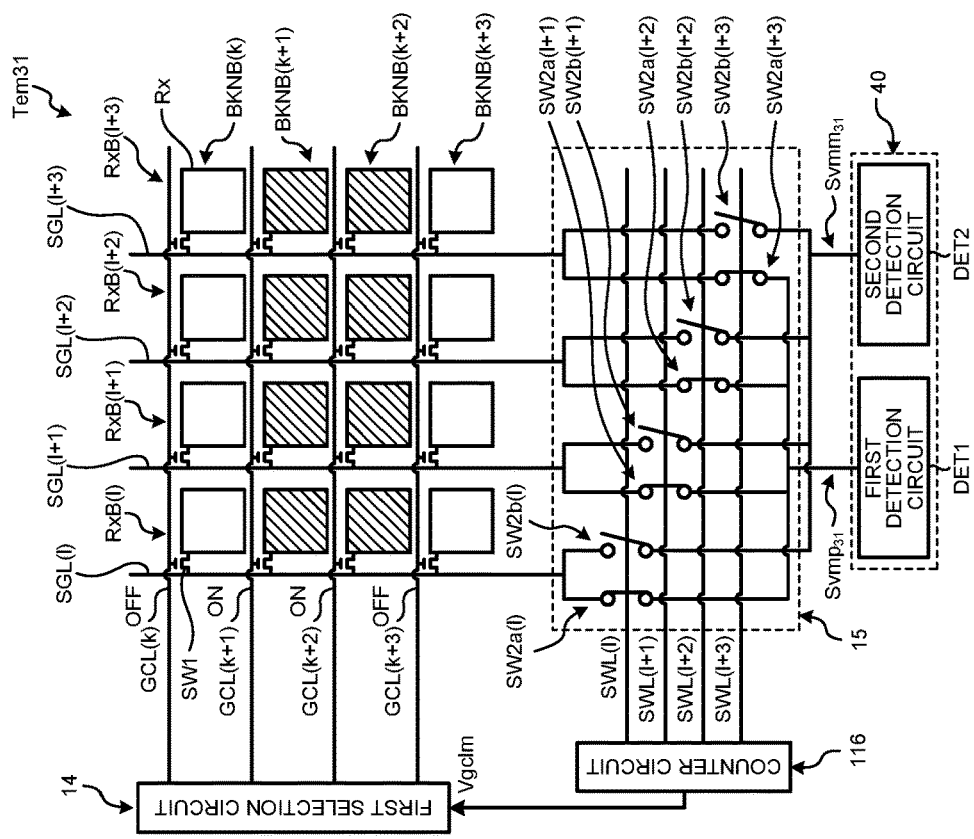
Figure 22D:
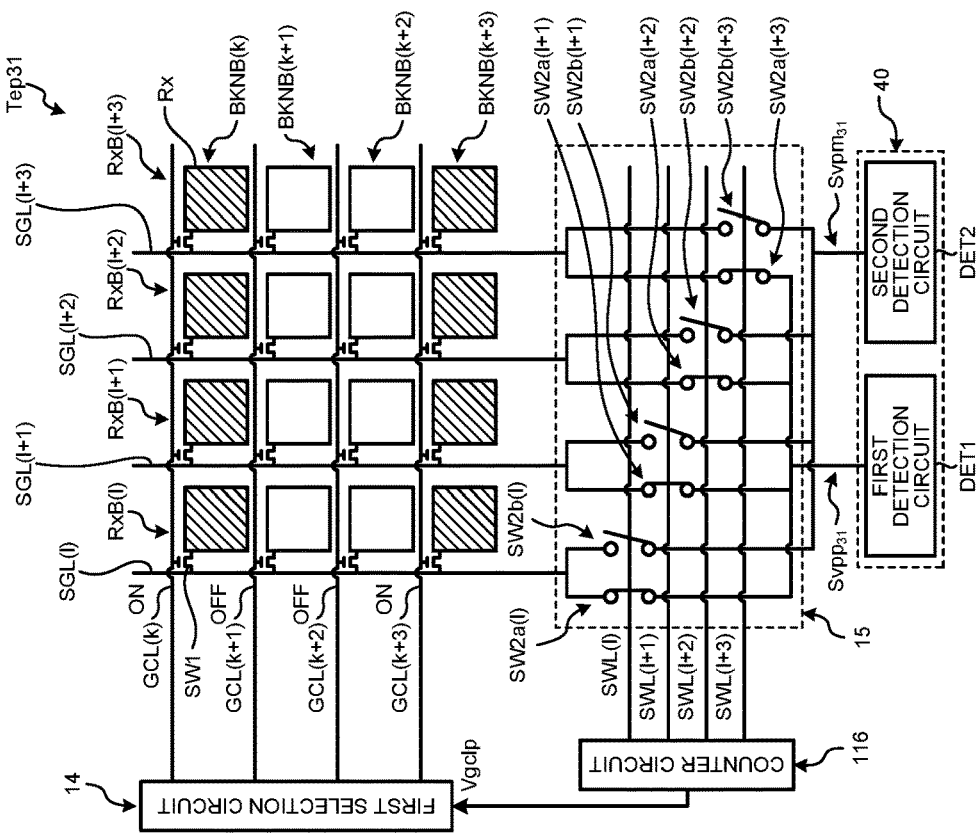

FIG. 22C illustrates a positive sign selection operation Tep31 of a detection operation Te31, whereas FIG. 22D illustrates a negative sign selection operation Tem31 of the detection operation Te31.

In the positive sign selection operation Tep31 of the detection operation Te31 illustrated in FIG. 22C, the detection electrodes Rx of the second detection electrode blocks BKNB(k) and BKNB(k+3) are selected as the detection electrodes Rx as the first selection targets of the square matrix Hv in accordance with the elements "1" on the third row of the square matrix Hv, and the detection electrodes Rx belonging to the detection electrode blocks RxB(1), RxB(l+1), RxB(l+2), and RxB(l+3) are selected as the detection electrodes Rx as the first selection targets of the square matrix Hh in accordance with the elements "1" on the first column of the square matrix Hh. In the positive sign selection operation Tep31 of the detection operation Te31 illustrated in FIG. 22C, a detection signal $Svhp_{31}$ ($Svhp_{31}=Svpp_{31}-Svpm_{31}$) is calculated.

In the negative sign selection operation Tem31 of the detection operation Te31 illustrated in FIG. 22D, the detection electrodes Rx of the second detection electrode blocks BKNB(k+1) and BKNB(k+2) are selected as the detection electrodes Rx as the first selection targets of the square matrix Hv in accordance with the elements "−1" on the third row of the square matrix Hv. In the negative sign selection operation Tem31 of the detection operation Te31 illustrated in FIG. 22D, a detection signal $Svhm_{31}$ ($Svhm_{31}=Svmp_{31}-Svmm_{31}$) is calculated. From the difference between the detection signal $Svhp_{31}$ and the detection signal $Svhm_{31}$, a detection signal $Svh_{31}$ in the detection operation Te31 is calculated.

Subsequently, the detection apparatus 300, in a manner similar to that illustrated in FIG. 20C to FIG. 21D, performs detection operations Te32, Te33, and Te34 in this order. In a positive sign selection operation Tep32 of the detection operation Te32, a positive sign selection operation Tep33 of the detection operation Te33, and a positive sign selection operation Tep34 of the detection operation Te34, the first control circuit 114 and the first selection circuit 14 perform the positive sign selection operation in the Y direction (the second direction) corresponding to the elements "1" on the third row of the square matrix Hv in a manner similar to that illustrated in FIG. 22C. In a negative sign selection operation Tem32 of the detection operation Te32, a negative sign selection operation Tem33 of the detection operation Te33, and a negative sign selection operation Tem34 of the detection operation Te34, the first control circuit 114 and the first selection circuit 14 perform the negative sign selection operation in the Y direction (the second direction) corresponding to the elements "−1" on the third row of the square matrix Hv in a manner similar to that illustrated in FIG. 22D. In the detection operation Te32, the second control circuit 115 and the second selection circuit 15 perform the sign selection driving in the X direction (the first direction) based on the elements "1" and "−1" on the second column of the square matrix Hh in a manner similar to that illustrated in FIG. 20C and FIG. 20D. In the detection operation Te33, the second control circuit 115 and the second selection circuit 15 perform the sign selection driving in the X direction (the first direction) based on the elements "1" and "−1" on the third column of the square matrix Hh in a manner similar to that illustrated in FIG. 21A and FIG. 21B. In the detection operation Te34, the second control circuit 115 and the second selection circuit 15 perform the sign selection driving in the X direction (the first direction) is performed based on the elements "1" and "−1" on the fourth column of the square matrix Hh in a manner similar to that illustrated in FIG. 21C and FIG. 21D.

In the detection apparatus 300, the detection operations Te32, Te33, and Te34 are performed in this order, whereby the signal computing circuit 44 calculates detection signals $Svhp_{32}$, $Svhp_{33}$, and $Svhp_{34}$ as the differences between detection signals $Svpp_{32}$, $Svpp_{33}$, and $Svpp_{34}$ and detection signals $Svpm_{32}$, $Svpm_{33}$, and $Svpm_{34}$, respectively. The detection signals $Svpp_{32}$, $Svpp_{33}$, and $Svpp_{34}$ are signals that are output to the first detection circuit DET1, and the detection signals $Svpm_{32}$, $Svpm_{33}$, and $Svpm_{34}$ are signals that are output to the second detection circuit DET2. The signal computing circuit 44 calculates detection signals $Svhm_{32}$, $Svhm_{33}$, and $Svhm_{34}$ as the differences between three detection signals $Svmp_{32}$, $Svmp_{33}$, and $Svmp_{34}$ and three detection signals $Svmm_{32}$, $Svmm_{33}$, and $Svmm_{34}$, respectively. The detection signals $Svmp_{32}$, $Svmp_{33}$, and $Svmp_{34}$ are signals that are output to the first detection circuit DET1, and the detection signals $Svmm_{32}$, $Svmm_{33}$, and $Svmm_{34}$ are signals that are output to the second detection circuit DET2. The signal computing circuit 44 calculates a detection signal $Svh_{32}$ of the detection operation Te32, a detection signal $Svh_{33}$ of the detection operation Te33, and a detection signal $Svh_{34}$ of the detection operation Te34 from the differences between the detection signals $Svhp_{32}$, $Svhp_{33}$, and $Svhp_{34}$, and the detection signals $Svhm_{32}$, $Svhm_{33}$, and $Svhm_{34}$, respectively.

FIG. 22E illustrates a positive sign selection operation Tep41 of a detection operation Te41, whereas FIG. 22F illustrates a negative sign selection operation Tem41 of the detection operation Te41.

In the positive sign selection operation Tep41 of the detection operation Te41 illustrated in FIG. 22E, the detection electrodes Rx of the second detection electrode blocks BKNB(k) and BKNB(k+2) are selected as the detection electrodes Rx as the first selection targets of the square matrix Hv in accordance with the elements "1" on the fourth row of the square matrix Hv. The detection electrodes Rx belonging to the detection electrode blocks RxB(1), RxB(l+1), RxB(l+2), and RxB(l+3) are selected as the detection electrodes Rx as the first selection targets of the square matrix Hh in accordance with the elements "1" on the first column of the square matrix Hh. In the positive sign selection operation Tep41 of the detection operation Te41 illustrated in FIG. 22E, the signal computing circuit 44 calculates a detection signal $Svhp_{41}$ ($Svhp_{41}=Svpp_{41}-Svpm_{41}$).

In the negative sign selection operation Tem41 of the detection operation Te41 illustrated in FIG. 22F, the detection electrodes Rx of the second detection electrode blocks BKNB(k+1) and BKNB(k+3) are selected as the detection electrodes Rx as the first selection targets of the square matrix Hv in accordance with the elements "−1" on the fourth row of the square matrix Hv. In the negative sign selection operation Tem41 of the detection operation Te41 illustrated in FIG. 22F, the signal computing circuit 44 calculates a detection signal $Svhm_{41}$ ($Svhm_{41}=Svmp_{41}-Svmm_{41}$). From the difference between the detection signal $Svhp_{41}$ and the detection signal $Svhm_{41}$, the signal computing circuit 44 calculates a detection signal $Svh_{41}$ in the detection operation Te41.

Subsequently, the detection apparatus 300, in a manner similar to that illustrated in FIG. 20C to FIG. 21D, performs detection operations Te42, Te43, and Te44 in this order. In a positive sign selection operation Tep42 of the detection operation Te42, a positive sign selection operation Tep43 of the detection operation Te43, and a positive sign selection operation Tep44 of the detection operation Te44, the first control circuit 114 and the first selection circuit 14 perform the positive sign selection operation in the Y direction (the second direction) corresponding to the elements "1" on the fourth row of the square matrix Hv in a manner similar to that illustrated in FIG. 22E. In a negative sign selection operation Tem42 of the detection operation Te42, a negative sign selection operation Tem43 of the detection operation Te43, and a negative sign selection operation Tem44 of the detection operation Te44, the first control circuit 114 and the first selection circuit 14 perform the negative sign selection operation in the Y direction (the second direction) corresponding to the elements "−1" on the fourth row of the square matrix Hv in a manner similar to that illustrated in FIG. 22F. In the detection operation Te42, the second control circuit 115 and the second selection circuit 15 perform the sign selection driving in the X direction (the first direction)

based on the elements "1" and "−1" on the second column of the square matrix Hh in a manner similar to that illustrated in FIG. 20C and FIG. 20D. In the detection operation Te43, the second control circuit 115 and the second selection circuit 15 perform the sign selection driving in the X direction (the first direction) based on the elements "1" and "−1" on the third column of the square matrix Hh in a manner similar to that illustrated in FIG. 21A and FIG. 21B. In the detection operation Te44, the second control circuit 115 and the second selection circuit 15 perform the sign selection driving in the X direction (the first direction) based on the elements "1" and "−1" on the fourth column of the square matrix Hh in a manner similar to that illustrated in FIG. 21C and FIG. 21D.

In the detection apparatus 300, the detection operations Te42, Te43, and Te44 are performed in this order, whereby the signal computing circuit 44 calculates detection signals $Svhp_{42}$, $Svhp_{43}$, and $Svhp_{44}$ as the differences between detection signals $Svpp_{42}$, $Svpp_{43}$, and $Svpp_{44}$ and detection signals $Svpm_{42}$, $Svpm_{43}$, and $Svpm_{44}$, respectively. The detection signals $Svpp_{42}$, $Svpp_{43}$, and $Svpp_{44}$ are signals that are output to the first detection circuit DET1, and the detection signals $Svpm_{42}$, $Svpm_{43}$, and $Svpm_{44}$ are signals that are output to the second detection circuit DET2. The signal computing circuit 44 calculates detection signals $Svhm_{42}$, $Svhm_{43}$, and $Svhm_{44}$ as the differences between three detection signals $Svmp_{42}$, $Svmp_{43}$, and $Svmp_{44}$ and three detection signals $Svmm_{42}$, $Svmm_{43}$, and $Svmm_{44}$, respectively. The detection signals $Svmp_{42}$, $Svmp_{43}$, and $Svmp_{44}$ are signals that are output to the first detection circuit DET1, and the detection signals $Svmm_{42}$, $Svmm_{43}$, and $Svmm_{44}$ are signals that are output to the second detection circuit DET2. The signal computing circuit 44 calculates a detection signal $Svh_{42}$ of the detection operation Te42, a detection signal $Svh_{43}$ of the detection operation Te43, and a detection signal $Svh_{44}$ of the detection operation Te44 from the differences between the detection signals $Svhp_{42}$, $Svhp_{43}$, and $Svhp_{44}$, and the detection signals $Svhm_{42}$, $Svhm_{43}$, and $Svhm_{44}$, respectively.

As described above, the signal computing circuit 44 (refer to FIG. 2) calculates the data of detection signals Svh by the detection operation Te11 to the detection operation Te44. The detection signals Svh, in the second mode, include the detection signals $Svh_{11}$, $Svh_{12}$, $Svh_{13}$, $Svh_{14}$, $Svh_{21}$, $Svh_{22}$, $Svh_{23}$, $Svh_{24}$, $Svh_{31}$, $Svh_{32}$, $Svh_{33}$, $Svh_{34}$, $Svh_{41}$, $Svh_{42}$, $Svh_{43}$, and $Svh_{44}$. The data of the detection signals Svh is stored in the storage circuit 48. The signal computing circuit 44 (refer to FIG. 2) receives the data of the detection signals Svh from the storage circuit 48 and performs decoding processing based on the square matrix Hh as described in Expression (10) below. Specifically, the signal computing circuit 44 multiplies a matrix SvhX consisting of the detection signals Svh by the square matrix Hh to calculate a matrix SctX consisting of a plurality of detection signals Sct. The detection signals Sct are values obtained by multiplying the detection signals Sc by the order t of the square matrix Hh. Further, the signal computing circuit 44 performs, based on the square matrix Hv, decoding processing from the detection signals Sc as described in Expression (4). Specifically, the signal computing circuit 44 multiplies the square matrix Hv by the matrix SctX consisting of the t-fold detection signals Sc to calculate a matrix SidtX consisting of decoded detection signals Sidt. In the third embodiment, $Sidt_{k,l}$, $Sidt_{k+1,l}$, $Sidt_{k+2,l}$, $Sidt_{k+3,l}$, $Sidt_{k,l+1}$, $Sidt_{k+1,l+1}$, $Sidt_{k+2,l+1}$, $Sidt_{k+3,l+1}$, $Sidt_{k,l+2}$, $Sidt_{k+1,l+2}$, $Sidt_{k+2,l+2}$, $Sidt_{k+3,l+2}$, $Sidt_{k,l+3}$, $Sidt_{k+1,l+3}$, $Sidt_{k+2,l+3}$, and $Sidt_{k+3,l+3}$ are calculated as the decoded detection signals Sidt. The detection signal $Sidt_{k,l}$ is associated with a detection electrode $Rx_{k,l}$ coupled to a scan line (k) among the detection electrodes Rx of the detection electrode block RxB(l), and the detection signals $Sidt_{k+1,l}$, $Sidt_{k+2,l}$, and $Sidt_{k+3,l}$ are similarly associated with detection electrodes $Rx_{k+1,l}$, $Rx_{k+2,l}$, and $Rx_{k+3,l}$, respectively, of the detection electrode block RxB(l). The detection signal $Sidt_{k,l+1}$ is associated with a detection electrode $Rx_{k,l+1}$ coupled to the scan line (k) among the detection electrodes Rx of the detection electrode block RxB (l+1), and the detection signals $Sidt_{k+1,l+1}$, $Sidt_{k+2,l+1}$, and $Sidt_{k+3,l+1}$ are similarly associated with detection electrodes $Rx_{k+1,l+1}$, $Rx_{k+2,l+1}$, and $Rx_{k+3,l+1}$, respectively, of the detection electrode block RxB (l+1). The detection signal $Sidt_{k,l+2}$ is associated with a detection electrode $Rx_{k,l+2}$ coupled to the scan line (k) among the detection electrodes Rx of the detection electrode block RxB (l+2), and the detection signals $Sidt_{k+1,l+2}$, $Sidt_{k+2,l+2}$, and $Sidt_{k+3,l+2}$ are similarly associated with detection electrodes $Rx_{k+1,l+2}$, $Rx_{k+2,l+2}$, and $Rx_{k+3,l+2}$, respectively, of the detection electrode block RxB (l+2). The detection signal $Sidt_{k,l+3}$ is associated with a detection electrode $Rx_{k,l+3}$ coupled to the scan line (k) among the detection electrodes Rx of the detection electrode block RxB (l+3), and the detection signals $Sidt_{k+1,l+3}$, $Sidt_{k+2,l+3}$, and $Sidt_{k+3,l+3}$ are similarly associated with detection electrodes $Rx_{k+1,l+3}$, $Rx_{k+2,l+3}$, and $Rx_{k+3,l+3}$, respectively, of the detection electrode block RxB (l+3). Consequently, signal values obtained by multiplying the detection signals Si of the respective detection electrodes Rx by the order d of the square matrix Hv and multiplying them by the order t of the square matrix Hh can be acquired as the signal values of the respective detection electrodes Rx.

$$SctX = SvhX \times Hh \qquad (10)$$

The coordinates extraction circuit 45 can calculate the two-dimensional coordinates of an external object such as a finger Fin being in contact with or proximity to the detection apparatus based on the decoded signals Sidt.

FIG. 23 is a diagram of a correspondence relation between decoded signals and detection electrodes in each mode in the detection apparatus according to the third embodiment. When, among the detection electrodes Rx, a detection electrode Rx that is arranged on the k-th row and the l-th column is represented by a detection electrode $Rx_{k,l}$, a detection signal $Si_{k,l}dt$ obtained by decoding the detection signal Svh obtained by performing the detection operations Te in the period T2 in the second mode can be associated with the detection electrode $Rx_{k,l}$, as illustrated in FIG. 23. The detection signal $Si_{k,l}dt$ is a value obtained by multiplying a detection signal Silo as the detection signal of the $Rx_{k,l}$ by the order t of the square matrix Hh and the order d of the square matrix Hv; in the third embodiment, a 16-fold signal value can be acquired.

As illustrated in FIG. 19, the detection apparatus 300, in the first mode, performs the sign selection driving corresponding to the first row to the r-th row of the square matrix Hv in the period T1, which is shorter than the period T2, by the first control circuit 114 and the first selection circuit 14. The r is less than the order d of the square matrix Hv and corresponds to $2^{Nb}$. The Nb is an integer equal to or greater than 0 and is 1 in the third embodiment. Consequently, the detection apparatus 300 performs the detection operation Te11 to the detection operation Te24 in the first mode in a manner similar to the detection operation Te11 to the detection operation Te24 in the second mode. The detection apparatus 300 performs the detection operation Te11 to the detection operation Te24 to calculate the detection signals $Svh_{11}$, $Svh_{12}$, $Svh_{13}$, $Svh_{14}$, $Svh_{21}$, $Svh_{22}$, $Svh_{23}$, and $Svh_{24}$.

The signal computing circuit 44 decodes these detection signals Svh using the square matrix Hh to acquire the detection signals Sct. Further, the signal computing circuit 44 decodes detection signals Sit(d/$2^{Na-Nb}$)) using a matrix of the first column to the r-th column of the square matrix Hh.

When, among the detection electrodes Rx, a detection electrode Rx that is arranged on the k-th row and the l-th column is represented by a the detection electrode $Rx_{kl}$, a detection signal t(d/2)($Si_{kl}+Si_{k+1l}$) obtained by decoding the detection signal Svh obtained by performing the detection operations Te in the first mode can be associated with the detection electrode $Rx_{kl}$, as illustrated in FIG. 23. The detection signal $Si_{kl}+Si_{k+1l}$ corresponds to a detection signal that is output when the detection electrode $Rx_{kl}$ and the detection electrode $Rx_{k+1l}$ adjacent to the detection electrode $Rx_{kl}$ in the Y direction (the second direction) are coupled to the same data line SGL. The detection apparatus 300, in the first mode, can acquire a value obtained by multiplying the detection signal $Si_{kl}+Si_{k+1l}$ by the order t of the square matrix Hh and the order d/2 of the square matrix Hv; in the third embodiment, an eightfold signal value can be acquired. In other words, although the detection resolution in the Y direction (the second direction) reduces as compared with the second mode, an eightfold signal value can be acquired in a shorter time than the second mode.

As illustrated in FIG. 19, the detection apparatus 300, in the third mode, performs the sign selection driving corresponding to the first column to the u-th column of the square matrix Hh in the period T3, which is shorter than the period T2, by the second control circuit 115 and the second selection circuit 15. The u is less than the order t of the square matrix Hh and corresponds to $2^{Nc}$. The Nc is an integer equal to or greater than 0 and is 1 in the third embodiment. Consequently, the detection apparatus 300 performs the detection operations Te corresponding to the first column to the u-th column of the square matrix Hh. The detection operations Te corresponding to the first column to the u-th column of the square matrix Hh in the third mode are similar to the detection operations Te corresponding to the first column to the u-th column of the square matrix Hh in the second mode. The detection apparatus 300 performs the detection operations Te corresponding to the first column to the u-th column to calculate the detection signals $Svh_{11}$, $Svh_{12}$, $Svh_{21}$, $Svh_{22}$, $Svh_{31}$, $Svh_{32}$, $Svh_{41}$, and $Svh_{42}$. The signal computing circuit 44 decodes these detection signals Svh by the first column to the u-th column of the square matrix Hh to acquire detection signals Sc(t/$2^{Na-Nc}$). Further, the signal computing circuit 44 decodes detection signals Si(t/$2^{Na-Nc}$)d using the square matrix Hv. In the third embodiment, Na−Nb=1.

When, among the detection electrodes Rx, a detection electrode Rx that is arranged on the k-th row and the l-th column is represented by a the detection electrode $Rx_{kl}$, a decoded detection signal (t/2)d($Si_{kl}+Si_{kl+1}$) obtained by decoding the detection signal Svh obtained by performing the detection operations Te in the third mode can be associated with the detection electrode $Rx_{kl}$, as illustrated in FIG. 23. The detection signal $Si_{kl}+Si_{kl+1}$ corresponds to a detection signal that is output when the detection electrode $Rx_{kl}$ and the detection electrode $Rx_{kl+1}$ adjacent to the detection electrode $Rx_{kl}$ in the X direction (the first direction) are coupled to the detection circuit 40. The detection apparatus 300, in the third mode, can acquire a value obtained by multiplying the detection signal $Si_{kl}+Si_{kl+1}$ by the order t/2 of the square matrix Hh fold and the order d of the square matrix Hv, and an eightfold signal value can be acquired in the third embodiment. In other words, although the detection resolution in the X direction (the first direction) reduces as compared with the second mode, an eightfold signal value can be acquired in a shorter time than the second mode.

The positive sign selection operation and the negative sign selection operation are successively performed, whereby the resistance to noise can be improved. In the detection operations Te illustrated in FIGS. 20A to 20D, for example, when the four detection signals $Svpp_{11}$, $Svpm_{11}$, $Svmp_{11}$, and $Svmm_{11}$ are measured by time division, they are preferably measured in this order. The interval of the detection times of the first selection targets and the second selection targets of the square matrix Hh reduces, and noise components on the respective detection signals are cancelled out. Alternatively, those signals may be measured in order of the detection signal $Svpp_{11}$, the detection signal $Svmp_{11}$, the detection signal $Svpm_{11}$, and the detection signal $Svmm_{11}$, for example. In this case, the interval of the detection times of the first selection targets and the second selection targets of the square matrix Hv reduces, and noise components on the respective detection signals are cancelled out. Alternatively, the positive sign selection operation may be performed successively a plurality of times, and then the negative sign selection operation may be performed. The order of the detection operations illustrated in FIG. 20A to FIG. 22F may be changed as appropriate.

Fourth Embodiment

The specific configuration of the detection apparatus is not limited to the modes with reference to FIG. 1 to FIG. 4 and FIG. 8.

Figure 24:
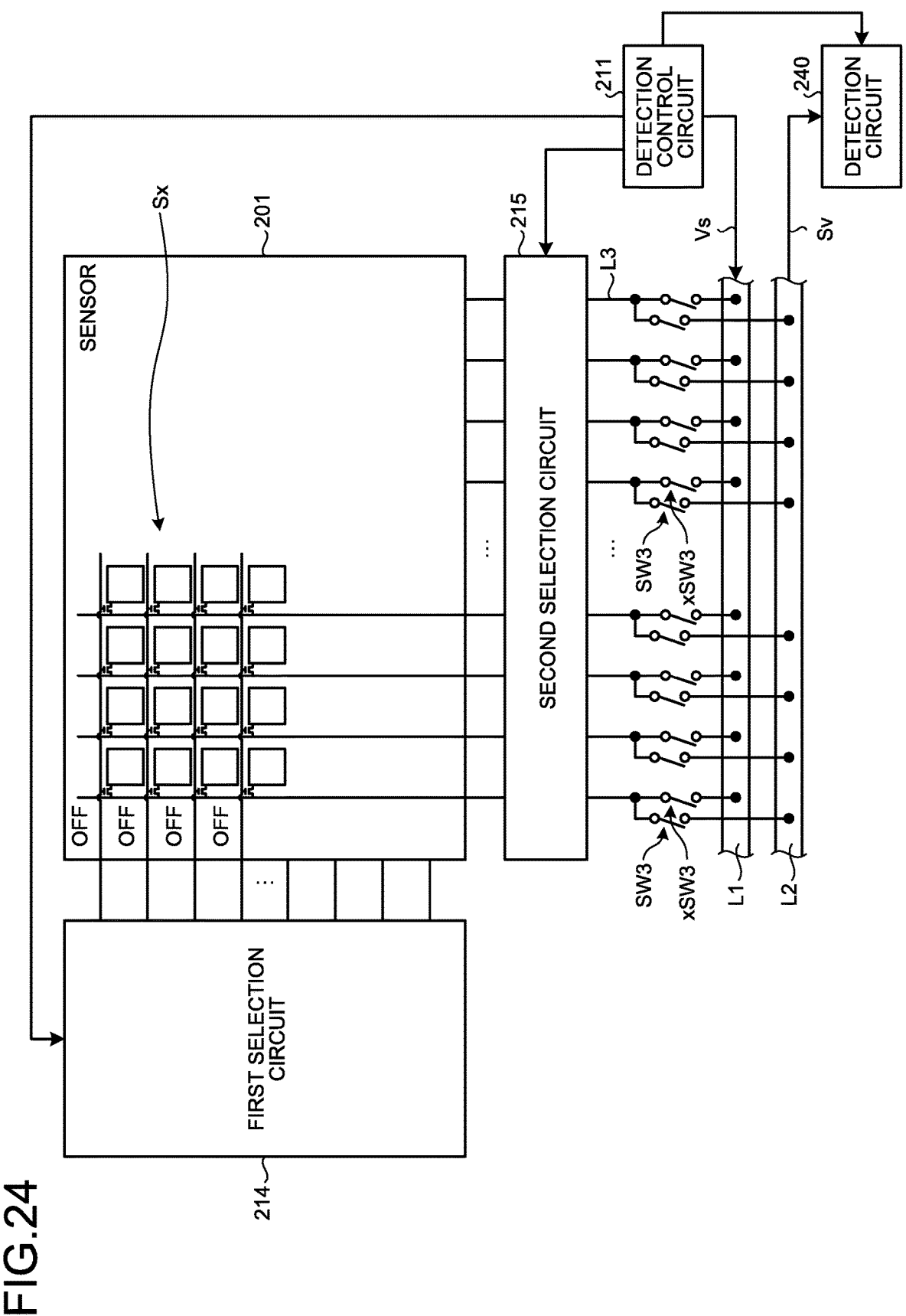
FIG. 24 is a diagram of a configuration example of the detection apparatus according to a fourth embodiment.

FIG. 24 is a diagram of a configuration example of the detection apparatus according to a fourth embodiment. In a sensor 201 illustrated in FIG. 24, the detection electrode Tx and the conductor 26 are removed; and detection electrodes Sx are arranged in a matrix, or row-column configuration, in the same manner as the detection electrodes Rx, and are coupled to the scan lines GCL and the data lines SGL via the switch elements SW1. A first selection circuit 214 has a function similar to that of the first selection circuit 14. A second selection circuit 215 has a function similar to that of the second selection circuit 15. A detection control circuit 211 has a function similar to that of the detection control circuit 11.

In the configuration illustrated in FIG. 24, wiring L3, a plurality of switch elements SW3, and wiring L2 are provided between the second selection circuit 215 and a detection circuit 240. The configuration illustrated in FIG. 24 is a configuration in which a mode in which the detection control circuit 211 supplies the drive signal Vs to the detection electrodes Sx via wiring L1 and a plurality of switch elements xSW3 is employed. That is to say, in the configuration illustrated in FIG. 24, the drive signal generation circuit 112 included in the detection control circuit 211 is coupled to the detection electrodes Sx provided in the sensor 201 to provide the drive signal Vs thereto.

The supply of the drive signal Vs and the output of the detection signal Vs can be switched by the switch elements SW3 and xSW3, for example. When the switch elements SW3 are off (a non-coupled state), the switch elements xSW3 are on (a coupled state), and the drive signal Vs is supplied to each of the detection electrodes Sx as selection targets via the wiring L1 and the wiring L3 and via the second selection circuit 215 and the data lines SGL. When the switch elements SW3 are on (a coupled state), the switch elements xSW3 are off (a non-coupled state), and the detection signals Sv from the detection electrodes Sx as selection targets are output to the detection circuit 240 via the wiring L2 and the wiring L3. That is to say, the detection electrodes Sx in the fourth embodiment are electrodes serving as both the detection electrodes Rx and the detection electrode Tx (the drive electrode) in the first embodiment.

The functions of the switch elements SW3 and xSW3 and the wiring L1, L2, and L3 may be included in the second selection circuit 215 or a circuit provided separately from the second selection circuit 215. The detection control circuit 211 may include the function of the drive signal generation circuit 112. The switch elements SW3 and xSW3 and the wiring L1, L2, and L3 are provided on the base member 101, for example.

Fifth Embodiment

Figure 25:
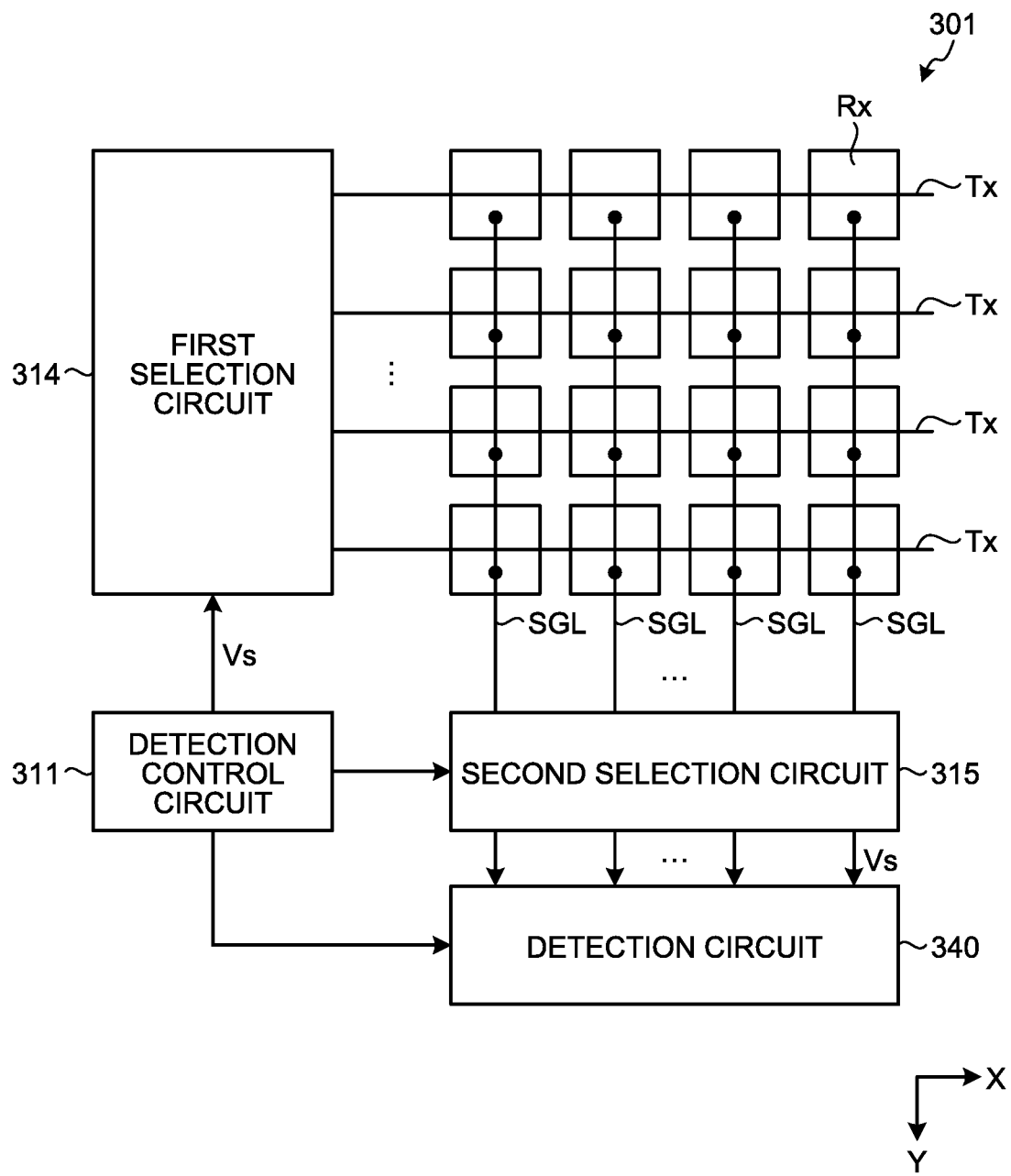
FIG. 25 is a diagram of a configuration example of the detection apparatus according to a fifth embodiment.

FIG. 25 is a diagram of a configuration example of the detection apparatus according to a fifth embodiment. A sensor 301 is arranged such that detection electrodes Tx (drive electrodes) face a plurality of detection electrodes Rx in a noncontact manner. The drive signal generation circuit 112 of a detection control circuit 311 is coupled to the detection electrodes Tx via a first selection circuit 314 to supply the drive signal Vs to the detection electrodes Tx. The sensor 301 does not have any switch elements SW1 coupled to the detection electrodes Tx in the detection area DA, and the detection electrodes Tx and the first selection circuit 314 are coupled to each other in the peripheral area PA. The detection electrodes Rx are coupled to the data lines SGL not through the switch elements SW1.

When the drive signal Vs is supplied to the detection electrodes Tx, the proximity to the detection electrode Rx by an object to be detected such as the finger Fin has an influence on mutual capacitance occurring between the detection electrode Rx and the detection electrode Tx. The configuration illustrated in FIG. 25 performs detection based on the presence or absence of a change in the mutual capacitance appearing in the drive signal Vs and the degree of the change. In the configuration illustrated in FIG. 25, a plurality of detection electrodes Tx provided such that the longitudinal direction thereof is along the X direction so as to be able to simultaneously drive the detection electrodes Rx arranged in the X direction, are arranged in accordance with the arrangement of the detection electrodes Rx in the Y direction. However, this is an example of the configuration of the detection electrodes Tx, and the detection electrodes Tx are not limited thereto. The shape and arrangement of the detection electrodes Tx can be changed as appropriate.

In the configuration illustrated in FIG. 25, the data lines SGL couple a second selection circuit 315 and the detection electrodes Rx to each other. In the configuration illustrated in FIG. 25, the first selection circuit 314 selects the detection electrodes Rx arranged in the Y direction by selecting the detection electrode Tx to which the drive signal Vs is supplied. With regard to other points, the functions of the second selection circuit 315 and a detection circuit 340 are similar to those of the second selection circuit 15 and the detection circuit 40.

Sixth Embodiment

Figure 26:
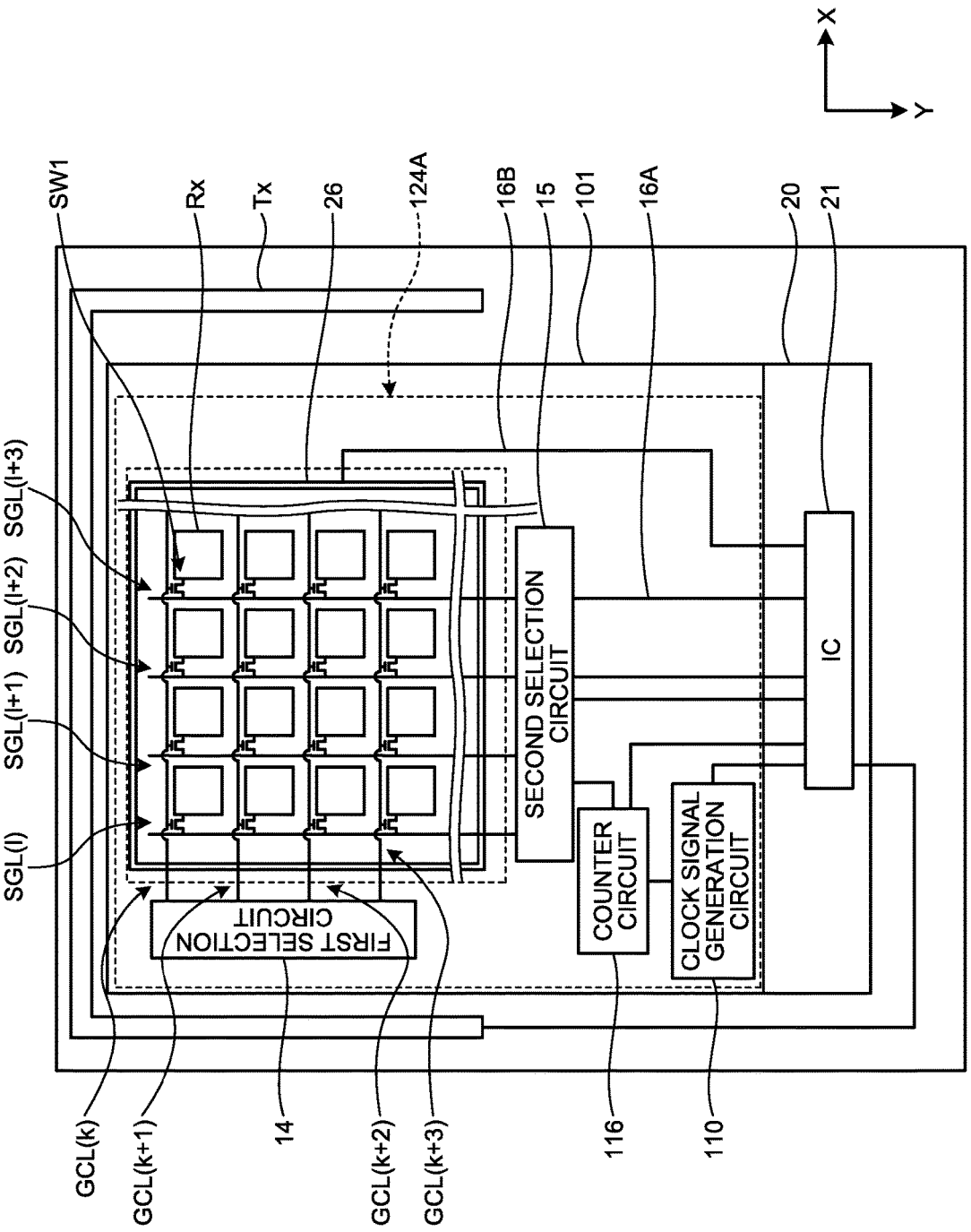
FIG. 26 is a plan view of a detection apparatus according to a sixth embodiment.

In the first embodiment, the shield layer 24 is arranged between the layer in which the detection electrodes Rx are formed and the layer in which the switch elements SW1 are formed as illustrated in FIG. 7. However, the arrangement is not limited thereto. FIG. 26 is a plan view of a detection apparatus 100A according to a sixth embodiment. As illustrated in FIG. 26, this shield layer 124A is arranged so as to be superimposed on circuits formed on the base member 101 such as the first selection circuit 14 and the second selection circuit 15 in a plan view. The shield layer 124A is arranged so as to surround the detection area DA. In the sixth embodiment, the shield layer 124A is arranged so as to surround the four sides of the rectangular detection area DA. However, the arrangement is not limited thereto. The shield layer 124A is only required to be arranged so as to be at least superimposed on the circuits arranged on the base member 101 and may be arranged along two sides of the detection area DA in which the first selection circuit 14 and the second selection circuit 15 are arranged, for example.

FIG. 27 is a sectional view of the detection apparatus 700 according to the sixth embodiment. As illustrated in FIG. 27, the detection apparatus 700 is formed so as to form the shield layer 124A using the same electrode layer as the detection electrode Rx to cover a switch element SSW included in the circuits formed on the base member 101 without providing the shield layer 24. The shield layer 124A is formed of a transparent conductor such as ITO. The switch element SSW is the switch element SW2 included in the second selection circuit 15, for example. Although the sixth embodiment exemplifies a case in which the shield layer 24 is not provided, this is not limiting; both the shield layer 124A and the shield layer 24 may be arranged.

Preferable embodiments of the present invention are described above, but the present invention is not limited to such embodiments. Contents disclosed in the embodiments are merely exemplary, and various kinds of modifications are possible without departing from the gist of the present invention. Any modification performed as appropriate without departing from the gist of the present invention belongs to the technical scope of the present invention.

What is claimed is:
1. A detection apparatus comprising:
a detection electrode block including a plurality of detection electrodes arranged in a first direction;
a drive electrode that does not overlap with the detection electrode block and surrounds the plurality of detection electrodes in a plan view;
a detection circuit configured to be coupled to the detection electrodes to detect detection signals corresponding to changes in capacitance of the detection electrodes; and
a coupling circuit configured to couple the detection electrodes to the detection circuit and uncouple the detection electrodes from the detection circuit,
wherein the coupling circuit has
a first detection mode of coupling the detection electrodes and the detection circuit to each other by r coupling patterns corresponding to a first row through an r-th row of a Walsh Hadamard matrix in a first detection period, and
a second detection mode of coupling the detection electrodes and the detection circuit to each other by n coupling patterns corresponding to the first row through an n-th row of the Hadamard matrix in a second detection period that is longer than the first detection period, n being greater than r, and
wherein the coupling circuit does not couple the detection electrodes and the detection circuit to each other by a coupling pattern corresponding to an (r+1)-th row of the Hadamard matrix in the first detection mode.

2. The detection apparatus according to claim 1,
wherein the detection electrodes are arranged in the first direction and a second direction crossing the first direction.

3. The detection apparatus according to claim 2,
wherein a first selection operation and a second selection operation are performed for each of the first direction and the second direction,
wherein the first selection operation is an operation of selecting, from among the detection electrodes, a detection electrode arranged corresponding to a positive sign of positive and negative sings included in the Walsh Hadamard matrix, and
wherein the second selection operation is an operation of selecting, from among the detection electrodes, a detection electrode arranged corresponding to a negative sign of the positive and negative sings included in the Walsh Hadamard matrix.

4. The detection apparatus according to claim 1, further comprising a drive signal generation circuit, wherein
the drive electrode is arranged at a position adjacent to the detection electrodes; and
the drive signal generation circuit is configured to be coupled to the drive electrode to supply a drive signal to the drive electrode.

5. The detection apparatus according to claim 4,
wherein the detection electrodes are provided to one face of a substrate, and
wherein a height of the drive electrode from the one face is greater than a height of the detection electrodes from the one face.

6. The detection apparatus according to claim 1, further comprising a drive signal generation circuit, wherein
the drive electrode faces the detection electrodes in a noncontact manner; and
the drive signal generation circuit is configured to be coupled to the drive electrode to supply a drive signal to the drive electrode.

7. The detection apparatus according to claim 1, further comprising a drive signal generation circuit coupled to the detection electrodes to supply a drive signal to the detection electrodes.

8. The detection apparatus according to claim 3,
wherein, in the first detection mode, the first selection operation corresponding to rows of part included in the Walsh Hadamard matrix is performed a plurality of times.

* * * * *